US012790418B2

(12) United States Patent
Sato et al.

(10) Patent No.: US 12,790,418 B2
(45) Date of Patent: Nov. 10, 2026

(54) PRODUCTION METHOD OF FLUORORESIN, FLUORORESIN AND AQUEOUS DISPERSION

(71) Applicant: DAIKIN INDUSTRIES, LTD., Osaka (JP)

(72) Inventors: Hiroyuki Sato, Osaka (JP); Kenji Ichikawa, Osaka (JP); Taketo Kato, Osaka (JP); Taku Yamanaka, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 410 days.

(21) Appl. No.: 18/467,238

(22) Filed: Sep. 14, 2023

(65) Prior Publication Data

US 2024/0002558 A1 Jan. 4, 2024

Related U.S. Application Data

(63) Continuation of application No. PCT/JP2022/012734, filed on Mar. 18, 2022.

(30) Foreign Application Priority Data

Mar. 18, 2021 (JP) ................................. 2021-045167

(51) Int. Cl.
*C08F 114/26* (2006.01)

(52) U.S. Cl.
CPC .................................. *C08F 114/26* (2013.01)

(58) Field of Classification Search
None
See application file for complete search history.

(56) References Cited

U.S. PATENT DOCUMENTS

| | | | | |
|---|---|---|---|---|
| 6,861,466 | B2 * | 3/2005 | Dadalas | C08L 27/18 526/248 |
| 12,187,859 | B2 * | 1/2025 | Yoneda | C08J 3/03 |
| 2021/0108008 | A1 | 4/2021 | Kato et al. | |
| 2023/0101829 | A1 | 3/2023 | Kato et al. | |
| 2023/0167219 | A1 | 6/2023 | Tamai et al. | |
| 2024/0317907 | A1 | 9/2024 | Kato et al. | |

FOREIGN PATENT DOCUMENTS

| | | | |
|---|---|---|---|
| CN | 116134060 | A | 5/2023 |
| EP | 3885372 | A1 | 9/2021 |
| JP | 7464882 | B2 | 4/2024 |
| WO | 2018/181904 | A1 | 10/2018 |

OTHER PUBLICATIONS

International Preliminary Report on Patentability (with translation of Written Opinion) dated Sep. 12, 2023 issued in corresponding International Application No. PCT/JP2022/012734.
Communication dated Feb. 20, 2025 issued by the European Patent Office in application No. 22771549.7.

* cited by examiner

*Primary Examiner* — Robert S Jones, Jr.
*Assistant Examiner* — Christiaan Roelofse
(74) *Attorney, Agent, or Firm* — Sughrue Mion, PLLC

(57) ABSTRACT

The present disclosure provides a method for producing a fluororesin, which includes polymerizing a fluorine-containing monomer in the presence of a compound (1) having triple bond and a hydrophilic group and an aqueous medium to produce a fluororesin, a fluororesin comprising a unit based on a compound (1) having triple bond and a hydrophilic group, and a fluorine-containing monomer unit, and an aqueous dispersion comprising the fluororesin and an aqueous medium.

11 Claims, No Drawings

PRODUCTION METHOD OF FLUORORESIN, FLUORORESIN AND AQUEOUS DISPERSION

CROSS-REFERENCE TO RELATED APPLICATIONS

This application is a Rule 53(b) Continuation of International Application No. PCT/JP2022/012734 filed Mar. 18, 2022, which claims priority based on Japanese Patent Application No. 2021-045167 filed Mar. 18, 2021, the respective disclosures of which are incorporated herein by reference in their entirety.

TECHNICAL FIELD

The present disclosure relates to a method for producing a fluororesin, a fluororesin, and an aqueous dispersion.

BACKGROUND ART

Patent Document 1 describes a method for producing modified polytetrafluoroethylene, characterized by that copolymerization of tetrafluoroethylene with a monomer having a polar group is carried out under the condition that the amount of the monomer having a polar group used is 0.150% by mass or less based on the total amount of tetrafluoroethylene supplied to the polymerization system in a dispersion 1 containing a polymer containing a unit based on a non-fluorinated monomer and an aqueous medium.

RELATED ART

Patent Documents

Patent Document 1: International Publication No. WO 2019/208707

SUMMARY

According to the present disclosure, provided is a method for producing a fluororesin, comprising polymerizing a fluorine-containing monomer in the presence of a compound (1) having triple bond and a hydrophilic group and an aqueous medium to produce a fluororesin.

Effects

According to the present disclosure, it is possible to provide a novel production method for producing a fluororesin, a novel fluororesin, and a novel aqueous dispersion containing a fluororesin.

DESCRIPTION OF EMBODIMENTS

Hereinafter, specific embodiments of the present disclosure will be described in detail, but the present disclosure is not limited to the following embodiments.

Before specifically describing the present disclosure, some terms used herein are defined or explained.

The fluororesin as used herein means a partially crystalline fluoropolymer which is a fluoroplastic. The fluororesin has a melting point and has thermoplasticity, and may be either melt-fabricable or non melt-processible.

The melt-fabricable as used herein means that a polymer has an ability to be processed in a molten state using a conventional processing device such as an extruder or an injection molding machine. Thus, a melt-fabricable fluororesin usually has a melt flow rate of 0.01 to 500 g/10 min as measured by the measurement method to be described later.

The polytetrafluoroethylene (PTFE) as used herein is preferably a fluoropolymer having a tetrafluoroethylene unit content of 99 mol % or more based on all polymerization units.

The fluororesin other than polytetrafluoroethylene as used herein is all preferably a fluoropolymer having a tetrafluoroethylene unit content of less than 99 mol % based on all polymerization units.

The content of each of the monomers constituting the fluoropolymer can be calculated herein by any appropriate combination of NMR, FT-IR, elemental analysis, X-ray fluorescence analysis in accordance with the types of the monomers.

Herein, the term "organic group" means a group containing one or more carbon atoms or a group formed by removing one hydrogen atom from an organic compound.

Examples of the "organic group" include:

an alkyl group optionally having one or more substituents;
an alkenyl group optionally having one or more substituents;
an alkynyl group optionally having one or more substituents;
a cycloalkyl group optionally having one or more substituents;
a cycloalkenyl group optionally having one or more substituents;
a cycloalkadienyl group optionally having one or more substituents;
an aryl group optionally having one or more substituents;
an aralkyl group optionally having one or more substituents;
a non-aromatic heterocyclic group optionally having one or more substituents;
a heteroaryl group optionally having one or more substituents;
a cyano group;
a formyl group;
RaO—;
RaCO—;
$RaSO_2$—;
RaCOO—;
RaNRaCO—;
RaCONRa—;
RaOCO—;
$RaOSO_2$—; and
$RaNRbSO_2$— wherein Ra is independently an alkyl group optionally having one or more substituents,
an alkenyl group optionally having one or more substituents,
an alkynyl group optionally having one or more substituents,
a cycloalkyl group optionally having one or more substituents,
a cycloalkenyl group optionally having one or more substituents,
a cycloalkadienyl group optionally having one or more substituents,
an aryl group optionally having one or more substituents,
an aralkyl group optionally having one or more substituents,
a non-aromatic heterocyclic group optionally having one or more substituents, or a heteroaryl group optionally having one or more substituents, and Rb is independently H or an alkyl group optionally having one or more substituents.

The organic group is preferably an alkyl group optionally having one or more substituents.

The term "substituent" as used herein means a group capable of replacing another atom or group. Examples of the "substituent" include an aliphatic group, an aromatic group, a heterocyclic group, an acyl group, an acyloxy group, an acylamino group, an aliphatic oxy group, an aromatic oxy group, a heterocyclic oxy group, an aliphatic oxycarbonyl group, an aromatic oxycarbonyl group, a heterocyclic oxycarbonyl group, a carbamoyl group, an aliphatic sulfonyl group, an aromatic sulfonyl group, a heterocyclic sulfonyl group, an aliphatic sulfonyloxy group, an aromatic sulfonyloxy group, a heterocyclic sulfonyloxy group, a sulfamoyl group, an aliphatic sulfonamide group, an aromatic sulfonamide group, a heterocyclic sulfonamide group, an amino group, an aliphatic amino group, an aromatic amino group, a heterocyclic amino group, an aliphatic oxycarbonylamino group, an aromatic oxycarbonylamino group, a heterocyclic oxycarbonylamino group, an aliphatic sulfinyl group, an aromatic sulfinyl group, an aliphatic thio group, an aromatic thio group, a hydroxy group, a cyano group, a sulfo group, a carboxy group, an aliphatic oxyamino group, an aromatic oxy amino group, a carbamoylamino group, a sulfamoylamino group, a halogen atom, a sulfamoylcarbamoyl group, a carbamoyl sulfamoyl group, a dialiphatic oxyphosphinyl group, and a diaromatic oxyphosphinyl group.

The aliphatic group may be saturated or unsaturated, and may have a hydroxyl group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aliphatic group include alkyl groups having 1 to 8 and preferably 1 to 4 carbon atoms in total, such as a methyl group, an ethyl group, a vinyl group, a cyclohexyl group, and a carbamoylmethyl group.

The aromatic group may have, for example, a nitro group, a halogen atom, an aliphatic oxy group, a carbamoyl group, an aliphatic oxycarbonyl group, an aliphatic thio group, an amino group, an aliphatic amino group, an acylamino group, a carbamoylamino group, or the like. Examples of the aromatic group include aryl groups having 6 to 12 carbon atoms and preferably 6 to 10 carbon atoms in total, such as a phenyl group, a 4-nitrophenyl group, a 4-acetylaminophenyl group, and a 4-methanesulfonylphenyl group.

The heterocyclic group may have a halogen atom, a hydroxy group, an aliphatic oxy group, a carbamoyl group, an aliphatic oxycarbonyl group, an aliphatic thio group, an amino group, an aliphatic amino group, an acylamino group, a carbamoylamino group, or the like. Examples of the heterocyclic group include 5- or 6-membered heterocyclic groups having 2 to 12 and preferably 2 to 10 carbon atoms in total, such as a 2-tetrahydrofuryl group and a 2-pyrimidyl group.

The acyl group may have an aliphatic carbonyl group, an arylcarbonyl group, a heterocyclic carbonyl group, a hydroxy group, a halogen atom, an aromatic group, an aliphatic oxy group, a carbamoyl group, an aliphatic oxycarbonyl group, an aliphatic thio group, an amino group, an aliphatic amino group, an acylamino group, a carbamoylamino group, or the like. Examples of the acyl group include acyl groups having 2 to 8 and preferably 2 to 4 carbon atoms in total, such as an acetyl group, a propanoyl group, a benzoyl group, and a 3-pyridinecarbonyl group.

The acylamino group may have an aliphatic group, an aromatic group, a heterocyclic group, or the like, and may have, for example, an acetylamino group, a benzoylamino group, a 2-pyridinecarbonylamino group, a propanoylamino group, or the like. Examples of the acylamino group include acylamino groups having 2 to 12 and preferably 2 to 8 carbon atoms in total and alkylcarbonylamino groups having 2 to 8 carbon atoms in total, such as an acetylamino group, a benzoylamino group, a 2-pyridinecarbonylamino group, and a propanoylamino group.

The aliphatic oxycarbonyl group may be saturated or unsaturated, and may have a hydroxy group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aliphatic oxycarbonyl group include alkoxycarbonyl groups having 2 to 8 and preferably 2 to 4 carbon atoms in total, such as a methoxycarbonyl group, an ethoxycarbonyl group, and a (t)-butoxycarbonyl group.

The carbamoyl group may have an aliphatic group, an aromatic group, a heterocyclic group, or the like. Examples of the carbamoyl group include an unsubstituted carbamoyl group and alkylcarbamoyl groups having 2 to 9 carbon atoms in total, and preferably an unsubstituted carbamoyl group and alkylcarbamoyl groups having 2 to 5 carbon atoms in total, such as a N-methylcarbamoyl group, a N,N-dimethylcarbamoyl group, and a N-phenylcarbamoyl group.

The aliphatic sulfonyl group may be saturated or unsaturated, and may have a hydroxy group, an aromatic group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aliphatic sulfonyl group include alkylsulfonyl groups having 1 to 6 carbon atoms in total and preferably 1 to 4 carbon atoms in total, such as a methanesulfonyl group.

The aromatic sulfonyl group may have a hydroxy group, an aliphatic group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aromatic sulfonyl group include arylsulfonyl groups having 6 to 10 carbon atoms in total, such as a benzenesulfonyl group.

The amino group may have an aliphatic group, an aromatic group, a heterocyclic group, or the like.

The acylamino group may have, for example, an acetylamino group, a benzoylamino group, a 2-pyridinecarbonylamino group, a propanoylamino group, or the like. Examples of the acylamino group include acylamino groups having 2 to 12 carbon atoms in total and preferably 2 to 8 carbon atoms in total, and more preferably alkylcarbonylamino groups having 2 to 8 carbon atoms in total, such as an acetylamino group, a benzoylamino group, a 2-pyridinecarbonylamino group, and a propanoylamino group.

The aliphatic sulfonamide group, the aromatic sulfonamide group, and the heterocyclic sulfonamide group may be, for example, a methanesulfonamide group, a benzenesulfonamide group, and a 2-pyridinesulfonamide group, respectively.

The sulfamoyl group may have an aliphatic group, an aromatic group, a heterocyclic group, or the like. Examples of the sulfamoyl group include a sulfamoyl group, alkylsulfamoyl groups having 1 to 9 carbon atoms in total, dialkylsulfamoyl groups having 2 to 10 carbon atoms in total, arylsulfamoyl groups having 7 to 13 carbon atoms in total, and heterocyclic sulfamoyl groups having 2 to 12 carbon atoms in total, more preferably a sulfamoyl group, alkylsulfamoyl groups having 1 to 7 carbon atoms in total, dialkylsulfamoyl groups having 3 to 6 carbon atoms in total, arylsulfamoyl groups having 6 to 11 carbon atoms in total, and heterocyclic sulfamoyl groups having 2 to 10 carbon atoms in total, such as a sulfamoyl group, a methylsulfamoyl group, a N,N-dimethylsulfamoyl group, a phenylsulfamoyl group, and a 4-pyridinesulfamoyl group.

The aliphatic oxy group may be saturated or unsaturated, and may have a methoxy group, an ethoxy group, an i-propyloxy group, a cyclohexyloxy group, a methoxyethoxy group, or the like. Examples of the aliphatic oxy group include alkoxy groups having 1 to 8 and preferably 1 to 6 carbon atoms in total, such as a methoxy group, an ethoxy group, an i-propyloxy group, a cyclohexyloxy group, and a methoxyethoxy group.

The aromatic amino group and the heterocyclic amino group may have an aliphatic group, an aliphatic oxy group, a halogen atom, a carbamoyl group, a heterocyclic group having a ring condensed with the aryl group, or an aliphatic oxycarbonyl group, and preferably an aliphatic group having 1 to 4 carbon atoms in total, an aliphatic oxy group having 1 to 4 carbon atoms in total, a halogen atom, a carbamoyl group having 1 to 4 carbon atoms in total, a nitro group, or an aliphatic oxycarbonyl group having 2 to 4 carbon atoms in total.

The aliphatic thio group may be saturated or unsaturated, and examples thereof include alkylthio groups having 1 to 8 carbon atoms in total and more preferably 1 to 6 carbon atoms in total, such as a methylthio group, an ethylthio group, a carbamoylmethylthio group, and a t-butylthio group.

The carbamoylamino group may have an aliphatic group, an aryl group, a heterocyclic group, or the like. Examples of the carbamoylamino group include a carbamoylamino group, alkylcarbamoylamino groups having 2 to 9 carbon atoms in total, dialkylcarbamoylamino groups having 3 to 10 carbon atoms in total, arylcarbamoylamino groups having 7 to 13 carbon atoms in total, and heterocyclic carbamoylamino groups having 3 to 12 carbon atoms in total, and preferably a carbamoylamino group, alkylcarbamoylamino groups having 2 to 7 carbon atoms in total, dialkylcarbamoylamino groups having 3 to 6 carbon atoms in total, arylcarbamoylamino groups having 7 to 11 carbon atoms in total, and heterocyclic carbamoylamino groups having 3 to 10 carbon atoms in total, such as a carbamoylamino group, a methylcarbamoylamino group, a N,N-dimethylcarbamoylamino group, a phenylcarbamoylamino group, and a 4-pyridinecarbamoylamino group.

The range indicated by endpoints as used herein includes all numerical values within the range (for example, the range of 1 to 10 includes 1.4, 1.9, 2.33, 5.75, 9.98, and the like).

The phrase "at least one" as used herein includes all numerical values greater than or equal to 1 (for example, at least 2, at least 4, at least 6, at least 8, at least 10, at least 25, at least 50, at least 100, and the like).

Next, the production method of the present disclosure will be specifically described.

<Method for Producing Fluororesin>

The production method of the present disclosure is a production method for producing a fluororesin, the production method comprising polymerizing a fluorine-containing monomer in the presence of a compound (1) having triple bond and a hydrophilic group and an aqueous medium.

Patent Document 1 describes, as a method for producing modified polytetrafluoroethylene, which is one of fluororesins, a production method using a monomer having a polar group and a carbon-carbon double bond when polymerizing tetrafluoroethylene. Unlike such a conventional production method, in the production method of the present disclosure, a fluorine-containing monomer is polymerized in the presence of a compound (1) having a triple bond and a hydrophilic group.

The compound (1) is a compound having one or more triple bonds and one or more hydrophilic groups in the molecule. The compound (1) has a triple bond, and it is thus conjectured that when used in the above polymerization, the compound (1) reacts with a fluorine-containing monomer at the initial stage of the polymerization reaction to form highly stable particles having a hydrophilic group derived from the compound (1). Therefore, it is considered that the number of particles increases when the polymerization is performed in the presence of the compound (1).

The triple bond is preferably a carbon-carbon triple bond. The number of triple bonds in the compound (1) is preferably 1 to 3, more preferably 1 to 2, and even more preferably 1.

Herein, the hydrophilic group is a group that exhibits affinity for an aqueous medium. Examples of the hydrophilic group include anionic hydrophilic groups, cationic hydrophilic groups, and nonionic hydrophilic groups. For example, the compound (1) may solely contain an anionic hydrophilic group or may solely contain a nonionic hydrophilic group. The compound (1) is preferably a compound (1) having triple bond and an anionic hydrophilic group.

The hydrophilic group is preferably, for example, an anionic hydrophilic group, more preferably —COOM, $—SO_3M$, $—OSO_3M$, $—B(OM)(OR^2)$, $—OB(OM)(OR^2)$, $—PO(OM)(OR^2)$, or $—OPO(OM)(OR^2)$, and even more preferably —COOM. M is H, a metal atom, $NR^3_4$, imidazolium optionally having a substituent, pyridinium optionally having a substituent, or phosphonium optionally having a substituent. $R^3$ is the same or different at each occurrence and is H or an organic group. $R^2$ is H, a metal atom, $NR^3_4$, imidazolium optionally having a substituent, pyridinium optionally having a substituent, phosphonium optionally having a substituent, or an alkynyl group.

M is preferably H, a metal atom, or $NR^3_4$, more preferably H, an alkali metal (Group 1), an alkaline earth metal (Group 2), or $NR^3_4$, even more preferably H, Na, K, Li, or $NH_4$, and particularly preferably H, Na, K, or $NH_4$.

The number of hydrophilic groups in the compound (1) is preferably 1 to 3, and more preferably 1 or 2.

The number of carbon atoms in the compound (1) is preferably 2 to 25, more preferably 2 to 10, even more preferably 2 to 6, and particularly preferably 2 to 4. Herein, the number of carbon atoms in the compound (1) does not include the number of carbon atoms of a carboxylic acid group and a carboxylic acid salt group that may be contained in the compound (1).

The compound (1) is preferably a fluorine atom-free compound.

In the production method of the present disclosure, one or two or more compounds (1) may be used. As the compound (1), a compound having an anionic hydrophilic group may be used singly, a compound having a nonionic hydrophilic group may be used singly, or a compound containing an anionic hydrophilic group and a compound containing a nonionic hydrophilic group may be used in combination.

The compound (1) is preferably a compound (1) represented by the general formula (1):

$$A^1—R^1—C{\equiv}CX^1 \quad \text{General formula (1):}$$

wherein $A^1$ is —COOM, —$SO_3M$, —$OSO_3M$, —B(OM)($OR^2$), —OB(OM)($OR^2$), —PO(OM)($OR^2$), or —OPO(OM)($OR^2$); M is H, a metal atom, $NR^3_4$, imidazolium optionally having a substituent, pyridinium optionally having a substituent, or phosphonium optionally having a substituent; $R^3$ is the same or different at each occurrence and is H or an organic group; $R^2$ is H, a metal atom, $NR^3_4$, imidazolium optionally having a substituent, pyridinium optionally having a substituent, phosphonium optionally having a substituent, or an alkynyl group; $R^1$ is a linking group; and $X^1$ is H, a hydrocarbon group, or $A^1$, and the hydrocarbon group optionally has a halogen atom, an ether bond, an ester bond, or an amide bond.

In the general formula (1), $A^1$ is preferably —COOM.

M in $A^1$ is preferably H, a metal atom, or $NR^3_4$, more preferably H, an alkali metal (Group 1), an alkaline earth metal (Group 2), or $NR^3_4$, even more preferably H, Na, K, Li, or $NH_4$, and particularly preferably H, Na, K, or $NH_4$.

The alkynyl group of $R^2$ is preferably a fluorine atom-free alkynyl group. The alkynyl group of $R^2$ is preferably an ethynyl group optionally substituted with an alkyl group having 1 to 5 carbon atoms, and is more preferably an unsubstituted ethynyl group.

$R^2$ is preferably H, a metal atom, or $NR^3_4$, more preferably H, an alkali metal (Group 1), an alkaline earth metal (Group 2), or $NR^3_4$, even more preferably H, Na, K, Li, or $NH_4$, particularly preferably H, Na, K, or $NH_4$, and most preferably H.

It is also a preferable embodiment that $R^2$ is an ethynyl group when $A^1$ is —PO(OM)($OR^2$) or —OPO(OM)($OR^2$).

In the general formula (1), $R^1$ is a linking group. The linking group may be linear or branched, cyclic or acyclic, saturated or unsaturated, substituted or unsubstituted, and optionally contains one or more heteroatoms selected from the group consisting of sulfur, oxygen, and nitrogen, and optionally contains one or more functional groups selected from the group consisting of ester, amide, sulfonamide, carbonyl, carbonate, urethane, urea, and carbamate. The linking group may be free from carbon atoms and may be a catenary heteroatom such as oxygen, sulfur, or nitrogen.

$R^1$ is preferably a single bond, a catenary heteroatom such as oxygen, sulfur, or nitrogen, or a divalent organic group. When $R^1$ is a divalent organic group, a hydrogen atom bonded to a carbon atom may be replaced with a halogen atom such as chlorine, and the divalent organic group may or may not contain a double bond. Further, $R^1$ may be linear or branched, and may be cyclic or acyclic. $R^1$ may also contain a functional group (e.g., ester, ether, ketone, amine, halide, etc.).

$R^1$ may also be a fluorine atom-free divalent organic group or a partially fluorinated or perfluorinated divalent organic group.

The halogen atom that $R^1$ may contain is preferably Cl, Br, or I. $R^1$ may be, for example, a fluorine atom-free divalent hydrocarbon group, which may contain an oxygen atom, may contain a double bond, or may contain a functional group. Examples of the divalent hydrocarbon group of $R^1$ include a linear or branched alkanediyl group, a linear or branched alkenediyl group, a linear or branched alkadienediyl group, or a cycloalkanediyl group.

$R^1$ is preferably single bond or a divalent hydrocarbon group optionally having Cl, Br, or I, more preferably single bond or a linear or branched alkanediyl group having 1 to 5 carbon atoms and optionally having Cl, Br, or I, even more preferably single bond, methylene group, or ethylene group, particularly preferably single bond or methylene group, and most preferably single bond.

The number of carbon atoms in $R^1$ is preferably 0 to 20, more preferably 0 to 10, even more preferably 0 to 5, and particularly preferably 0 to 3.

In the general formula (1), $X^1$ is H, a hydrocarbon group, or $A^1$. Here, $A^1$ is as described above. The hydrocarbon group of $X^1$ optionally has a halogen atom, an ether bond, an ester bond, or an amide bond.

The halogen atom that $X^1$ may contain is preferably Cl, Br, or I.

The hydrocarbon group of $X^1$ is preferably a fluorine atom-free hydrocarbon group. Examples of the hydrocarbon group of $X^1$ include an alkyl group optionally having an aromatic group or a cycloalkyl group, an alkenyl group optionally having an aromatic group or a cycloalkyl group, a cycloalkyl group optionally having an aromatic group or a cycloalkyl group, and an aromatic group optionally having an alkyl group. The alkyl group of $X^1$ and the alkenyl group of $X^1$ are linear or branched. The cycloalkyl group of $X^1$ and the aromatic group optionally having an alkyl group of $X^1$ are monocyclic or polycyclic.

The number of carbon atoms in the hydrocarbon group of $X^1$ is preferably 1 to 20, more preferably 1 to 10, even more preferably 1 to 5, and particularly preferably 1 to 3.

$X^1$ is preferably H, an alkyl group having 1 to 5 carbon atoms and optionally having Cl, Br, or I, or $A^1$, more preferably H or $A^1$, even more preferably H, —$SO_3M$, or —COOM, and particularly preferably H or —COOM.

When $X^1$ is $A^1$, or that is to say, when $X^1$ is —COOM, —$SO_3M$, —$OSO_3M$, —$B(OM)_2$, —$OB(OM)_2$, —$PO(OM)_2$, or —$OPO(OM)_2$, M is preferably H, a metal atom, or $NR^3_4$, more preferably H, an alkali metal (Group 1), an alkaline earth metal (Group 2), or $NR^3_4$, even more preferably H, Na, K, Li, or $NH_4$, particularly preferably H, Na, K, or $NH_4$, and most preferably H.

Examples of the compound (1) include compounds (1-1) represented by the general formula (1-1):

$$A^1—R^1—C≡C—A^1 \qquad \text{General formula (1-1):}$$

wherein $R^1$ and $A^1$ are as described above and may be the same or different at each occurrence.

The compound (1-1) contains two $A^1$, $A^1$ contains one M, and thus the compound (1-1) contains two M. The compound (1-1) is preferably a compound in which only one of two M is H.

More specific examples of the compound (1-1) include compounds represented by the following general formulas:

$$MOOS—R^1—C≡C—COOM$$

$$MO_3S—R^1—C≡C—SO_3M$$

$$MO_3SO—R^1—C≡C—OSO_3M$$

$$(R^2)\ (MO)\ B—R^1—C≡C—B\ (OM)\ (OR^2)$$

$$(R^2)\ (MO)\ BO—R^1—C≡C—OB\ (OM)\ (OR^2)$$

$$(R^2)\ (MO)\ OP—R^1—C≡C—PO\ (OM)\ (OR^2)$$

$$(R^2O)\ (MO)\ OPO—R^1—C≡C—OPO\ (OM)\ (OR^2)$$

wherein $R^1$, M, and $R^2$ are as described above and may be the same or different at each occurrence.

In particular, the compound (1-1) is preferably a compound (1-1-1) represented by the general formula (1-1-1):

$$MOOC—R^1—C≡C—COOM \qquad \text{General formula (1-1-1):}$$

wherein $R^1$ and M are as described above and may be the same or different at each occurrence.

Examples of the compound (1) include compounds (1-2) represented by the general formula (1-2):

$A^1—R^1—C≡C—R^4$ General formula (1-2):

wherein $A^1$ and $R^1$ are as described above, and $R^4$ is H or a hydrocarbon group optionally having Cl, Br, I, ether bond, ester bond, or amide bond.

In particular, the compound (1-2) is preferably a compound (1-2-1) represented by the general formula (1-2-1):

$MOOC—R^1—C≡C—R^4$ General formula (1-2-1):

wherein $R^1$, $R^4$, and M are as described above and may be the same or different at each occurrence.

Examples of the hydrocarbon group of $R^4$ include an alkyl group optionally having an aromatic group or a cycloalkyl group, an alkenyl group optionally having an aromatic group or a cycloalkyl group, a cycloalkyl group optionally having an aromatic group or a cycloalkyl group, and an aromatic group optionally having an alkyl group. The alkyl group of $R^4$ and the alkenyl group of $R^4$ are linear or branched. The cycloalkyl group of $R^4$ and the aromatic group optionally having an alkyl group of $R^4$ are monocyclic or polycyclic.

The number of carbon atoms in the hydrocarbon group of $R^4$ is preferably 1 to 20, more preferably 1 to 10, even more preferably 1 to 5, and particularly preferably 1 to 3.

$R^4$ is preferably H or an alkyl group having 1 to 20 carbon atoms, more preferably H or an alkyl group having 1 to 10 carbon atoms, even more preferably H or an alkyl group having 1 to 5 carbon atoms, particularly preferably H or an alkyl group having 1 to 3 carbon atoms, and most preferably H.

Examples of the compound (1) include:

acetylenesulfonic acid;
propiolic acid (acetylenemonocarboxylic acid);
ethynyl hydrogen sulfate;
undec-10-ynyl hydrogen sulfate;
but-3-ynyl hydrogen sulfate;
prop-2-ynyl hydrogen sulfate;
pent-4-ynyl hydrogen sulfate;
5-methyl-1-hexyn-3-yl hydrogen sulfate;
ethynylboronic acid;
ethynyl dihydrogen phosphate;
diethynyl hydrogen phosphate;
acetylenedisulfonic acid;
acetylenedicarboxylic acid;
1-propynylsulfonic acid;
2-phenyl-1-ethynylsulfonic acid;
hex-1-yn-1-sulfonic acid;
hexadec-1-yn-1-sulfonic acid;
3,3-dimethyl-1-butinsulfonic acid;
2-cyclopropyl-1-ethynesulfonic acid;
3-methoxy-1-propynylsulfonic acid;
3-phenoxy-1-propynylsulfonic acid;
hept-2-ynoic acid;
6-phenylhex-2-ynoic acid;
3-cyclopropyl-2-propanoic acid;
cyclohexylpropiolic acid;
3-cyclopentyl-2-propynoic acid;
but-2-ynoic acid;
undeca-2,4-dien-6-ynoic acid;
3-(cyclohepta-2,4,6-trien-1-yl)propanoic acid;
6-(fluoren-9-yl)hex-2-ynoic acid;
6-cyclohexyl-hex-2-ynoic acid;
pent-3-ynoic acid;
4-phenyl-3-butynoic acid;
4-(4-methylphenyl)-3-butynoic acid;
4-p-chlorphenyl-3-butynoic acid;
4-p-bromphenyl-3-butynoic acid;
4-(4-fluorophenyl)-3-butynoic acid;
4-[4-(trifluoromethyl)phenyl]-3-butynoic acid;
4-(3-methylphenyl)-3-butynoic acid;
3-cyclopropyl-1-(1-carboxycyclopropyl)-1-propynoic acid;
4-(2-naphthalenyl)-3-butynoic acid;
4-cyclohexyl-3-propynoic acid;
5-phenylpent-1-ynoxyboronic acid;
but-3-en-1-ynoxyboronic acid;
2-phenylethynoxyboronic acid;
2-phenylethynyl phosphate;
acetylenediol;
ethynol; and
salts thereof.

The compound (1) is more preferably propiolic acid (acetylenemonocarboxylic acid), acetylenedicarboxylic acid, and salts thereof (for example, ammonium salt, sodium salt, and potassium salt).

In the polymerization, the presence of at least one of the compounds (1) can efficiently produce a fluororesin. Also, two or more of the compounds encompassed in the compound (1) may be used at the same time, and a compound having a surfactant function other than the compound (1) may also be used at the same time insofar as the compound is volatile or is allowed to remain in a formed article composed of the fluoropolymer or the like.

The amount of the compound (1) when polymerizing the fluorine-containing monomer is preferably 0.001 to 10,000 ppm by mass, more preferably 0.01 ppm by mass or more, even more preferably 0.1 ppm by mass or more, yet even more preferably 0.5 ppm by mass or more, and particularly preferably 1.0 ppm by mass or more, and is more preferably 5,000 ppm by mass or less, even more preferably 1,000 ppm by mass or less, and particularly preferably 500 ppm by mass or less, based on the aqueous medium.

Herein, the amount of the compound (1) is the amount of the compound (1) added to the polymerization system. Accordingly, the amount of the compound (1) can be different from the amount of the compound (1) present in the polymerization system. For example, when the compound (1) is incorporated into a fluororesin chain by being copolymerized with the fluorine-containing monomer, the amount of the compound (1) is the total amount of the compound (1) present in the polymerization system without being incorporated into the fluororesin chain and the compound (1) incorporated into the fluororesin chain.

In the polymerization, the compound (1) may be added all at once, or the compound (1) may be added continuously. Adding the compound (1) continuously means, for example, adding the compound (1) not all at once, but adding over time and without interruption or adding in portions. In the polymerization, an aqueous solution containing the compound (1) and water may be prepared and that aqueous solution may be added.

In the production method of the present disclosure, when to add the compound (1) is not limited, and the compound (1) may be added at any time during the polymerization reaction, and the compound (1) may also be added such that the compound (1) and the polymerization initiator are concomitantly present.

In the production method of the present disclosure, the compound (1) is preferably present in the polymerization system before the solid concentration of the polymer (the fluororesin) produced by the polymerization reaches preferably 1.0% by mass, more preferably before the solid concentration reaches 0.8% by mass, even more preferably before the solid concentration reaches 0.5% by mass, particularly preferably before the solid concentration reaches 0.1% by mass, and most preferably before the solid concentration reaches 0% by mass. By adding the compound (1) to the polymerization system before the polymer is produced by the polymerization or at a time when the amount of the polymer produced by the polymerization is small, the polymerization of the fluorine-containing monomer can proceed smoothly. The solid concentration is the concentration of the polymer (the fluororesin) based on the total amount of the aqueous medium and the polymer.

The most preferable time to add the compound (1) in the production method of the present disclosure is before the solid concentration of the polymer (the fluororesin) produced by the polymerization reaches 0% by mass because the polymerization reaction can be readily controlled. That is to say, in the production method of the present disclosure, the compound (1) is preferably present before the polymerization initiator is present in the polymerization system to initiate the polymerization reaction.

In the production method of the present disclosure, even when the compound (1) is added to the polymerization system before the polymer is produced by the polymerization or at a time when the amount of the polymer produced by the polymerization is small, the compound (1) may be further added to the polymerization system thereafter. When further adding the compound (1), the total amount (the amount added) of the compound (1) is preferably regulated so as to be within the range of the above-described suitable amount of the compound (1).

In the production method of the present disclosure, a fluorine-containing monomer is polymerized in an aqueous medium in the presence of the compound (1). The fluorine-containing monomer preferably has at least one double bond. The fluorine-containing monomer is preferably free from a triple bond. The fluorine-containing monomer is preferably at least one selected from the group consisting of tetrafluoroethylene (TFE), hexafluoropropylene (HFP), chlorotrifluoroethylene (CTFE), vinyl fluoride, vinylidene fluoride (VDF), trifluoroethylene, fluoroalkyl vinyl ether, fluoroalkyl ethylene, fluoroalkyl allyl ether, trifluoropropylene, pentafluoropropylene, trifluorobutene, tetrafluoroisobutene, hexafluoroisobutene, a fluorine-containing monomer represented by the general formula (100): $CHX^{101}{=}CX^{102}Rf^{101}$ (wherein one of $X^{101}$ and $X^{102}$ is H and the other is F, and $Rf^{101}$ is a linear or branched fluoroalkyl group having 1 to 12 carbon atoms), and a fluorinated vinyl heterocyclic compound.

The fluoroalkyl vinyl ether is preferably, for example, at least one selected from the group consisting of:

a fluorine-containing monomer represented by the general formula (110): $CF_2{=}CF—ORf^{111}$ wherein $Rf^{111}$ represents a perfluoro organic group;

a fluorine-containing monomer represented by the general formula (120): $CF_2{=}CF—OCH_2—Rf^{121}$ wherein $Rf^{121}$ is a perfluoroalkyl group having 1 to 5 carbon atoms;

a fluorine-containing monomer represented by the general formula (130): $CF_2{=}CFOCF_2ORf^{131}$ wherein $Rf^{131}$ is a linear or branched perfluoroalkyl group having 1 to 6 carbon atoms, a cyclic perfluoroalkyl group having 5 to 6 carbon atoms, or a linear or branched perfluorooxyalkyl group having 2 to 6 carbon atoms and containing 1 to 3 oxygen atoms;

a fluorine-containing monomer represented by the general formula (140): $CF_2{=}CFO(CF_2CF(Y^{141})O)_m(CF_2)_nF$ wherein $Y^{141}$ represents a fluorine atom or a trifluoromethyl group; m is an integer of 1 to 4; and n is an integer of 1 to 4; and a fluorine-containing monomer represented by the general formula (150): $CF_2{=}CF—O—(CF_2CFY^{151}—O)_n—(CFY^{152})_m\text{-}A^{151}$ wherein $Y^{151}$ represents a fluorine atom, a chlorine atom, a $—SO_2F$ group, or a perfluoroalkyl group; the perfluoroalkyl group optionally contains ether oxygen and a $—SO_2F$ group; n represents an integer of 0 to 3; n $Y^{131}$ are the same as or different from each other; $Y^{152}$ represents a fluorine atom, a chlorine atom, or a $—SO_2F$ group; m represents an integer of 1 to 5; m $Y^{152}$ are the same as or different from each other; $A^{151}$ represents $—SO_2X^{151}$, $—COZ^{151}$, or $—POZ^{152}Z^{153}$; $X^{151}$ represents F, Cl, Br, I, $—OR^{151}$, or $—NR^{152}R^{153}$; $Z^{151}$, $Z^{152}$, and $Z^{153}$ are the same as or different from each other, and each represent $—NR^{154}R^{155}$ or $—OR^{156}$; and $R^{151}$, $R^{152}$, $R^{153}$, $R^{154}$, $R^{155}$, and $R^{156}$ are the same as or different from each other, and each represent H, ammonium, an alkali metal, or an alkyl group, aryl group, or sulfonyl-containing group optionally containing a fluorine atom.

The "perfluoro organic group" as used herein means an organic group in which all hydrogen atoms bonded to the carbon atoms are replaced with fluorine atoms. The perfluoro organic group optionally has ether oxygen.

An example of the fluorine-containing monomer represented by the general formula (110) is a fluorine-containing monomer in which $Rf^{111}$ is a perfluoroalkyl group having 1 to 10 carbon atoms. The perfluoroalkyl group preferably has 1 to 5 carbon atoms.

Examples of the perfluoro organic group in the general formula (110) include a perfluoromethyl group, a perfluoroethyl group, a perfluoropropyl group, a perfluorobutyl group, a perfluoropentyl group, and a perfluorohexyl group.

Examples of the fluorine-containing monomer represented by the general formula (110) further include those represented by the above general formula (110) in which $Rf^{111}$ is a perfluoro(alkoxyalkyl) group having 4 to 9 carbon atoms; those in which $Rf^{111}$ is a group represented by the following formula:

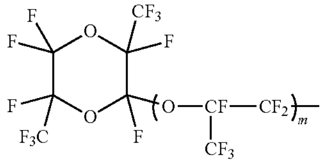

wherein m represents 0 or an integer of 1 to 4; and those in which $Rf^{111}$ is a group represented by the formula: $CF_3CF_2CF_2—(O—CF(CF_3)—CF_2)_n—$, wherein n represents an integer of 1 to 4.

In particular, the fluorine-containing monomer represented by the general formula (110) is preferably a fluorine-containing monomer represented by the general formula (160): $CF_2{=}CF—ORf^{161}$ wherein $Rf^{161}$ represents a perfluoroalkyl group having 1 to 10 carbon atoms. $Rf^{161}$ is preferably a perfluoroalkyl group having 1 to 5 carbon atoms.

The fluoroalkyl vinyl ether is preferably at least one selected from the group consisting of fluorine-containing monomers represented by general formulas (160), (130), and (140).

The fluorine-containing monomer represented by the general formula (160) is preferably at least one selected from the group consisting of perfluoro(methyl vinyl ether), perfluoro (ethyl vinyl ether), and perfluoro(propyl vinyl ether), and is more preferably at least one selected from the group consisting of perfluoro(methyl vinyl ether) and perfluoro(propyl vinyl ether).

The fluorine-containing monomer represented by the general formula (130) is preferably at least one selected from the group consisting of $CF_2{=}CFOCF_2OCF_3$, $CF_2{=}CFOCF_2OCF_2CF_3$, and $CF_2{=}CFOCF_2OCF_2CF_2OCF_3$.

The fluorine-containing monomer represented by the general formula (140) is preferably at least one selected from the group consisting of $CF_2{=}CFOCF_2CF(CF_3)O(CF_2)_3F$, $CF_2{=}CFO(CF_2CF(CF_3)O)_2(CF_2)_3F$, and $CF_2{=}CFO(CF_2CF(CF_3)O)_2(CF_2)_2F$.

The fluorine-containing monomer represented by the general formula (150) is preferably at least one selected from the group consisting of $CF_2{=}CFOCF_2CF_2SO_2F$, $CF_2{=}CFOCF_2CF(CF_3)OCF_2CF_2SO_2F$, $CF_2{=}CFOCF_2CF(CF_2CF_2SO_2F)OCF_2CF_2SO_2F$, and $CF_2{=}CFOCF_2CF(SO_2F)_2$.

The fluorine-containing monomer represented by the general formula (100) is preferably a fluorine-containing monomer in which $Rf^{101}$ is a linear fluoroalkyl group, and is more preferably a fluorine-containing monomer in which $Rf^{101}$ is a linear perfluoroalkyl group. $Rf^{101}$ preferably has 1 to 6 carbon atoms. Examples of the fluorine-containing monomer represented by the general formula (100) include $CH_2{=}CFCF_3$, $CH_2{=}CFCF_2CF_3$, $CH_2{=}CFCF_2CF_2CF_3$, $CH_2{=}CFCF_2CF_2CF_2H$, $CH_2{=}CFCF_2CF_2CF_2CF_3$, $CHF{=}CHCF_3$ (E isomer), and $CHF{=}CHCF_3$ (Z isomer), of which preferred is 2,3,3,3-tetrafluoropropylene represented by $CH_2{=}CFCF_3$.

The fluoroalkyl ethylene is preferably a fluoroalkyl ethylene represented by $$CH_2{=}CH{-}(CF_2)_n{-}X^{171} \quad \text{General formula (170):}$$

(wherein $X^{171}$ is H or F; and n is an integer of 3 to 10), and more preferably at least one selected from the group consisting of $CH_2{=}CH{-}C_4F_9$ and $CH_2{=}CH{-}C_6F_{13}$.

An example of the fluoroalkyl allyl ether is a fluorine-containing monomer represented by $$CF_2{=}CF{-}CF_2{-}ORf^{111} \quad \text{General formula (180)}$$

wherein $Rf^{111}$ represents a perfluoro organic group.

$Rf^{111}$ in the general formula (180) is the same as $Rf^{111}$ in the general formula (110). $Rf^{111}$ is preferably a perfluoroalkyl group having 1 to 10 carbon atoms or a perfluoroalkoxyalkyl group having 1 to 10 carbon atoms. The fluoroalkyl allyl ether represented by the general formula (180) is preferably at least one selected from the group consisting of $CF_2{=}CF{-}CF_2{-}O{-}CF_3$, $CF_2{=}CF{-}CF_2{-}O{-}C_2F_5$, $CF_2{=}CF{-}CF_2{-}O{-}C_3F_7$, and $CF_2{=}CF{-}CF_2{-}O{-}C_4F_9$, more preferably at least one selected from the group consisting of $CF_2{=}CF{-}CF_2{-}O{-}C_2F_5$, $CF_2{=}CF{-}CF_2{-}O{-}C_3F_7$, and $CF_2{=}CF{-}CF_2{-}O{-}C_4F_9$, and even more preferably $CF_2{=}CF{-}CF_2{-}O{-}CF_2CF_2CF_3$.

An example of the fluorinated vinyl heterocyclic compound is a fluorinated vinyl heterocyclic compound represented by the general formula (230):

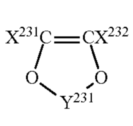

wherein $X^{231}$ and $X^{232}$ are each independently F, Cl, a methoxy group, or a fluorinated methoxy group; and $Y^{231}$ is represented by formula $Y^{232}$ or formula $Y^{233}$:

$$-FC{=}CF- \quad (Y^{232})$$

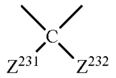

$(Y^{233})$ wherein $Z^{231}$ and $Z^{232}$ are each independently F or a fluorinated alkyl group having 1 to 3 carbon atoms.

In the polymerization, the fluorine-containing monomer may be polymerized with a fluorine-free monomer. The fluorine-free monomer preferably has at least one double bond. The fluorine-free monomer is preferably free from a triple bond. Examples thereof include a hydrocarbon monomer that has reactivity with the fluorine-containing monomer. Examples of the hydrocarbon monomer include alkenes such as ethylene, propylene, butylene, and isobutylene; alkyl vinyl ethers such as ethyl vinyl ether, propyl vinyl ether, butyl vinyl ether, isobutyl vinyl ether, and cyclohexyl vinyl ether; vinyl esters such as vinyl acetate, vinyl propionate, vinyl n-butyrate, vinyl isobutyrate, vinyl valerate, vinyl pivalate, vinyl caproate, vinyl caprylate, vinyl caprate, vinyl versatate, vinyl laurate, vinyl myristate, vinyl palmitate, vinyl stearate, vinyl benzoate, vinyl para-t-butylbenzoate, vinyl cyclohexanecarboxylate, monochlorovinyl acetate, vinyl adipate, vinyl acrylate, vinyl methacrylate, vinyl crotonate, vinyl sorbate, vinyl cinnamate, vinyl undecylenate, vinyl hydroxyacetate, vinyl hydroxypropionate, vinyl hydroxybutyrate, vinyl hydroxyvalerate, vinyl hydroxyisobutyrate, and vinyl hydroxycyclohexanecarboxylate; alkyl allyl ethers such as ethyl allyl ether, propyl allyl ether, butyl allyl ether, isobutyl allyl ether, and cyclohexyl allyl ether; alkyl allyl esters such as ethyl allyl ester, propyl allyl ester, butyl allyl ester, isobutyl allyl ester, and cyclohexyl allyl ester; and (meth)acrylic acid esters such as methyl acrylate, methyl methacrylate, ethyl acrylate, ethyl methacrylate, propyl acrylate, propyl methacrylate, butyl acrylate, butyl methacrylate, hexyl methacrylate, cyclohexyl methacrylate, and vinyl methacrylate.

Alternatively, the fluorine-free monomer may be a functional group-containing hydrocarbon monomer. Examples of the functional group-containing hydrocarbon monomer include hydroxy alkyl vinyl ethers such as hydroxyethyl vinyl ether, hydroxypropyl vinyl ether, hydroxybutyl vinyl ether, hydroxyisobutyl vinyl ether, and hydroxycyclohexyl vinyl ether; fluorine-free monomers having a carboxyl group such as acrylic acid, methacrylic acid, itaconic acid, succinic acid, succinic anhydride, fumaric acid, fumaric anhydride, crotonic acid, maleic acid, maleic anhydride, and perfluorobutenoic acid; fluorine-free monomers having a sulfo group such as vinylsulfonic acid; fluorine-free monomers having a glycidyl group such as glycidyl vinyl ether and glycidyl allyl ether; fluorine-free monomers having an amino group such as aminoalkyl vinyl ether and aminoalkyl allyl ether; fluorine-free monomers having an amide group such as (meth)acrylamide and methylol acrylamide; and fluorine-free monomers having a nitrile group such as acrylonitrile and methacrylonitrile.

In the polymerization, desired fluororesin particles can be obtained by polymerizing one or two or more of the above fluorine-containing monomers. In the production method of the present disclosure, it is preferable that at least tetrafluoroethylene is polymerized as the fluorine-containing monomer. In the production method of the present disclosure, it is also preferable to polymerize only the fluorine-containing monomer without using a fluorine-free monomer (provided that the compound (1) is excluded).

In the polymerization, a compound having a functional group capable of reacting by radical polymerization and a hydrophilic group (provided that the compound (1) is excluded) may be used together with the compound (1). As the compound having a functional group capable of reacting by radical polymerization and a hydrophilic group, the same compound as a modifying monomer (A), which will be described later, can be used.

In the polymerization, in addition to the compound (1) and other compounds having a surfactant function used as necessary, an additive may also be used to stabilize the compounds. Examples of the additive include a buffer, a pH adjuster, a stabilizing aid, and a dispersion stabilizer.

The stabilizing aid is preferably paraffin wax, fluorine-containing oil, a fluorine-containing solvent, silicone oil, or the like. The stabilizing aid may be used alone or in combination of two or more. The stabilizing aid is more preferably paraffin wax. The paraffin wax may be in the form of liquid, semi-solid, or solid at room temperature, and is preferably a saturated hydrocarbon having 12 or more carbon atoms. The paraffin wax usually preferably has a melting point of 40 to 65° C., and more preferably 50 to 65° C.

The amount of the stabilizing aid used is preferably 0.1 to 12% by mass, and more preferably 0.1 to 8% by mass, based on the mass of the aqueous medium used. It is desirable that the stabilizing aid is sufficiently hydrophobic so that the stabilizing aid is completely separated from the aqueous dispersion after polymerization, and does not serve as a contaminating component.

The polymerization can be carried out by charging a polymerization reactor with an aqueous medium, the compound (1), the fluorine-containing monomer, and optionally other additives, stirring the contents of the reactor, maintaining the reactor at a predetermined polymerization temperature, and adding a predetermined amount of a polymerization initiator to thereby initiate the polymerization reaction. After the initiation of the polymerization reaction, the components such as the fluorine-containing monomer, the polymerization initiator, a chain transfer agent, and the compound (1) may additionally be added depending on the purpose.

The polymerization temperature and the polymerization pressure in the polymerization are suitably determined according to the types of the monomers used, the molecular weight of the target fluororesin, and the reaction rate.

The polymerization temperature is preferably 10 to 150° C., more preferably 30° C. or higher, and even more preferably 50° C. or higher, and is more preferably 120° C. or lower, and even more preferably 100° C. or lower.

The polymerization pressure is preferably 0.05 to 10 MPaG, more preferably 0.3 MPaG or higher, and even more preferably 0.5 MPaG or higher, and is more preferably 5.0 MPaG or lower, and even more preferably 3.0 MPaG or lower. In particular, from the viewpoint of improving the yield of fluororesin, the polymerization pressure is preferably 1.0 MPaG or higher, more preferably 1.2 MPaG or higher, even more preferably 1.5 MPaG or higher, particularly preferably 1.8 MPaG or higher, and most preferably 2.0 MPaG or higher.

The polymerization initiator may be any polymerization initiator capable of generating radicals within the polymerization temperature range, and known oil-soluble and/or water-soluble polymerization initiators may be used. The polymerization initiator may be combined with a reducing agent, for example, to form a redox agent, which initiates the polymerization. The concentration of the polymerization initiator is appropriately determined depending on the types of the monomers, the molecular weight of the target fluororesin, and the reaction rate.

The polymerization initiator to be used may be an oil-soluble radical polymerization initiator or a water-soluble radical polymerization initiator.

The oil-soluble radical polymerization initiator may be a known oil-soluble peroxide, and representative examples include dialkyl peroxycarbonates such as diisopropyl peroxydicarbonate and di-sec-butyl peroxydicarbonate; peroxy esters such as t-butyl peroxyisobutyrate and t-butyl peroxypivalate; and dialkyl peroxides such as di-t-butyl peroxide, as well as di[perfluoro (or fluorochloro) acyl] peroxides such as di(ω)-hydro-dodecafluorohexanoyl)peroxide, di(ω)-hydro-tetradecafluoroheptanoyl)peroxide, di(ω)-hydro-hexadecafluorononanoyl)peroxide, di(perfluorobutyryl)peroxide, di(perfluorovaleryl)peroxide, di(perfluorohexanoyl)peroxide, di(perfluoroheptanoyl)peroxide, di(perfluorooctanoyl) peroxide, di(perfluorononanoyl)peroxide, di(ω)-chloro-hexafluorobutyryl)peroxide, di(ω)-chloro-decafluorohexanoyl)peroxide, di(ω)-chloro-tetradecafluorooctanoyl)peroxide, ω-hydro-dodecafluoroheptanoyl-ω-hydrohexadecafluorononanoyl-peroxide, ω-chloro-hexafluorobutyryl-ω-chloro-decafluorohexanoyl-peroxide, ω-hydrododecafluoroheptanoyl-perfluorobutyryl-peroxide, di(dichloropentafluorobutanoyl)peroxide, di(trichlorooctafluorohexanoyl)peroxide, di(tetrachloroundecafluorooctanoyl)peroxide, di(pentachlorotetradecafluorodecanoyl) peroxide, and di(undecachlorodotoriacontafluorodocosanoyl)peroxide.

The water-soluble radical polymerization initiator may be a known water-soluble peroxide, and examples thereof include ammonium salts, potassium salts, and sodium salts of persulfuric acid, perboric acid, perchloric acid, perphosphoric acid, percarbonic acid, and the like, organic peroxides such as disuccinic acid peroxide and diglutaric acid peroxide, t-butyl permaleate, and t-butyl hydroperoxide. A reducing agent such as sulfite may be contained together, and the amount thereof may be 0.1 to 20 times the amount of the peroxide.

For example, in a case where the polymerization is performed at a low temperature of 30° C. or lower, the polymerization initiator used is preferably a redox initiator obtained by combining an oxidizing agent and a reducing agent. Examples of the oxidizing agent include persulfates, organic peroxides, potassium permanganate, manganese triacetate, and ammonium cerium nitrate. Examples of the reducing agent include sulfites, bisulfites, bromates, diimines, and oxalic acid. Examples of the persulfates include ammonium persulfate and potassium persulfate. Examples of the sulfites include sodium sulfite and ammonium sulfite. To increase the decomposition rate of the initiator, preferably a copper salt or an iron salt is also added to the combination of the redox initiator. An example of the copper salt is copper(II) sulfate and an example of the iron salt is iron(II) sulfate.

Examples of the redox initiator include potassium permanganate/oxalic acid, ammonium persulfate/bisulfite/iron sulfate, manganese triacetate/oxalic acid, ammonium cerium nitrate/oxalic acid, and bromate/bisulfite, and potassium permanganate/oxalic acid is preferred. In the case of using a redox initiator, either an oxidizing agent or a reducing agent may be charged into a polymerization tank in advance, followed by adding the other continuously or intermittently thereto to initiate the polymerization. For example, in the case of potassium permanganate/oxalic acid, preferably, oxalic acid is charged into a polymerization tank and potassium permanganate is continuously added thereto.

The amount of the polymerization initiator added is not limited, and the polymerization initiator may be added in an amount that does not significantly decrease the polymerization rate (e.g., a concentration of several ppm in water) or more at once in the initial stage of polymerization, or added successively or continuously. The upper limit is within the range where the reaction temperature is allowed to increase while the polymerization reaction heat is removed through the device surface, and the upper limit is more preferably within the range where the polymerization reaction heat can be removed through the device surface.

The aqueous medium is a reaction medium in which the polymerization is performed, and means a liquid containing water. The aqueous medium may be any medium containing water, and it may be one containing water and, for example, any of fluorine-free organic solvents such as alcohols, ethers, and ketones, and/or fluorine-containing organic solvents having a boiling point of 40° C. or lower.

In the production method of the present disclosure, the pH of the aqueous medium may be adjusted. In the production method of the present disclosure, it is also preferable to polymerize the fluorine-containing monomer in an aqueous medium whose pH has been adjusted. In the production method of the present disclosure, it is also preferable that the pH of the aqueous medium is adjusted at least at the initiation of polymerization.

The pH of the aqueous medium is preferably 4.0 or more, more preferably 4.5 or more, even more preferably 5.0 or more, further preferably 5.5 or more, still further preferably 6.0 or more, particularly preferably 6.5 or more, particularly preferably 7.0 or more, particularly preferably 7.5 or more, and particularly preferably 8.0 or more. The upper limit value of the pH is not limited, but may be, for example, 13.0 or less. From the viewpoint of suppressing corrosion of the polymerization tank, the pH is preferably 12.0 or less, more preferably 11.5 or less, and more preferably 11.0 or less.

The pH can be measured by a pH meter.

The method for adjusting the pH of the aqueous medium is not limited, and examples thereof include a method for adding an alkaline aqueous solution, a method for adding an aqueous dispersion that exhibits alkalinity, and a method for adding a pH adjuster. Further, even in a case where a polymerization initiator that exhibits acidity when dissolved in an aqueous medium is used, the pH can be adjusted by further adding an alkaline compound such as sodium hydroxide.

The alkaline compound may be any compound that dissolves in water and ionizes to produce $OH^-$, and examples thereof include, but are not limited to, hydroxides of alkali metals such as sodium hydroxide or potassium hydroxide; hydroxides of alkaline earth metals; ammonia; and amines. The production method of the present disclosure may include a step of adding an alkaline compound to an aqueous medium.

As the pH adjuster, ammonia, sodium hydroxide, potassium hydroxide, sodium carbonate, potassium carbonate, ammonium carbonate, sodium bicarbonate, potassium bicarbonate, ammonium bicarbonate, sodium phosphate, potassium phosphate, sodium citrate, potassium citrate, ammonium citrate, sodium gluconate, potassium gluconate, ammonium gluconate, or the like can be used.

In the polymerization, known chain transfer agents, radical scavengers, and decomposers may be further added to adjust the polymerization rate and the molecular weight depending on the purpose.

Examples of the chain transfer agent include esters such as dimethyl malonate, diethyl malonate, methyl acetate, ethyl acetate, butyl acetate, and dimethyl succinate, as well as isopentane, methane, ethane, propane, methanol, isopropanol, acetone, various mercaptans, various halogenated hydrocarbons such as carbon tetrachloride, and cyclohexane.

The amount of the chain transfer agent used is usually 1 to 50,000 ppm by mass, preferably 1 to 20,000 ppm by mass, based on the total amount of the fluorine-containing monomer fed.

The chain transfer agent may be added to the reaction vessel at once before the initiation of polymerization, may be added at once after the initiation of polymerization, may be added in multiple portions during the polymerization, or may be added continuously during the polymerization.

As the polymerization initiator, persulfate (such as ammonium persulfate) and organic peroxide such as disuccinic acid peroxide or diglutaric acid peroxide can be used alone or in the form of a mixture thereof. Further, the polymerization initiator may be used together with a reducing agent such as sodium sulfite so as to form a redox system. Moreover, the concentration of radicals in the system can be also regulated by adding a radical scavenger such as hydroquinone or catechol or adding a peroxide decomposer such as ammonium sulfite during the polymerization.

In the polymerization above, the fluororesin may be obtained by polymerizing the fluorine-containing monomer in the aqueous medium in the presence of the compound (1) to produce an aqueous dispersion of fluororesin particles, and by seed-polymerizing the fluorine-containing monomer to the fluororesin particles in the aqueous dispersion of fluororesin particles.

In one embodiment of the production method of the present disclosure, the fluorine-containing monomer is polymerized in the presence of a fluorine-free surfactant (a hydrocarbon surfactant) (provided that the compound (1) is excluded). In one embodiment of the production method of the present disclosure, the fluorine-containing monomer is polymerized in the absence of a fluorine-free surfactant (a hydrocarbon surfactant) (provided that the compound (1) is excluded).

In the polymerization, the fluorine-free surfactant may be added all at once, or the fluorine-free surfactant may be added continuously. Adding the fluorine-free surfactant continuously means, for example, adding the fluorine-free surfactant not all at once, but adding over time and without interruption or adding in portions. In the polymerization, an aqueous solution containing the fluorine-free surfactant and water may be prepared and that aqueous solution may be added.

In the production method of the present disclosure, when to add the fluorine-free surfactant is not limited, and the fluorine-free surfactant may be added at any time during the polymerization reaction.

In the production method of the present disclosure, it is preferable to add the fluorine-free surfactant in the middle of polymerization since the production of by-products can be suppressed and the polymerization can proceed smoothly. When to add the fluorine-free surfactant is preferably before the solid concentration of the polymer (the fluororesin)

produced by the polymerization reaches 8% by mass, more preferably before it reaches 5% by mass, even more preferably before it reaches 3% by mass, yet even more preferably before it reaches 1% by mass, particularly preferably before it reaches 0.5% by mass, and most preferably before it reaches 0.36% by mass. The solid concentration is the concentration of the polymer (the fluororesin) based on the total amount of the aqueous medium and the polymer.

The hydrocarbon surfactant that may be used are, for example, those disclosed in Japanese National Publication of International Patent Application No. 2013/542308, Japanese National Publication of International Patent Application No. 2013/542309, and Japanese National Publication of International Patent Application No. 2013/542310.

The hydrocarbon surfactant may be a surfactant having a hydrophilic moiety and a hydrophobic moiety on the same molecule. These may be cationic, nonionic or anionic. The number of carbon atoms in the hydrocarbon surfactant may be 6 or more, 8 or more, 10 or more, or 12 or more. The hydrocarbon surfactant may be a saturated hydrocarbon surfactant (a saturated compound).

Cationic hydrocarbon surfactants usually have a positively charged hydrophilic moiety such as an alkylated ammonium halide including an alkylated ammonium bromide, and a hydrophobic moiety such as a long chain fatty acid.

Anionic hydrocarbon surfactants usually have a hydrophilic moiety such as a carboxylate, a sulfonate or a sulfate, and a hydrophobic moiety that is a long chain hydrocarbon moiety such as alkyl.

Nonionic hydrocarbon surfactants are usually free from a charged group and have a hydrophobic moiety that is a long chain hydrocarbon. The hydrophilic moiety of the nonionic surfactants contains a water-soluble functional group such as a chain of ethylene ether derived from polymerization with ethylene oxide.

Examples of nonionic hydrocarbon surfactants Polyoxyethylene alkyl ethers, polyoxyethylene alkylphenyl ethers, polyoxyethylene alkyl esters, sorbitan alkyl esters, polyoxyethylene sorbitan alkyl esters, glycerol esters, and derivatives thereof.

Specific examples of polyoxyethylene alkyl ethers: polyoxyethylene lauryl ether, polyoxyethylene cetyl ether, polyoxyethylene stearyl ether, polyoxyethylene oleyl ether, polyoxyethylene behenyl ether, and the like.

Specific examples of polyoxyethylene alkylphenyl ethers: polyoxyethylene nonylphenyl ether, polyoxyethylene octylphenyl ether, and the like.

Specific examples of polyoxyethylene alkyl esters: polyethylene glycol monolaurate, polyethylene glycol monooleate, polyethylene glycol monostearate, and the like.

Specific examples of sorbitan alkyl esters: polyoxyethylene sorbitan monolaurate, polyoxyethylene sorbitan monopalmitate, polyoxyethylene sorbitan monostearate, polyoxyethylene sorbitan monooleate, and the like.

Specific examples of polyoxyethylene sorbitan alkyl esters: polyoxyethylene sorbitan monolaurate, polyoxyethylene sorbitan monopalmitate, polyoxyethylene sorbitan monostearate, and the like.

Specific examples of glycerol esters: glycerol monomyristate, glycerol monostearate, glycerol monooleate, and the like.

Specific examples of the derivatives: polyoxyethylene alkylamine, polyoxyethylene alkyl phenyl-formaldehyde condensate, polyoxyethylene alkyl ether phosphate, and the like.

The ethers and esters may have an HLB value of 10 to 18.

Examples of the nonionic hydrocarbon surfactants include Triton® X series (X15, X45, X100, etc.), Tergitol® 15-S series, Tergitol® TMN series (TMN-6, TMN-10, TMN-100, etc.), and Tergitol® L series manufactured by The Dow Chemical Company, and Pluronic® R series (31R1, 17R2, 10R5, 25R4 (m to 22, n to 23), and Iconol® TDA series (TDA-6, TDA-9, TDA-10) manufactured by BASF SE.

Examples of the anionic hydrocarbon surfactants include Versatic® 10 manufactured by Resolution Performance Products, and Avanel S series (S-70, S-74, etc.) manufactured by BASF SE.

Examples of the hydrocarbon surfactant include an anionic surfactant represented by $R^z$-L-M, wherein $R^Z$ is a linear or branched alkyl group having 1 or more carbon atoms and optionally having a substituent, or a cyclic alkyl group having 3 or more carbon atoms and optionally having a substituent, and optionally contains a monovalent or divalent heterocycle or optionally forms a ring when having 3 or more carbon atoms; L is $—ArSO_3^-$, $—SO_3^-$, $—SO_4—$, $—PO_3^-$, or $—COO^-$; and M is H, a metal atom, $NR^{5Z}_4$, imidazolium optionally having a substituent, pyridinium optionally having a substituent, or phosphonium optionally having a substituent, where $R^{5Z}$ is H or an organic group and $—ArSO_3^-$ is an aryl sulfonate.

Specific examples thereof include a compound represented by $CH_3—(CH_2)_n$-L-M, wherein n is an integer of 6 to 17, and L and M are the same as described above, as represented by lauryl acid and lauryl sulfate (dodecylsulfate).

Mixtures of those in which $R^Z$ is an alkyl group having 12 to 16 carbon atoms and L-M is sulfate can also be used.

Further, examples of other compounds having surfactant function include an anionic surfactant represented by $R^{6Z}$(-L-M)$_2$, wherein $R^{6Z}$ is a linear or branched alkylene group having 1 or more carbon atoms and optionally having a substituent, or a cyclic alkylene group having 3 or more carbon atoms and optionally having a substituent, and optionally contains a monovalent or divalent heterocycle or optionally forms a ring when having 3 or more carbon atoms; L is $—ArSO_3^-$, $—SO_3^-$, $—SO_4—$, $—PO_3^-$, or $—COO^-$; and M is H, a metal atom, $NR^{5Z}_4$, imidazolium optionally having a substituent, pyridinium optionally having a substituent, or phosphonium optionally having a substituent, where $R^{3Z}$ is H or an organic group and $—ArSO_3^-$ is an aryl sulfonate.

Examples of the hydrocarbon surfactant include an anionic surfactant represented by $R^{7Z}$(-L-M)$_3$, wherein $R^{7Z}$ is a linear or branched alkylidine group having 1 or more carbon atoms and optionally having a substituent, or a cyclic alkylidine group having 3 or more carbon atoms and optionally having a substituent, and optionally contains a monovalent or divalent heterocycle or optionally forms a ring when having 3 or more carbon atoms; L is $—ArSO_3^-$, $—SO_3^-$, $—SO_4—$, $—PO_3^-$, or $—COO^-$; and M is H, a metal atom, $NR^{5Z}_4$, imidazolium optionally having a substituent, pyridinium optionally having a substituent, or phosphonium optionally having a substituent, where $R^{3Z}$ is H or an organic group and $—ArSO_3^-$ is an aryl sulfonate.

$R^{5Z}$ is preferably H or an alkyl group, more preferably H or an alkyl group having 1 to 10 carbon atoms, and even more preferably H or an alkyl group having 1 to 4 carbon atoms.

Further, examples of the hydrocarbon surfactant include a siloxane hydrocarbon surfactant. Examples of the siloxane hydrocarbon surfactant include those described in Silicone Surfactants, R. M. Hill, Marcel Dekker, Inc., ISBN: 0-8247-

00104. The structure of the siloxane hydrocarbon surfactant contains distinct hydrophobic and hydrophilic moieties. The hydrophobic moiety contains one or more dihydrocarbyl siloxane units, where the substituents on the silicone atoms are completely hydrocarbon.

In the sense that the carbon atoms of the hydrocarbyl groups are fully substituted with hydrogen atoms where they can be substituted with halogen such as fluorine, such siloxane hydrocarbon surfactants can also be regarded as hydrocarbon surfactants, i.e., the monovalent substituents on the carbon atoms of the hydrocarbyl groups are hydrogen.

The hydrophilic moiety of the siloxane hydrocarbon surfactant may contain one or more polar moieties including ionic groups such as sulfate, sulfonate, phosphonate, phosphate ester, carboxylate, carbonate, sulfosuccinate, taurate (as the free acid, a salt or an ester), phosphine oxide, betaine, betaine copolyol, or quaternary ammonium salt. The ionic hydrophobic moieties may also contain an ionically functionalized siloxane graft.

Examples of such siloxane hydrocarbon surfactants include polydimethylsiloxane-graft-(meth)acrylic acid salts, polydimethylsiloxane-graft-polyacrylate salts, and polydimethylsiloxane-grafted quaternary amines.

The polar moieties of the hydrophilic moiety of the siloxane hydrocarbon surfactant may contain nonionic groups formed by polyethers, such as polyethylene oxide (PEO), and mixed polyethylene oxide/polypropylene oxide polyethers (PEO/PPO); mono- and disaccharides; and water-soluble heterocycles such as pyrrolidinone. The ratio of ethylene oxide to propylene oxide (EO/PO) may be varied in mixed polyethylene oxide/propylene oxide polyethers.

The hydrophilic moiety of the siloxane hydrocarbon surfactant may also contain a combination of ionic and nonionic moieties. Such moieties include, for example, ionically end-functionalized or randomly functionalized polyether or polyol. Preferred for the practice of the present disclosure is a siloxane having a nonionic moiety, i.e., a nonionic siloxane surfactant.

The arrangement of the hydrophobic and hydrophilic moieties of the structure of the siloxane hydrocarbon surfactant may take the form of a diblock polymer (AB), triblock polymer (ABA), wherein the "B" represents the siloxane portion of the molecule, or a multi-block polymer. Alternatively, the siloxane surfactant may include a graft polymer.

The siloxane hydrocarbon surfactant also includes those disclosed in U.S. Pat. No. 6,841,616.

Examples of the siloxane-based anionic hydrocarbon surfactant include Noveon® by Lubrizol Advanced Materials, Inc. and SilSense™ PE-100 silicone and SilSense™ CA-1 silicone available from Consumer Specialties.

Examples of the anionic hydrocarbon surfactant also include a sulfosuccinate surfactant Lankropol® K8300 by Akzo Nobel Surface Chemistry LLC.

Examples of the sulfosuccinate surfactant include sodium diisodecyl sulfosuccinate (Emulsogen® SB10 by Clariant) and sodium diisotridecyl sulfosuccinate (Polirol® TR/LNA by Cesapinia Chemicals).

Examples of the hydrocarbon surfactants also include PolyFox® surfactants by Omnova Solutions, Inc. (PolyFox™ PF-156A, PolyFox™ PF-136A, etc.).

The hydrocarbon surfactant is preferably an anionic hydrocarbon surfactant. The anionic hydrocarbon surfactant used may be those described above, including the following preferred anionic hydrocarbon surfactants.

Examples of the anionic hydrocarbon surfactant includes a compound (α) represented by the following formula (α):

$$R^{100}\text{—COOM} \quad (\alpha)$$

wherein $R^{100}$ is a monovalent organic group containing one or more carbon atoms; and M is H, a metal atom, $NR^{101}_4$, imidazolium optionally having a substituent, pyridinium optionally having a substituent, or phosphonium optionally having a substituent, where $R^{101}$ is H or an organic group and may be the same or different. The organic group of $R^{101}$ is preferably an alkyl group. $R^{101}$ is preferably H or an organic group having 1 to 10 carbon atoms, more preferably H or an organic group having 1 to 4 carbon atoms, and even more preferably H or an alkyl group having 1 to 4 carbon atoms.

From the viewpoint of surfactant function, the number of carbon atoms in $R^{100}$ is preferably 2 or more, and more preferably 3 or more. From the viewpoint of water solubility, the number of carbon atoms in $R^{100}$ is preferably 29 or less, and more preferably 23 or less.

Examples of the metal atom of M include alkali metals (Group 1) and alkaline earth metals (Group 2), and preferred is Na, K, or Li. M is preferably H, a metal atom, or $NR^{101}_4$, more preferably H, an alkali metal (Group 1), an alkaline earth metal (Group 2), or $NR^{101}_4$, even more preferably H, Na, K, Li, or $NH_4$, further preferably Na, K, or $NH_4$, particularly preferably Na or $NH_4$, and most preferably $NH_4$.

Examples of the compound (α) include an anionic surfactant represented by $R^{102}$—COOM, wherein $R^{102}$ is a linear or branched, alkyl group, alkenyl group, alkylene group, or alkenylene group having 1 or more carbon atoms and optionally having a substituent, or a cyclic alkyl group, alkenyl group, alkylene group, or alkenylene group having 3 or more carbon atoms and optionally having a substituent, each of which optionally contains an ether bond; when having 3 or more carbon atoms, $R^{102}$ optionally contains a monovalent or divalent heterocycle, or optionally forms a ring; and M is the same as described above. Specific examples thereof include a compound represented by $CH_3$—$(CH_2)_n$—COOM, wherein n is an integer of 2 to 28, and M is the same as described above.

From the viewpoint of emulsion stability, the compound (α) may be preferably free from a carbonyl group which is not in a carboxyl group.

Preferred examples of the hydrocarbon-containing surfactant free from a carbonyl group include a compound of the following formula (A):

$$R^{103}\text{—COO-M} \quad (A)$$

wherein $R^{103}$ is an alkyl group, an alkenyl group, an alkylene group, or an alkenylene group, each of which optionally contains an ether bond; M is H, a metal atom, $NR^{101}_4$, imidazolium optionally having a substituent, pyridinium optionally having a substituent, or phosphonium optionally having a substituent; and $R^{101}$ is the same or different and is H or an organic group.

In formula (A), $R^{103}$ is preferably an alkyl group or an alkenyl group, each of which optionally contains an ether group. The alkyl group or alkenyl group for $R^{103}$ may be linear or branched. The number of carbon atoms in $R^{103}$ is, but not limited to, 2 to 29.

When the alkyl group is linear, the number of carbon atoms in $R^{103}$ is preferably 3 to 29, and more preferably 5 to 23. When the alkyl group is branched, the number of carbon atoms in $R^{103}$ is preferably 5 to 35, and more preferably 11 to 23.

When the alkenyl group is linear, the number of carbon atoms in $R^{103}$ is preferably 2 to 29, and more preferably 9 to 23. When the alkenyl group is branched, the number of carbon atoms in $R^{103}$ is preferably 4 to 29, and more preferably 9 to 23.

Examples of the alkyl group and the alkenyl group include a methyl group, an ethyl group, an isobutyl group, a t-butyl group, and a vinyl group.

Examples of the compound (α) (carboxylic acid-type hydrocarbon surfactant) include butylic acid, valeric acid, caproic acid, enanthic acid, caprylic acid, pelargonic acid, capric acid, lauric acid, myristic acid, pentadecylic acid, palmitic acid, palmitoleic acid, margaric acid, stearic acid, oleic acid, vaccenic acid, linoleic acid, (9,12,15)-linolenic acid, (6,9,12)linolenic acid, eleostearic acid, arachidic acid, 8,11-eicosadienoic acid, mead acid, arachidonic acid, behenic acid, lignoceric acid, nervonic acid, cerotic acid, montanic acid, melissic acid, crotonic acid, myristoleic acid, palmitoleic acid, sapienoic acid, oleic acid, elaidic acid, vaccenic acid, gadoleic acid, eicosenoic acid, erucic acid, nervonic acid, linoleic acid, eicosadienoic acid, docosadienoic acid, linolenic acid, pinolenic acid, α-eleostearic acid, β-eleostearic acid, mead acid, dihomo-γ-linolenic acid, eicosatrienoic acid, stearidonic acid, arachidonic acid, eicosatetraenoic acid, adrenic acid, boseopentaenoic acid, eicosapentaenoic acid, osbond acid, sardine acid, tetracosapentaenoic acid, docosahexaenoic acid, nisinic acid, and salts thereof.

Particularly, preferred is at least one selected from the group consisting of lauric acid, capric acid, myristic acid, pentadecylic acid, palmitic acid, and salts thereof.

Examples of the salts include, but are not limited to, those in which hydrogen of the carboxyl group is a metal atom, $NR^{101}_4$, imidazolium optionally having a substituent, pyridinium optionally having a substituent, or phosphonium optionally having a substituent as M in the formula described above.

The surfactant (α) (carboxylic acid-type hydrocarbon surfactant) is preferably at least one selected from the group consisting of lauric acid, capric acid, myristic acid, pentadecylic acid, palmitic acid, and salts thereof, and even more preferably lauric acid and salts thereof, particularly preferably lauric acid salts, and most preferably sodium laurate and ammonium laurate.

Examples of the hydrocarbon surfactant may also include the surfactants described in International Publication No. WO 2018/062448, International Publication No. WO 2018/181898, International Publication No. WO 2018/062449, International Publication No. WO 2018/062450, International Publication No. WO 2018/181904, International Publication No. WO 2018/181906, and International Publication No. WO 2018/013635.

In the production method of the present disclosure, two or more of the hydrocarbon surfactants may be used at the same time.

Examples of the hydrocarbon surfactant also include a hydrocarbon surfactant obtained by subjecting a hydrocarbon surfactant to radical treatment or oxidation treatment. By using the hydrocarbon surfactant on which the radical treatment or oxidation treatment has been carried out, primary particles having a small average primary particle size and aspect ratio can be easily obtained, whereby polymerization of the fluorine-containing monomer in the aqueous medium proceeds smoothly and the fluororesin can be easily produced.

The radical treatment may be any treatment in which radicals act on the hydrocarbon surfactant, for example, a treatment in which deionized water and the hydrocarbon surfactant are added to the reactor, the reactor is hermetically sealed, the inside of the reactor is replaced with nitrogen, the reactor is heated and pressurized, then a polymerization initiator is charged, the reactor is stirred for a certain time, and then the reactor is depressurized to the atmospheric pressure, and the reactor is cooled. The oxidation treatment is a treatment in which an oxidizing agent acts on the carboxylic acid-type hydrocarbon surfactant. Examples of the oxidizing agent include oxygen, ozone, hydrogen peroxide solution, manganese(IV) oxide, potassium permanganate, potassium dichromate, nitric acid, and sulfur dioxide.

The hydrocarbon surfactant used in the production method of the present disclosure is also preferably a carboxylic acid-type hydrocarbon surfactant. Carboxylic acid-type hydrocarbon surfactants tend to have a shorter coagulation completion time than sulfate surfactants. However, according to the production method of the present disclosure, an aqueous dispersion having a long coagulation completion time can be produced even when a carboxylic acid-type hydrocarbon surfactant is used.

The carboxylic acid-type hydrocarbon surfactant is usually an anionic hydrocarbon surfactant having a hydrophilic moiety formed of carboxylate and a hydrophobic moiety that is a long chain hydrocarbon moiety such as alkyl. In particular, the carboxylic acid-type hydrocarbon surfactant is not limited as long as it has a carboxyl group (—COOH) or a group in which the hydrogen atom of the carboxyl group is substituted with an inorganic cation (for example, metal atoms, ammonium, etc.), and for example, a hydrocarbon surfactant having a carboxyl group or a group in which the hydrogen atom of the carboxyl group is substituted with an inorganic cation can be used from among the hydrocarbon surfactants described above.

The carboxylic acid-type hydrocarbon surfactant may be an aliphatic-type carboxylic acid-type hydrocarbon surfactant or a carboxylic acid-type hydrocarbon surfactant other than the aliphatic-type.

In the present disclosure, the term "aliphatic-type carboxylic acid-type hydrocarbon surfactant" means a carboxylic acid type hydrocarbon surfactant free from a carbonyl group which is not in a carboxyl group or an ester group.

The ester group means a group represented by —COO— or —OCO—.

The carboxylic acid-type hydrocarbon surfactant used may be, for example, a hydrocarbon surfactant having a carboxyl group or a group in which the hydrogen atom of the carboxyl group is replaced with an inorganic cation among the hydrocarbon surfactants described above.

The carboxylic acid-type hydrocarbon surfactant is preferably at least one selected from the group consisting of a surfactant having a carboxyl group (—COOH) or a group in which the hydrogen atom of the carboxyl group is replaced with an inorganic cation (for example, metal atoms, ammonium, etc.) among the anionic surfactant represented by the formula: $R^{6Z}(\text{-L-M})_2$ and the anionic surfactant represented by the formula: $R^{7Z}(\text{-L-M})_3$, the compound (α), and those obtained by carrying out radical treatment or oxidation treatment on these surfactants. The carboxylic acid-type hydrocarbon surfactant may be used alone or in a mixture of two or more.

The compound (α) includes not only the anionic hydrocarbon surfactant represented by the formula: $R^{100}$—COOM (wherein $R^{100}$ and M are the same as described above) (preferably, the compound represented by formula (A)), but also those having a carboxyl group (—COOH) or a group in which the hydrogen atom of the carboxyl group is replaced with an inorganic cation (for example, metal atoms, ammonium, etc.) among the anionic surfactant represented by the formula: $R^z$-L-M (wherein $R^z$, L, and M are the same as described above).

The carboxylic acid-type hydrocarbon surfactant is preferably the compound (α), and even more preferably at least one selected from the group consisting of the compound represented by formula (A) and those obtained by carrying out radical treatment or oxidation treatment on that compound.

In particular, as the carboxylic acid-type hydrocarbon surfactant, preferred is at least one selected from the group consisting of lauric acid, capric acid, myristic acid, pentadecylic acid, palmitic acid, and salts thereof, as well as those obtained by carrying out radical treatment or oxidation treatment on these compounds, more preferred is at least one selected from the group consisting of lauric acid and salts thereof, as well as those obtained by carrying out radical treatment or oxidation treatment on these compounds, even more preferred is at least one selected from the group consisting of lauric acid salts and those obtained by carrying out radical treatment or oxidation treatment on them, and even more preferred is at least one selected from the group consisting of ammonium laurate, sodium laurate, and those obtained by carrying out radical treatment or oxidation treatment on them. Examples of the salts include, but are not limited to, those in which hydrogen of the carboxyl group is a metal atom, $NR^{101}_4$, imidazolium optionally having a substituent, pyridinium optionally having a substituent, or phosphonium optionally having a substituent as M in the formula described above.

In one embodiment of the production method of the present disclosure, the fluorine-containing monomer is polymerized substantially in the absence of a fluorine-containing surfactant (provided that the compound (1) and a modifying monomer (A) are excluded). In one embodiment of the production method of the present disclosure, the fluorine-containing monomer is polymerized in the presence of a fluorine-containing surfactant (provided that the compound (1) and a modifying monomer (A) are excluded).

Conventionally, fluorine-containing surfactants have been used for the polymerization of fluorine-containing monomers in an aqueous medium, but the production method of the present disclosure allows for obtaining a fluororesin even without using the fluorine-containing surfactants.

In the present disclosure, the expression "substantially in the absence of a fluorine-containing surfactant" means that the amount of the fluorine-containing surfactant is 10 ppm by mass or less based on the aqueous medium. The amount of the fluorine-containing surfactant based on the aqueous medium is preferably 1 ppm by mass or less, more preferably 100 ppb by mass or less, 25 ppb by mass or less, even more preferably 10 ppb by mass or less, and further preferably 1 ppb by mass or less.

Examples of the fluorine-containing surfactant include an anionic fluorine-containing surfactant. The anionic fluorine-containing surfactant may be, for example, a fluorine atom-containing surfactant having 20 or less carbon atoms in total in the portion excluding the anionic group.

The fluorine-containing surfactant may also be a fluorine-containing surfactant in which the molecular weight of the anionic moiety is 800 or less.

The "anionic moiety" means a portion of the fluorine-containing surfactant excluding the cation. For example, in the case of $F(CF_2)_{n1}COOM$ represented by formula (I) described later, the anionic moiety is the "$F(CF_2)_{n1}COO$" portion.

Examples of the fluorine-containing surfactant include fluorine-containing surfactants having a Log POW of 3.5 or less. The Log POW is a partition coefficient between 1-octanol and water, which is represented by Log P (wherein P is the ratio between the concentration of the fluorine-containing surfactant in octanol and the concentration of the fluorine-containing surfactant in water in a phase-separated octanol/water (1:1) liquid mixture containing the fluorine-containing surfactant).

The Log POW is calculated by performing HPLC on standard substances (heptanoic acid, octanoic acid, nonanoic acid, and decanoic acid) having a known octanol/water partition coefficient under conditions having column: TOSOH ODS-120T column (φ4.6 mm×250 mm, manufactured by Tosoh Corporation), eluent: acetonitrile/0.6 mass % $HClO_4$ solution=1/1 (vol/vol %), flow rate: 1.0 ml/min, sample volume: 300 μL, column temperature: 40° C., detection light: UV210 nm to construct a calibration curve concerning each elution time and known octanol/water partition coefficient, and determining it from the HPLC elution time of a sample liquid based on the calibration curve.

Specific examples of the fluorine-containing surfactant include those described in U.S. Patent Application Publication No. 2007/0015864, U.S. Patent Application Publication No. 2007/0015865, U.S. Patent Application Publication No. 2007/0015866, U.S. Patent Application Publication No. 2007/0276103, U.S. Patent Application Publication No. 2007/0117914, U.S. Patent Application Publication No. 2007/142541, U.S. Patent Application Publication No. 2008/0015319, U.S. Pat. Nos. 3,250,808, 3,271,341, Japanese Patent Laid-Open No. 2003-119204, International Publication No. WO 2005/042593, International Publication No. WO 2008/060461, International Publication No. WO 2007/046377, Japanese Patent Laid-Open No. 2007-119526, International Publication No. WO 2007/046482, International Publication No. WO 2007/046345, U.S. Patent Application Publication No. 2014/0228531, International Publication No. WO 2013/189824, and International Publication No. WO 2013/189826.

The anionic fluorine-containing surfactant may be a compound represented by the following general formula ($N^0$):

$$X^{n0}—Rf^{n0}—Y^0 \qquad (N^0)$$

wherein $X^{n0}$ is H, Cl, or F; $Rf^{n0}$ is an alkylene group that has 3 to 20 carbon atoms, that is linear, branched, or cyclic, and H of which is partially or entirely replaced with F, the alkylene group may contain one or more ether bonds, and H may be partially replaced with Cl; and $Y^0$ is an anionic group.

The anionic group $Y^0$ may be —COOM, —$SO_2M$, or —$SO_3M$, and may be —COOM or —$SO_3M$.

M is H, a metal atom, $NR^7_4$, imidazolium optionally having a substituent, pyridinium optionally having a substituent, or phosphonium optionally having a substituent, and $R^7$ is H or an organic group.

Examples of the metal atom include alkali metals (Group 1) and alkaline earth metals (Group 2), such as Na, K, or Li.

$R^7$ may be H or a $C_{1-10}$ organic group, may be H or a $C_{1-4}$ organic group, and may be H or a $C_{1-4}$ alkyl group.

M may be H, a metal atom, or $NR^7_4$, may be H, an alkali metal (Group 1), an alkaline earth metal (Group 2), or $NR^7_4$, and may be H, Na, K, Li, or $NH_4$.

In $Rf^{n0}$, 50% or more of H may be replaced with fluorine.

Examples of the compound represented by the general formula ($N^0$) may be a compound represented by the following general formula ($N^1$):

$$X^{n0}—(CF_2)_{m1}—Y^0 \quad (N^1)$$

(wherein $X^{n0}$ is H, Cl, or F, m1 is an integer of 3 to 15, and $Y^0$ is as defined above); a compound represented by the following general formula ($N^2$):

$$Rf^{n1}—O—(CF(CF_3)CF_2O)_{m2}CFX^{n1}—Y^0 \quad (N^2)$$

(wherein $Rf^{n1}$ is a perfluoroalkyl group having 1 to 5 carbon atoms, m2 is an integer of 0 to 3, $X^{n1}$ is F or $CF_3$, and $Y^0$ is as defined above); a compound represented by the following general formula ($N^3$):

$$Rf^{n2}(CH_2)_{m3}—(Rf^{n3})_q—Y^0 \quad (N^3)$$

(wherein $Rf^{n2}$ is a partially or fully fluorinated alkyl group having 1 to 13 carbon atoms and optionally containing an ether bond and/or a chlorine atom, m3 is an integer of 1 to 3, $Rf^{n3}$ is a linear or branched perfluoroalkylene group having 1 to 3 carbon atoms, q is 0 or 1, and $Y^0$ is as defined above); a compound represented by the following general formula ($N^4$):

$$Rf^{n4}—O—(CY^{n1}Y^{n2})_pCF_2—Y^0 \quad (N^4)$$

(wherein $Rf^{n4}$ is a linear or branched partially or fully fluorinated alkyl group having 1 to 12 carbon atoms and optionally containing an ether bond, $Y^{n1}$ and $Y^{n2}$ are the same or different and are each H or F, p is 0 or 1, and $Y^0$ is as defined above); and a compound represented by the general formula ($N^5$).

($N^5$)

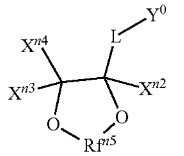

(wherein $X^{n2}$, $X^{n3}$, and $X^{n4}$ may be the same or different and are each H, F, or a linear or branched partially or fully fluorinated alkyl group having 1 to 6 carbon atoms and optionally containing an ether bond; $Rf^{n5}$ is a linear or branched partially or fully fluorinated alkylene group having 1 to 3 carbon atoms and optionally containing an ether bond; L is a linking group; and $Y^0$ is as defined above, with the proviso that the total carbon number of $X^{n2}$, $X^{n3}$, $X^{n4}$, and $Rf^{n5}$ is 18 or less).

More specific examples of the compound represented by the general formula ($N^0$) include a perfluorocarboxylic acid (I) represented by the following general formula (I), an ω-H perfluorocarboxylic acid (II) represented by the following general formula (II), a perfluoropolyethercarboxylic acid (III) represented by the following general formula (III), a perfluoroalkylalkylenecarboxylic acid (IV) represented by the following general formula (IV), a perfluoroalkoxyfluorocarboxylic acid (V) represented by the following general formula (V), a perfluoroalkylsulfonic acid (VI) represented by the following general formula (VI), an ω-H perfluorosulfonic acid (VII) represented by the following general formula (VII), a perfluoroalkylalkylene sulfonic acid (VIII) represented by the following general formula (VIII), an alkylalkylene carboxylic acid (IX) represented by the following general formula (IX), a fluorocarboxylic acid (X) represented by the following general formula (X), an alkoxyfluorosulfonic acid (XI) represented by the following general formula (XI), a compound (XII) represented by the following general formula (XII), and a compound (XIII) represented by the following general formula (XIII).

The perfluorocarboxylic acid (I) is represented by the following general formula (I):

$$F(C_2)_{n1}COOM \quad (I)$$

wherein n1 is an integer of 3 to 14; and M is H, a metal atom, $NR^7_4$, imidazolium optionally having a substituent, pyridinium optionally having a substituent, or phosphonium optionally having a substituent, and $R^7$ is H or an organic group.

The ω-H perfluorocarboxylic acid (II) is represented by the following general formula (II):

$$H(CF_2)_{n2}COOM \quad (II)$$

wherein n2 is an integer of 4 to 15; and M is as defined above.

The perfluoropolyethercarboxylic acid (III) is represented by the following general formula (III):

$$Rf^1—O—(CF(CF_3)CF_2O_{n3}CF(CF_3COOM \quad (III)$$

wherein $Rf^1$ is a perfluoroalkyl group having 1 to 5 carbon atoms; n3 is an integer of 0 to 3; and M is as defined above.

The perfluoroalkylalkylenecarboxylic acid (IV) is represented by the following general formula (IV):

$$Rf^2(CH_2)_{n4}Rf^3COOM \quad (IV)$$

wherein $Rf^2$ is a perfluoroalkyl group having 1 to 5 carbon atoms; $Rf^3$ is a linear or branched perfluoroalkylene group having 1 to 3 carbon atoms; n4 is an integer of 1 to 3; and M is as defined above.

The alkoxyfluorocarboxylic acid (V) is represented by the following general formula (V):

$$Rf^4—O—CY^1Y^2CF_2—COOM \quad (V)$$

wherein $Rf^4$ is a linear or branched partially or fully fluorinated alkyl group having 1 to 12 carbon atoms and optionally containing an ether bond and/or a chlorine atom; $Y^1$ and $Y^2$ are the same or different and are each H or F; and M is as defined above.

The perfluoroalkylsulfonic acid (VI) is represented by the following general formula (VI):

$$F(CF_2)_{n5}SO_3M \quad (VI)$$

wherein n5 is an integer of 3 to 14; and M is as defined above.

The ω-H perfluorosulfonic acid (VII) is represented by the following general formula (VII):

$$H(CF_2)_{n6}SO_3M \quad (VII)$$

wherein n6 is an integer of 4 to 14; and M is as defined above.

The perfluoroalkylalkylenesulfonic acid (VIII) is represented by the following general formula (VIII):

$$Rf^5(CH_2)_{n7}SO_3M \quad (VIII)$$

wherein $Rf^5$ is a perfluoroalkyl group having 1 to 13 carbon atoms; n7 is an integer of 1 to 3; and M is as defined above.

The alkylalkylenecarboxylic acid (IX) is represented by the following general formula (IX):

$$Rf^6(CH_2)_{n8}COOM \quad (IX)$$

wherein $Rf^6$ is a linear or branched partially or fully fluorinated alkyl group having 1 to 13 carbon atoms and optionally containing an ether bond; n8 is an integer of 1 to 3; and M is as defined above.

The fluorocarboxylic acid (X) is represented by the following general formula (X):

$$Rf—O—Rf^8—O—CF_2—COOM \quad (X)$$

wherein $Rf^7$ is a linear or branched partially or fully fluorinated alkyl group having 1 to 6 carbon atoms and optionally containing an ether bond and/or a chlorine atom; $Rf^8$ is a linear or branched partially or fully fluorinated alkyl group having 1 to 6 carbon atoms; and M is as defined above.

The alkoxyfluorosulfonic acid (XI) is represented by the following general formula (XI):

$$Rf^9—O—CY^1Y^2CF_2—SO_3M \quad (XI)$$

wherein $Rf^9$ is a linear or branched partially or fully fluorinated alkyl group having 1 to 12 carbon atoms, optionally containing chlorine, and optionally containing an ether bond; $Y^1$ and $Y^2$ are the same or different and are each H or F; and M is as defined above.

The compound (XII) is represented by the following general formula (XII):

(XII)

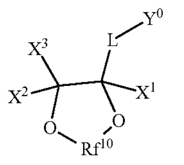

wherein $X^1$, $X^2$, and $X^3$ may be the same or different and are H, F, or a linear or branched partially or fully fluorinated alkyl group having 1 to 6 carbon atoms and optionally containing an ether bond; $Rf^{10}$ is a perfluoroalkylene group having 1 to 3 carbon atoms; L is a linking group; and $Y^0$ is an anionic group.

$Y^0$ may be —COOM, —$SO_2M$, or —$SO_3M$, and may be —$SO_3M$ or COOM, wherein M is as defined above.

Examples of L include a single bond, and a partially or fully fluorinated alkylene group having 1 to 10 carbon atoms and optionally containing an ether bond.

The compound (XIII) is represented by the following general formula (XIII):

$$Rf^{11}—O—(CF_2CF(CF_3)O)_{n9}(CF_2O)_{n10}CF_2COOM \quad (XIII)$$

wherein $Rf^{11}$ is a fluoroalkyl group having 1 to 5 carbon atoms and containing chlorine; n9 is an integer of 0 to 3; n10 is an integer of 0 to 3; and M is as defined above. Examples of the compound (XIII) include $CF_2ClO(CF_2CF(CF_3)O)_{n9}(CF_2O)_{n10}CF_2COONH_4$ (a mixture having an average molecular weight of 750, n9 and n10 in the formula are as defined above).

As described above, examples of the anionic fluorine-containing surfactant include a carboxylic acid-based surfactant and a sulfonic acid-based surfactant.

The fluorine-containing surfactant may be one fluorine-containing surfactant, or may be a mixture containing two or more fluorine-containing surfactants.

Examples of the fluorine-containing surfactant include compounds represented by the following formulas. The fluorine-containing surfactant may be a mixture of these compounds. In one embodiment of the polymerization, the fluorine-containing monomer is polymerized substantially in the absence of the compounds represented by the following formulas:

$F(CF_2)_7COOM$;

$F(CF_2)_5COOM$;

$H(CF_2)_6COOM$;

$H(CF_2)_7COOM$;

$CF_3O(CF_2)_3OCHFCF_2COOM$;

$C_3F_7OCF(CF_3)CF_2OCF(CF_3)COOM$;

$CF_3CF_2CF_2OCF(CF_3)COOM$;

$CF_3CF_2OCF_2CF_2OCF_2COOM$;

$C_2F_5OCF(CF_3)CF_2OCF(CF_3)COOM$;

$CF_3OCF(CF_3)CF_2OCF(CF_3)COOM$;

$CF_2ClCF_2CF_2OCF(CF_3)CF_2OCF_2COOM$;

$CF_2ClCF_2CF_2OCF_2CF(CF_3)OCF_2COOM$;

$CF_2ClCF(CF_3)OCF(CF_3)CF_2OCF_2COOM$; and $CF_2ClCF(CF_3)OCF_2CF(CF_3)OCF_2COOM$,

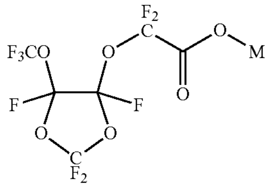

wherein M is H, a metal atom, $NR^7_4$, imidazolium optionally having a substituent, pyridinium optionally having a substituent, or phosphonium optionally having a substituent, and $R^7$ is H or an organic group.

In the production method of the present disclosure, the fluorine-containing monomer may be polymerized in the presence of a nucleating agent.

It can be said that the polymerization started when the gas monomer in the reactor became a polymer and the pressure drop in the reactor occurred. U.S. Pat. No. 3,391,099 (Punderson) discloses a dispersion polymerization of TFE in an aqueous medium comprising two separate steps of a polymerization process comprising: first the formation of a polymer nucleus as a nucleation site, and then the growth step comprising polymerization of the established particles. The polymerization is usually started when both the monomer to be polymerized and the polymerization initiator are charged in the reactor. In the present disclosure, an additive related to the formation of a nucleation site is referred to as a nucleating agent.

The nucleating agent to be used in the production method of the present disclosure is preferably at least one selected from the group consisting of a fluoropolyether, a nonionic surfactant, and a chain transfer agent because more particles can be generated during the polymerization.

In addition, as the nucleating agent to be used in the production method of the present disclosure, a chain transfer agent is more preferred, and a chain transfer agent and one or both of a nonionic surfactant and a fluoropolyether are even more preferred because more particles can be generated during the polymerization and, also, primary particles having a smaller average primary particle size and a smaller aspect ratio can be obtained. When a chain transfer agent and one or both of a nonionic surfactant and a fluoropolyether are used as the nucleating agent, the nucleating agent contains a combination of a chain transfer agent and a nonionic surfactant, a combination of a chain transfer agent and a fluoropolyether, or a combination of a chain transfer agent, a nonionic surfactant, and a fluoropolyether. In particular, the nucleating agent is preferably a combination of a chain transfer agent and a nonionic surfactant.

The fluoropolyether itself provides a polymerization field and can be a nucleation site.

The fluoropolyether is preferably a perfluoropolyether.

The fluoropolyether preferably has a repeating unit represented by formulas (1a) to (1d):

$$(-CFCF_3-CF_2-O-)_n \quad (1a)$$

$$(-CF_2-CF_2-CF_2-O-)_n \quad (1b)$$

$$(-CF_2-CF_2-O-)_n-(-CF_2-O-)_m \quad (1c)$$

$$(-CF_2-CFCD_3-O-)_n-(-CF_2-O-)_m \quad (1d)$$

wherein m and n are each an integer of 1 or more.

The fluoropolyether is preferably a fluoropolyetheric acid or a salt thereof, and the fluoropolyetheric acid is preferably a carboxylic acid, a sulfonic acid, a sulfonamide, or a phosphonic acid, and more preferably a carboxylic acid. Among the fluoropolyetheric acid or a salt thereof, a salt of fluoropolyetheric acid is preferred, an ammonium salt of fluoropolyetheric acid is more preferred, and an ammonium salt of fluoropolyethercarboxylic acid is even more preferred.

The fluoropolyetheric acid or a salt thereof can have any chain structure in which oxygen atoms in the main chain of the molecule are separated by saturated fluorocarbon groups having 1 to 3 carbon atoms. Two or more types of fluorocarbon groups can be present in the molecule.

These structures are discussed in J. Appl. Polymer Sci., 57, 797(1995) by Kasai. As disclosed therein, such fluoropolyethers can have a carboxylic acid group or a salt thereof at one end or both ends. Similarly, such fluoropolyethers may have a sulfonic acid or phosphonic acid group or a salt thereof at one end or both ends. In addition, fluoropolyethers having acid functional groups at both ends may have different groups at each end. Regarding monofunctional fluoropolyethers, the other end of the molecule is usually perfluorinated, but may contain a hydrogen or chlorine atom.

Fluoropolyethers having acid groups at one end or both ends have at least two ether oxygens, preferably at least four ether oxygens, and even more preferably at least six ether oxygens. Preferably, at least one fluorocarbon group separating ether oxygens, more preferably at least two of such fluorocarbon groups, has 2 or 3 carbon atoms. Even more preferably, at least 50% of the fluorocarbon groups separating ether oxygens has 2 or 3 carbon atoms. Also preferably, the fluoropolyether has at least 15 carbon atoms in total, and for example, a preferred minimum value of n or n+m in the repeating unit structure is at least 5. Two or more fluoropolyethers having an acid group at one end or both ends can be used in the methods according to the present disclosure. Typically, the fluoropolyether may contain a plurality of compounds in varying proportions within the molecular weight range relative to the average molecular weight, unless special care is taken in the production of a single specific fluoropolyether compound.

The fluoropolyetheric acid or a salt thereof is preferably a compound represented by the following formula:

$$CF_3-CF_2-CF_2-O(-CFCF_3-CF_2-O-)_n CFCF_3-COOH,$$

$$CF_3-CF_2-CF_2-O(-CF_2-CF_2-CF_2-O-)_n-CF_2-CF_2COOH, \text{ or}$$

$$HOOC-CF_2-O(-CF_2-CF_2-O-)_n-(-CF_2-O-)_m CF_2COOH$$

(wherein m and n are the same as described above) or a salt thereof.

The fluoropolyether preferably has a number average molecular weight of 800 g/mol or more. Since it may be difficult to disperse the fluoropolyether acid or a salt thereof in an aqueous medium, the fluoropolyether acid or a salt thereof preferably has a number average molecular weight of less than 6,000 g/mol. The fluoropolyether acid or a salt thereof more preferably has a number average molecular weight of 900 g/mol or more, and even more preferably 1,000 g/mol or more. The number average molecular weight is preferably 3,500 g/mol or less, and more preferably 2,500 g/mol or less.

The nonionic surfactant is usually free from a charged group and has a hydrophobic moiety that is a long chain hydrocarbon. The hydrophilic moiety of the nonionic surfactant contains a water-soluble functional group such as a chain of ethylene ether derived from polymerization with ethylene oxide.

Examples of the nonionic surfactant include the following.

Polyoxyethylene alkyl ethers, polyoxyethylene alkylphenyl ethers, polyoxyethylene alkyl esters, sorbitan alkyl esters, polyoxyethylene sorbitan alkyl esters, glycerol esters, and derivatives thereof.

Specific examples of polyoxyethylene alkyl ethers: polyoxyethylene lauryl ether, polyoxyethylene cetyl ether, polyoxyethylene stearyl ether, polyoxyethylene oleyl ether, polyoxyethylene behenyl ether, and the like.

Specific examples of polyoxyethylene alkylphenyl ethers: polyoxyethylene nonylphenyl ether, polyoxyethylene octylphenyl ether, and the like.

Specific examples of polyoxyethylene alkyl esters: polyethylene glycol monolaurate, polyethylene glycol monooleate, polyethylene glycol monostearate, and the like.

Specific examples of sorbitan alkyl esters: polyoxyethylene sorbitan monolaurate, polyoxyethylene sorbitan monopalmitate, polyoxyethylene sorbitan monostearate, polyoxyethylene sorbitan monooleate, and the like.

Specific examples of polyoxyethylene sorbitan alkyl esters: polyoxyethylene sorbitan monolaurate, polyoxyethylene sorbitan monopalmitate, polyoxyethylene sorbitan monostearate, and the like.

Specific examples of glycerol esters: glycerol monomyristate, glycerol monostearate, glycerol monooleate, and the like.

Specific examples of the derivatives: polyoxyethylene alkylamine, polyoxyethylene alkyl phenyl-formaldehyde condensate, and polyoxyethylene alkyl ether phosphate.

The ethers and esters may have an HLB value of 10 to 18.

Examples of the nonionic hydrocarbon surfactants include Triton® X series (X15, X45, X100, etc.), Tergitol® 15-S series, Tergitol® TMN series (TMN-6, TMN-10, TMN-100, etc.), and Tergitol® L series manufactured by The Dow Chemical Company, and Pluronic® R series (31R1, 17R2, 10R5, 25R4 (m to 22, n to 23), and Iconol® TDA series (TDA-6, TDA-9, TDA-10) manufactured by BASF SE.

The nonionic surfactant itself provides a polymerization field and, further, can be a nucleation site by giving a large number of low molecular weight fluoropolymers by chain transfer of radicals in the initial stage.

The nonionic surfactant is preferably a fluorine-free nonionic surfactant. Examples thereof include ether-type nonionic surfactants such as polyoxyethylene alkylphenyl ether, polyoxyethylene alkyl ether, and polyoxyethylene alkylene alkyl ether; polyoxyethylene derivatives such as ethylene oxide/propylene oxide block copolymers; ester-type nonionic surfactants such as sorbitan fatty acid esters, polyoxyethylene sorbitan fatty acid esters, polyoxyethylene sorbitol fatty acid esters, glycerin fatty acid esters, and polyoxyethylene fatty acid esters; and amine-based nonionic surfactants such as polyoxyethylene alkyl amine and alkylalkanolamide.

The hydrophobic group of the nonionic surfactant may be any of an alkylphenol group, a linear alkyl group, and a branched alkyl group.

Examples of the nonionic surfactant include nonionic surfactants represented by the general formula (i):

$$R^3—O—A^1—H \quad (i)$$

wherein $R^3$ is a linear or branched primary or secondary alkyl group having 8 to 18 carbon atoms, and $A^1$ is a polyoxyalkylene chain. $R^3$ preferably has 10 to 16, and more preferably 12 to 16 carbon atoms. When $R^3$ has 18 or less carbon atoms, the aqueous dispersion tends to have good dispersion stability. On the other hand, when the number of carbon atoms in $R^3$ exceeds 18, it is difficult to handle because of the high flow temperature. When $R^3$ has less than 8 carbon atoms, the surface tension of the aqueous dispersion becomes high, so that the permeability and wettability are likely to decrease.

The polyoxyalkylene chain of $A^1$ may be composed of oxyethylene and oxypropylene. The polyoxyalkylene chain is a polyoxyalkylene chain in which the average repeating number of oxyethylene groups is 5 to 20 and the average repeating number of oxypropylene groups is 0 to 2, and is a hydrophilic group. The number of oxyethylene units may have either a broad or narrow monomodal distribution as typically provided, or a broader or bimodal distribution which may be obtained by blending. When the average repeating number of oxypropylene groups is more than 0, the oxyethylene groups and oxypropylene groups in the polyoxyalkylene chain may be arranged in blocks or randomly.

From the viewpoint of viscosity and stability of the aqueous dispersion, a polyoxyalkylene chain composed of an average repeating number of 7 to 12 oxyethylene groups and an average repeating number of 0 to 2 oxypropylene groups is preferred. In particular, when $A^1$ has 0.5 to 1.5 oxypropylene groups on average, low foaming properties are good, which is preferable.

More preferably, $R^3$ is (R') (R")HC—, wherein R' and R" are the same or different linear, branched, or cyclic alkyl groups, and the total amount of carbon atoms is at least 5, preferably 7 to 17. Preferably, at least one of R' and R" is a branched or cyclic hydrocarbon group.

Specific examples of the nonionic surfactant include $C_{13}H_{27}—O—(C_2H_4O)_n—H$, $C_{12}H_{25}—O—(C_2H_4O)_n—H$, $C_{10}H_{21}CH(CH_3)CH_2—O—(C_2H_4O)_n—H$, $C_{13}H_{27}—O—(C_2H_4O)_n—(CH(CH_3)CH_2O)—H$, $C_{16}H_{33}—O—(C_2H_4O)_n—H$, and $HC(C_5H_{11})(C_7H_{15})—O—(C_2H_4O)_n—H$, wherein n is an integer of 1 or more.

Examples of the nonionic surfactant include block copolymers of polyethylene glycol-polypropylene glycol-polyethylene glycol.

Examples of commercially available products of the nonionic surfactant include Genapol X series (manufactured by Clariant) exemplified by Genapol X080 (trade name), NOIGEN TDS series (manufactured by DKS Co., Ltd.) exemplified by NOIGEN TDS-80 (trade name), LEOCOL TD series (manufactured by Lion Corp.) exemplified by LEOCOL TD-90 (trade name), LIONOL® TD series (manufactured by Lion Corp.), T-Det A series (manufactured by Harcros Chemicals Inc.) exemplified by T-Det A 138 (trade name), and TERGITOL® 15 S series (manufactured by The Dow Chemical Company).

The nonionic surfactant is preferably an ethoxylate of 2,6,8-trimethyl-4-nonanol having about 4 to about 18 ethylene oxide units on average, an ethoxylate of 2,6,8-trimethyl-4-nonanol having about 6 to about 12 ethylene oxide units on average, or a mixture thereof. This type of nonionic surfactant is also commercially available, for example, as TERGITOL TMN-6, TERGITOL TMN-10, and TERGITOL TMN-100X (all trade names, manufactured by The Dow Chemical Company).

The hydrophobic group of the nonionic surfactant may be any of an alkylphenol group, a linear alkyl group, and a branched alkyl group.

Examples of the nonionic surfactant also include nonionic surfactants represented by the following general formula (ii):

$$R^4—C_6H_4—O—A^2—H \quad (ii)$$

wherein $R^4$ is a linear or branched alkyl group having 4 to 12 carbon atoms, and $A^2$ is a polyoxyalkylene chain. Examples of the nonionic surfactant include Triton X-100 (trade name, manufactured by The Dow Chemical Company).

Examples of the nonionic surfactant also include polyol compounds. Specific examples thereof include those described in International Publication No. WO 2011/014715.

Typical examples of the polyol compound include compounds having one or more sugar units as polyol unit. The sugar units may have been modified to contain at least one long chain. Examples of suitable polyol compounds containing at least one long chain moiety include alkyl glycosides, modified alkyl glycosides, sugar esters, and combinations thereof. Examples of the sugars include, but are not limited to, monosaccharides, oligosaccharides, and sorbitanes. Examples of monosaccharides include pentoses and hexoses. Typical examples of monosaccharides include ribose, glucose, galactose, mannose, fructose, arabinose, and xylose. Examples of oligosaccharides include oligomers of 2 to 10 of the same or different monosaccharides. Examples of oligosaccharides include, but are not limited to, saccharose, maltose, lactose, raffinose, and isomaltose.

Typically, sugars suitable for use as the polyol compound include cyclic compounds containing a 5-membered ring of four carbon atoms and one heteroatom (typically oxygen or sulfur, preferably oxygen atom), or cyclic compounds containing a 6-membered ring of five carbon atoms and one heteroatom as described above, preferably, an oxygen atom. These further contain at least two or at least three hydroxy groups (—OH groups) bonded to the carbon ring atoms. Typically, the sugars have been modified in that one or more of the hydrogen atoms of hydroxy groups (and/or hydroxy-alkyl groups) bonded to the carbon ring atoms have been substituted by long chain residues such that ether or ester bonds are created between the long chain residues and the sugar moiety.

The sugar-based polyol may contain a single sugar unit or a plurality of sugar units. The single sugar unit or the plurality of sugar units may be modified with long chain moieties as described above. Specific examples of the sugar-based polyol compound include glycosides, sugar esters, sorbitan esters, and mixtures and combinations thereof.

The preferred types of polyol compounds are alkyl or modified alkyl glucosides. These types of surfactants contain at least one glucose moiety. Examples of the alkyl or modified alkyl glucosides include compounds represented by the formula:

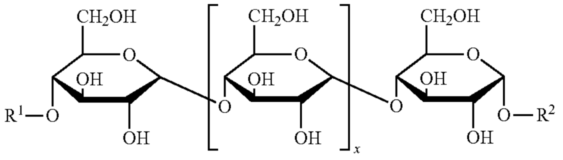

wherein x represents 0, 1, 2, 3, 4, or 5 and $R^1$ and $R^2$ each independently represent H or a long chain unit containing at least 6 carbon atoms, with the proviso that at least one of $R^1$ or $R^2$ is not H. Typical examples of $R^1$ and $R^2$ include aliphatic alcohol residues. Examples of the aliphatic alcohols include hexanol, heptanol, octanol, nonanol, decanol, undecanol, dodecanol (lauryl alcohol), tetradecanol, hexadecanol (cetyl alcohol), heptadecanol, octadecanol (stearyl alcohol), eicosanoic acid, and combinations thereof.

It is understood that the above formula represents specific examples of alkyl poly glucosides showing glucose in its pyranose form but other sugars or the same sugars but in different enantiomeric or diastereomeric forms may also be used.

Alkyl glucosides are obtainable by, for example, acid-catalyzed reactions of glucose, starch, or n-butyl glucoside with aliphatic alcohols, which typically yields a mixture of various alkyl glucosides (Alkylpolygylcoside, Rompp, Lexikon Chemie, Version 2.0, Stuttgart/New York, Georg Thieme Verlag, 1999). Examples of the aliphatic alcohols include hexanol, heptanol, octanol, nonanol, decanol, undecanol, dodecanol (lauryl alcohol), tetradecanol, hexadecanol (cetyl alcohol), heptadecanol, octadecanol (stearyl alcohol), eicosanoic acid, and combinations thereof. Alkyl glucosides are also commercially available under the trade name GLUCOPON or DISPONIL from Cognis GmbH, Dusseldorf, Germany.

Examples of other nonionic surfactants include bifunctional block copolymers supplied from BASF SE as Pluronic® R series and tridecyl alcohol alkoxylates supplied from BASF SE as Iconol® TDA series.

The nonionic surfactant is preferably at least one selected from the group consisting of the nonionic surfactants represented by the general formula (i) and the nonionic surfactants represented by the general formula (ii).

The chain transfer agent can be a nucleation site by giving a large number of low molecular weight fluoropolymers by chain transfer of radicals in the initial stage.

Examples of the chain transfer agent include esters such as dimethyl malonate, diethyl malonate, methyl acetate, ethyl acetate, butyl acetate, and dimethyl succinate, as well as isopentane, methane, ethane, propane, isobutane, methanol, ethanol, isopropanol, acetone, various mercaptans, various halogenated hydrocarbons such as carbon tetrachloride, and cyclohexane.

The chain transfer agent to be used may be a bromine compound or an iodine compound. An example of a polymerization method using a bromine compound or an iodine compound is a method for performing polymerization of a fluorine-containing monomer in an aqueous medium substantially in the absence of oxygen and in the presence of a bromine compound or an iodine compound (iodine transfer polymerization method). Representative examples of the bromine compound or the iodine compound to be used include compounds represented by the following general formula:

$$R^aI_xBr_y$$

wherein x and y are each an integer of 0 to 2 and satisfy $1 \le x+y \le 2$; and $R^a$ is a saturated or unsaturated fluorohydrocarbon group or chlorofluorohydrocarbon group having 1 to 16 carbon atoms, or a hydrocarbon group having 1 to 3 carbon atoms, each of which optionally contains an oxygen atom. By using a bromine compound or an iodine compound, iodine or bromine is introduced into the polymer, and serves as a crosslinking point.

Examples of the bromine compound or the iodine compound include 1,3-diiodoperfluoropropane, 2-iodoperfluoropropane, 1,3-diiodo-2-chloroperfluoropropane, 1,4-diiodoperfluorobutane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane, 1,2-diiodoethane, 1,3-diiodo-n-propane, $CF_2Br_2$, $BrCF_2CF_2Br$, $CF_3CFBrCF_2Br$, $CFClBr_2$, $BrCF_2CFClBr$, CFBrClCFClBr, $BrCF_2CF_2CF_2Br$, $BrCF_2CFBrOCF_3$, 1-bromo-2-iodoperfluoroethane, 1-bromo-3-iodoperfluoropropane, 1-bromo-4-iodoperfluorobutane, 2-bromo-3-iodoperfluorobutane, 3-bromo-4-iodoperfluorobutene-1,2-bromo-4-iodoperfluorobutene-1, and a monoiodo- and monobromo-substitution product, diiodo- and monobromo-substitution product, and (2-iodoethyl)- and (2-bromoethyl)-substitution product of benzene. These compounds may be used alone or in any combination.

Among these, the chain transfer agent is preferably at least one selected from the group consisting of alkanes and alcohols from the viewpoints of polymerization reactivity, crosslinkablility, availability, and the like. The alkanes preferably have 1 to 6, more preferably 2 to 4, and even more preferably 3 to 4 carbon atoms. Further, the alcohols preferably have 1 to 5, more preferably 1 to 4, and even more preferably 3 to 4 carbon atoms. The chain transfer agent is preferably at least one selected from the group consisting of alcohols having 1 to 4 carbon atoms and alkanes having 2 to 4 carbon atoms, and more preferably at least one selected from the group consisting of isopropanol, sec-butanol, and tert-butanol. In particular, by using a chain transfer agent containing tertiary carbon, more particles can be generated during the polymerization.

In one embodiment of the production method of the present disclosure, the fluorine-containing monomer is polymerized in the presence of a polymer containing a fluorine-free monomer unit. In one embodiment of the production method of the present disclosure, the fluorine-containing monomer is polymerized substantially in the absence of a polymer containing a fluorine-free monomer unit.

In the present disclosure, the expression "substantially in the absence of a polymer containing a fluorine-free monomer unit" means that the amount of the polymer containing a fluorine-free monomer unit is 10 ppm by mass or less based on the aqueous medium. The amount of the polymer containing a fluorine-free monomer unit based on the aqueous medium is preferably 1 ppm by mass or less, more preferably 100 ppb by mass or less, even more preferably 10 ppb by mass or less, and further preferably 1 ppb by mass or less.

The polymer containing a fluorine-free monomer unit may be a polymer containing only a fluorine-free monomer unit as its monomer unit or may be a polymer containing a fluorine-free monomer unit and a fluorine-containing monomer unit, but a polymer containing only a fluorine-free monomer unit is preferred.

The fluorine-free monomer preferably has at least one double bond. The fluorine-free monomer is preferably free from a triple bond. Examples of the fluorine-free monomer include a monomer represented by the general formula: $CH_2{=}CR^{111}\text{-}L^{111}\text{-}R^{112}$.

In the general formula, $R^{111}$ represents a hydrogen atom or an alkyl group. The alkyl group preferably has 1 to 3, and more preferably 1 carbon atom. $L^{111}$ represents a single bond, —CO—O—*, —O—CO—*, or —O—. * represents the bond position with $R^{112}$. $R^{112}$ represents a hydrogen atom, an alkyl group, an alkenyl group, or a nitrile group. However, when $L^{111}$ is a single bond, $R^{112}$ is a nitrile group. The alkyl group and the alkenyl group preferably have 1 to 10, more preferably 1 to 6, and even more preferably 1 to 4 carbon atoms. The alkyl group may be chain or cyclic. When the alkyl group is cyclic, it corresponds to a cycloalkyl group. The alkenyl group may be chain or cyclic.

Examples of the fluorine-free monomer include methyl acrylate, methyl methacrylate, ethyl acrylate, ethyl methacrylate, propyl acrylate, propyl methacrylate, butyl acrylate, butyl methacrylate, hexyl methacrylate, cyclohexyl methacrylate, vinyl methacrylate, vinyl acetate, acrylic acid, methacrylic acid, acrylonitrile, methacrylonitrile, ethyl vinyl ether, and cyclohexyl vinyl ether.

By the polymerization, an aqueous dispersion containing the fluororesin can be obtained. The fluororesin is usually at a concentration of 8 to 50% by mass in the aqueous dispersion obtained by carrying out the polymerization. In the aqueous dispersion, the lower limit of the concentration of the fluororesin is preferably 10% by mass, and more preferably 15% by mass, while the upper limit thereof is preferably 40% by mass, and more preferably 35% by mass.

The concentration of the fluororesin may be adjusted by diluting or concentrating the obtained fluororesin. Also, a nonionic hydrocarbon surfactant may be added to the aqueous dispersion obtained by the polymerization. Examples of the nonionic hydrocarbon surfactant include those mentioned above as the fluorine-free surfactant (hydrocarbon surfactant) used in the polymerization. The amount of the nonionic hydrocarbon surfactant may be 1.0% by mass or more, preferably 1.5% by mass or more, more preferably 2.0% by mass or more, even more preferably 2.5% by mass or more, particularly preferably 3.0% by mass or more, and most preferably 4.0% by mass or more, based on the fluororesin. Further, the amount of the nonionic hydrocarbon surfactant is preferably 40% by mass or less, more preferably 30% by mass or less, even more preferably 20% by mass or less, particularly preferably 15% by mass or less, and most preferably 12% by mass or less, based on the fluororesin.

In the production method of the present disclosure, when the fluororesin is subjected to coagulation, washing, drying, or the like, discharge water or off gas is generated. The compound (1), decomposition products and by-products of the compound (1) by-produced from the compound (1), residual monomers, and the like may be collected from the discharge water generated by coagulation or washing and/or from the off gas generated by drying, and then purified to thereby reuse the compound (1), decomposition products and by-products of the compound (1) by-produced from the compound (1), residual monomers, and the like. Although the methods for carrying out the collection and purification are not limited, they may be carried out by known methods. For example, they may be performed by the methods disclosed in National Publication of International Patent Application No. 2011-520020. Examples thereof further include the methods disclosed in U.S. Patent Application Publication No. 2007/15937, U.S. Patent Application Publication No. 2007/25902, and U.S. Patent Application Publication No. 2007/27251. Specific examples of the methods are as follows.

Examples of the method for collecting the compound (1), decomposition products and by-products of the compound (1) by-produced from the compound (1), residual monomers, and the like from the discharge water include a method in which the discharge water is brought into contact with adsorbent particles such as ion exchange resin, activated carbon, silica gel, clay, zeolite, so that the particles are allowed to adsorb the compound (1) and then the others and the discharge water and the adsorbent particles are then separated. By incinerating the absorbent particles that have adsorbed the compound (1) and the others, release of the compound (1) and the others to the environment can be prevented.

Alternatively, the compound (1) and the others can be collected by removing and eluting the compound (1) and the others from the ion exchange resin particles that have adsorbed the compound (1) and the others by a known method. For example, in the case of using anion exchange resin particles as the ion exchange resin particles, the compound (1) and the others can be eluted by bringing a mineral acid into contact with an anion exchange resin. When a water-soluble organic solvent is added to the resulting eluate, the mixture is usually separated into two phases. Since the lower phase contains the compound (1) and the others, it is possible to collect the compound (1) and the others by collecting and neutralizing the lower phase. Examples of the water-soluble organic solvent include polar solvents such as alcohols, ketones, and ethers.

Other examples of the method for collecting the compound (1) and the others from the ion exchange resin particles include a method using an ammonium salt and a water-soluble organic solvent, and a method using an alcohol and, if desired, an acid. In the latter method, ester derivatives of the compound (1) and the others are produced, and thus, they can easily be separated from the alcohol by distillation.

When the discharge water contains fluororesin particles and other solids, they are preferably removed before the discharge water and the adsorbent particles are brought into contact with each other. Examples of the method for removing the fluororesin particles and other solids include a method of adding an aluminum salt or the like to deposit these components, and then separating the discharge water and the deposits, and an electrocoagulation method. The components may also be removed by a mechanical method, and examples thereof include a crossflow filtration method, a depth filtration method, and a precoat filtration method.

From the viewpoint of productivity, the discharge water preferably contains the fluororesin in a non-agglomerated form in a low concentration, more preferably less than 0.4% by mass, and particularly preferably less than 0.3% by mass.

An example of the method for collecting the compound (1) and the others from the off gas is a method in which a scrubber is brought into contact with deionized water, an alkaline aqueous solution, an organic solvent such as a glycol ether solvent, or the like to provide a scrubber solution containing the compound (1) and the others. When the alkaline aqueous solution used is a highly concentrated alkaline aqueous solution, the scrubber solution can be collected in a state where the compound (1) and the others are phase-separated, and thus the compound (1) and the others can be easily collected and reused. Examples of the alkaline compound include alkali metal hydroxides and quaternary ammonium salts.

The scrubber solution containing the compound (1) and the others may be concentrated using a reverse osmosis membrane, for example. The concentrated scrubber solution usually contains fluoride ions. Still, the fluoride ions may be removed by adding alumina after the concentration so that the compound (1) and the others can easily be reused. Alternatively, the scrubber solution may be brought into contact with adsorbent particles so that the adsorbent particles can adsorb the compound (1) and the others, and thereby the compound (1) and the others may be collected by the aforementioned method.

The compound (1) and the others collected by any of the above methods can be reused for production of the fluororesin.

Next, a fluororesin obtained by the production method of the present disclosure, a fluororesin and an aqueous dispersion of the fluororesin of the present disclosure will be specifically described.

<Fluororesin and Aqueous Dispersion of Fluororesin>

A fluororesin obtained by the production method of the present disclosure and a fluororesin of the present disclosure may comprise a unit based on the compound (1) having a triple bond and a hydrophilic group, and a fluorine-containing monomer unit. The present disclosure also relates to a fluororesin comprising a unit based on the compound (1) having a triple bond and a hydrophilic group, and a fluorine-containing monomer unit. The fluororesin of the present disclosure can be suitably produced by the method for producing a fluororesin of the present disclosure.

The content of the unit based on the compound (1) in the fluororesin is preferably 0.0001 to 1.0% by mass, more preferably 0.0005% by mass or more, even more preferably 0.0010% by mass or more, particularly preferably 0.0050% by mass or more, and most preferably 0.0100% by mass or more, and is more preferably 0.50% by mass or less, even more preferably 0.30% by mass or less, and particularly preferably 0.10% by mass or less, based on all monomer units. When the content of the unit based on the compound (1) is excessive, the properties required of the fluororesin may be impaired.

The present disclosure also relates to an aqueous dispersion containing the fluororesin and an aqueous medium. The aqueous dispersion of the present disclosure can be suitably produced by the method for producing a fluororesin of the present disclosure.

One embodiment of the fluororesin and aqueous dispersion of the present disclosure contains a fluorine-containing surfactant (provided that the compound (1) and a modifying monomer (A) are excluded). The fluororesin and aqueous dispersion containing a fluorine-containing surfactant has an advantage that the fluororesin and aqueous dispersion can be stably produced with high productivity using a fluorine-containing surfactant.

One embodiment of the fluororesin and aqueous dispersion of the present disclosure is substantially free from a fluorine-containing surfactant (provided that the compound (1) and a modifying monomer (A) are excluded). The fluororesin and aqueous dispersion substantially free from a fluorine-containing surfactant need to be produced by polymerizing TFE without using a fluorine-containing surfactant, and they can be produced by the production method of the present disclosure using the compound (1).

In the present disclosure, the expression "substantially free from a fluorine-containing surfactant" means that the content of the fluorine-containing surfactant in the fluororesin or aqueous dispersion is 10 ppm by mass or less, preferably 1 ppm by mass or less, more preferably 100 ppb by mass or less, even more preferably 10 ppb by mass or less, yet even more preferably 1 ppb by mass or less, and particularly preferably less than the detection limit of the fluorine-containing surfactant as measured by liquid chromatography-mass spectrometry (LC/MS).

The content of the fluorine-containing surfactant can be quantified by a known method. For example, it can be quantified by LC/MS analysis.

First, methanol is added to the fluororesin or aqueous dispersion, extraction is performed, and the resulting extract is subjected to LC/MS analysis. To further increase extraction efficiency, treatment by Soxhlet extraction, ultrasonic treatment, or the like may be performed.

From the resulting LC/MS spectrum, molecular weight information is extracted, and a match with the structural formula of a candidate fluorine-containing surfactant is checked.

Thereafter, aqueous solutions having five or more different content levels of the confirmed fluorine-containing surfactant are prepared, and LC/MS analysis of the aqueous solution of each content is performed, and the relationship between the content and the area for the content is plotted, and a calibration curve is drawn.

Then, using the calibration curve, the area of the LC/MS chromatogram of the fluorine-containing surfactant in the extract can be converted into the content of the fluorine-containing surfactant.

In the fluororesin, the average primary particle size of primary particles is preferably 500 nm or less, more preferably 400 nm or less, and even more preferably 350 nm or less. The relatively small average primary particle size of primary particles can be obtained, for example, by adding a modifying monomer to the polymerization system at the initial stage of the polymerization reaction of the fluorine-containing monomer. The lower limit of the average primary particle size may be, for example, but is not limited to, 50 nm or 100 nm. From the viewpoint of molecular weight, the lower limit is preferably 100 nm or more, and more preferably 150 nm or more.

The average primary particle size of primary particles of the fluororesin can be measured by dynamic light scattering. The average primary particle size can be measured by preparing an aqueous dispersion with a polymer solid concentration being adjusted to about 1.0% by mass and using dynamic light scattering at a measurement temperature of 25° C. with 70 measurement processes, wherein the solvent (water) has a refractive index of 1.3328 and the solvent (water) has a viscosity of 0.8878 mPa·s. In the dynamic light scattering, ELSZ-1000S (manufactured by Otsuka Electronics Co., Ltd.) may be used, for example.

One embodiment of the fluororesin and aqueous dispersion of the present disclosure contains a polymer containing a fluorine-free monomer unit. The fluororesin and aqueous dispersion containing a polymer containing a fluorine-free monomer unit has an advantage that the fluororesin and aqueous dispersion can be stably produced with high productivity using a polymer containing a fluorine-free monomer unit.

One embodiment of the fluororesin and aqueous dispersion of the present disclosure is substantially free from a polymer containing a fluorine-free monomer unit. The fluororesin and aqueous dispersion substantially free from a polymer containing a fluorine-free monomer unit need to be produced by polymerizing TFE without using a polymer containing a fluorine-free monomer unit, and they can be produced by the production method of the present disclosure using the compound (1). The polymer containing a fluorine-free monomer unit is as described above.

In the present disclosure, the expression "substantially free from a polymer containing a fluorine-free monomer unit" means that the content of the polymer containing a fluorine-free monomer unit in the fluororesin or aqueous dispersion is 10 ppm by mass or less, preferably 1 ppm by mass or less, more preferably 100 ppb by mass or less, even more preferably 10 ppb by mass or less, yet even more preferably 1 ppb by mass or less, and particularly preferably less than the detection limit of the polymer containing a fluorine-free monomer unit as measured by liquid chromatography-mass spectrometry (LC/MS).

The content of the polymer containing a fluorine-free monomer unit can be measured by adding an aqueous solvent or organic solvent to the fluororesin and aqueous dispersion of the present disclosure, carrying out extraction, and performing GPC analysis on the obtained extract. Alternatively, the content of the polymer containing a fluorine-free monomer unit may be measured by LC/MS analysis on the extract.

The aqueous dispersion of the present disclosure may further contain a nonionic hydrocarbon surfactant. Examples of the nonionic hydrocarbon surfactant include those mentioned above as the fluorine-free surfactant (the hydrocarbon surfactant) used in the polymerization. The content of the nonionic hydrocarbon surfactant may be 1.0% by mass or more, preferably 1.5% by mass or more, more preferably 2.0% by mass or more, even more preferably 2.5% by mass or more, particularly preferably 3.0% by mass or more, and most preferably 4.0% by mass or more, based on the fluororesin. Also, the amount of the nonionic hydrocarbon surfactant is preferably 40% by mass or less, more preferably 30% by mass or less, even more preferably 20% by mass or less, particularly preferably 15% by mass or less, and most preferably 12% by mass or less, based on the fluororesin.

Examples of the fluororesin include a TFE polymer in which TFE is the monomer having the highest mole fraction (hereinafter, "most abundant monomer") among the monomers in the polymer, a VDF polymer in which VDF is the most abundant monomer, and a CTFE polymer in which CTFE is the most abundant monomer.

It is preferable that the fluororesin has an ion exchange rate (IXR) of higher than 53. The preferred fluororesin has either no ionic groups at all or a limited number of ionic groups resulting in an ion exchange rate higher than about 100. The preferred ion exchange rate of the fluororesin is preferably 1,000 or more, more preferably 2,000 or more, and even more preferably 5,000 or more.

The TFE polymer may suitably be a TFE homopolymer, or may be a copolymer containing (1) TFE, (2) one or two or more fluorine-containing monomers each of which is different from TFE and has 2 to 8 carbon atoms, in particular VDF, HFP, or CTFE, and (3) a further monomer. Examples of (3) the further monomer include fluoro(alkyl vinyl ethers) having an alkyl group having 1 to 5 carbon atoms, particularly 1 to 3 carbon atoms; fluorodioxoles; perfluoroalkyl ethylenes; and ω-hydroperfluoroolefins.

Alternatively, the TFE polymer may be a copolymer of TFE and one or two or more fluorine-free monomers. Examples of the fluorine-free monomers include alkenes such as ethylene and propylene; vinyl esters; and vinyl ethers. Alternatively, the TFE polymer may be a copolymer of TFE, one or two or more fluorine-containing monomers having 2 to 8 carbon atoms, and one or two or more fluorine-free monomers.

The VDF polymer may suitably be a VDF homopolymer (PVDF), or may be a copolymer containing (1) VDF, (2) one or two or more fluoroolefins each of which is different from VDF and has 2 to 8 carbon atoms, in particular TFE, HFP, or CTFE, and (3) a perfluoro(alkyl vinyl ether) having an alkyl group having 1 to 5 carbon atoms, particularly 1 to 3 carbon atoms, or the like.

The CTFE polymer may suitably be a CTFE homopolymer, or may be a copolymer containing (1) CTFE, (2) one or two or more fluoroolefins each of which is different from CTFE and has 2 to 8 carbon atoms, in particular TFE or HFP, and (3) a perfluoro(alkyl vinyl ether) having an alkyl group having 1 to 5 carbon atoms, particularly 1 to 3 carbon atoms.

Alternatively, the CTFE polymer may be a copolymer of CTFE and one or two or more fluorine-free monomers, and examples of the fluorine-free monomers include alkenes such as ethylene and propylene; vinyl esters; and vinyl ethers.

The production method of the present disclosure can suitably produce, for example, a tetrafluoroethylene polymer [TFE polymer (PTFE)] as (I) non melt-processible fluororesin; an ethylene/TFE copolymer [ETFE], a TFE/HFP copolymer [FEP], a TFE/perfluoro(alkyl vinyl ether) copolymer [PFA, MFA, etc.], a TFE/perfluoroallyl ether copolymer, a TFE/VDF copolymer, and an electrolyte polymer precursor as (II) melt-fabricable fluororesin; the fluorine-containing segmented polymer described in Japanese Patent Publication No. 61-49327; and other polymers.

In particular, the fluororesin is more preferably a fluororesin having a fluorine substitution percentage, as calculated according to the following expression, of 50% or higher, even more preferably a fluororesin having the fluorine substitution percentage of higher than 50%, further preferably a fluororesin having the fluorine substitution percentage of 55% or higher, further preferably a fluororesin having the fluorine substitution percentage of 60% or higher, further preferably a fluororesin having the fluorine substitution percentage of 75% or higher, particularly preferably a fluororesin having the fluorine substitution percentage of 80% or higher, and most preferably a fluororesin having the fluorine substitution percentage of 90 to 100%, i.e., a perfluororesin.

Fluorine substitution percentage (%)=(number of fluorine atoms bonded to carbon atoms constituting fluororesin)/((number of hydrogen atoms bonded to carbon atoms constituting fluororesin)+(number of fluorine atoms and chlorine atoms bonded to carbon atoms constituting fluororesin))×100 (Expression)

The perfluororesin is more preferably a fluororesin having the fluorine substitution percentage of 95 to 100%, even more preferably PTFE, FEP, or PFA, and particularly preferably PTFE.

The fluororesin may have a core-shell structure. An example of the fluororesin having a core-shell structure is a modified PTFE including the core of high molecular weight PTFE and the shell of lower molecular weight PTFE or modified PTFE in the particle. An example of such a modified PTFE is the PTFE disclosed in National Publication of International Patent Application No. 2005-527652.

The core-shell structure may have the following structures.

Core: TFE homopolymer Shell: TFE homopolymer

Core: modified PTFE Shell: TFE homopolymer

Core: modified PTFE Shell: modified PTFE

Core: TFE homopolymer Shell: modified PTFE

Core: low molecular weight PTFE Shell: high molecular weight PTFE

Core: high molecular weight PTFE Shell: low molecular weight PTFE

In the fluororesin having the core-shell structure, the lower limit of the proportion of the core is preferably 0.5% by mass, more preferably 1.0% by mass, even more preferably 3.0% by mass, particularly preferably 5.0% by mass, and most preferably 10.0% by mass. The upper limit of the proportion of the core is preferably 99.5% by mass, more preferably 99.0% by mass, even more preferably 98.0% by mass, further preferably 97.0% by mass, particularly preferably 95.0% by mass, and most preferably 90.0% by mass.

In the fluororesin having the core-shell structure, the lower limit of the proportion of the shell is preferably 0.5% by mass, more preferably 1.0% by mass, even more preferably 3.0% by mass, particularly preferably 5.0% by mass, and most preferably 10.0% by mass. The upper limit of the proportion of the shell is preferably 99.5% by mass, more preferably 99.0% by mass, even more preferably 98.0% by mass, further preferably 97.0% by mass, particularly preferably 95.0% by mass, and most preferably 90.0% by mass.

In the fluororesin having the core-shell structure, the core or the shell may be composed of two or more layers. For example, the fluororesin may have a trilayer structure including the core center portion of a modified PTFE, the core outer layer portion of a TFE homopolymer, and the shell of a modified PTFE.

Examples of the fluororesin having the core-shell structure also include those in which a single particle of the fluororesin has a plurality of cores.

The (I) non melt-processible fluororesin and the (II) melt-fabricable fluororesin suitably produced by the production method of the present disclosure are preferably produced in the following manner.

(I) Non Melt-Processible Fluororesin

In the production method of the present disclosure, polymerization of TFE is usually performed at a polymerization temperature of 10 to 150° C. and a polymerization pressure of 0.05 to 5 MPaG. For example, the polymerization temperature is more preferably 30° C. or higher, and even more preferably 50° C. or higher. Further, the polymerization temperature is more preferably 120° C. or lower, and even more preferably 100° C. or lower. Further, the polymerization pressure is more preferably 0.3 MPaG or higher, and even more preferably 0.5 MPaG or higher, and is more preferably 5.0 MPaG or lower, and even more preferably 3.0 MPaG or lower. In particular, from the viewpoint of improving the yield of fluororesin, the polymerization pressure is preferably 1.0 MPaG or higher, more preferably 1.2 MPaG or higher, even more preferably 1.5 MPaG or higher, and more preferably 2.0 MPaG or higher.

In an embodiment, the polymerization reaction is initiated by charging pure water into a pressure-resistant reaction vessel equipped with a stirrer, deoxidizing the system, then charging TFE, increasing the temperature to a predetermined level, and adding a polymerization initiator. When the pressure decreases as the reaction progresses, additional TFE is fed continuously or intermittently to maintain the initial pressure. When the amount of TFE fed reaches a predetermined level, feeding is stopped, and then TFE in the reaction vessel is purged and the temperature is returned to room temperature, whereby the reaction is completed. Additional TFE may be added continuously or intermittently to prevent pressure drop.

In production of the TFE polymer (PTFE), various known modifying monomers may be used in combination. The TFE polymer as used herein is a concept that encompasses not only a TFE homopolymer but also a non melt-processible copolymer of TFE and a modifying monomer (hereinafter, referred to as a "modified PTFE").

The modifying monomer is not limited as long as it can be copolymerized with TFE, and examples thereof include fluorine-containing monomers and fluorine-free monomers. Further, one kind or a plurality of kinds of the modifying monomers may be used.

Examples of the fluorine-free monomer include, but are not limited to, a monomer represented by the general formula:

$$CH_2{=}CR^{Q1}\text{-}LR^{Q2}$$

wherein $R^{Q1}$ represents a hydrogen atom or an alkyl group; L represents a single bond, —CO—O—*, —O—CO—*, or —O—; * represents the bond position with $R^{Q2}$; and $R^{Q2}$ represents a hydrogen atom, an alkyl group, or a nitrile group.

Examples of the fluorine-free monomer include methyl acrylate, methyl methacrylate, ethyl acrylate, ethyl methacrylate, propyl acrylate, propyl methacrylate, butyl acrylate, butyl methacrylate, hexyl methacrylate, cyclohexyl methacrylate, vinyl methacrylate, vinyl acetate, acrylic acid, methacrylic acid, acrylonitrile, methacrylonitrile, ethyl vinyl ether, and cyclohexyl vinyl ether. Among these, the fluorine-free monomer is preferably butyl methacrylate, vinyl acetate, or acrylic acid.

Examples of the fluorine-containing monomer include perfluoroolefins such as hexafluoropropylene (HFP); hydrogen-containing fluoroolefins such as trifluoroethylene and vinylidene fluoride (VDF); perhaloolefins such as chlorotrifluoroethylene; perfluorovinyl ethers; and (perfluoroalkyl) ethylenes.

Examples of the perfluorovinyl ethers include, but are not limited to, an unsaturated perfluoro compound represented by the general formula (A):

$$CF_2{=}CF{-}ORf \quad (A)$$

wherein Rf represents a perfluoro organic group. The "perfluoro organic group" as used herein means an organic group in which all hydrogen atoms bonded to the carbon atoms are replaced with fluorine atoms. The perfluoro organic group optionally has ether oxygen.

Examples of the perfluorovinyl ethers include a perfluoro (alkyl vinyl ether) (PAVE) in which Rf is a perfluoroalkyl group having 1 to 10 carbon atoms in the general formula (A). The perfluoroalkyl group preferably has 1 to 5 carbon atoms.

Examples of the perfluoroalkyl group in the PAVE include a perfluoromethyl group, a perfluoroethyl group, a perfluoropropyl group, a perfluorobutyl group, a perfluoropentyl group, and a perfluorohexyl group.

Examples of the perfluorovinyl ethers further include those represented by the general formula (A) in which Rf is a perfluoro(alkoxyalkyl) group having 4 to 9 carbon atoms; those in which Rf is a group represented by the following formula:

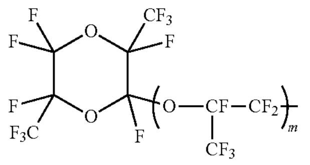

wherein m represents 0 or an integer of 1 to 4; and those in which Rf is a group represented by the formula: $CF_3CF_2CF_2—(O—CF(CF_3)—CF_2)_n—$, wherein n represents an integer of 1 to 4.

Examples of the hydrogen-containing fluoroolefins include $CH_2═CF_2$, $CFH═CH_2$, $CFH═CF_2$, $CH_2═CFCF_3$, $CH_2═CHCF_3$, $CHF═CHCF_3$ (E isomer), and $CHF═CHCF_3$ (Z isomer).

Examples of the (perfluoroalkyl)ethylenes (PFAE) include, but are not limited to, (perfluorobutyl)ethylene (PFBE) and (perfluorohexyl)ethylene.

Examples of the perfluoroallyl ethers include fluorine-containing monomers represented by the general formula:

$$CF_2═CF—CF_2—ORf$$

wherein Rf represents a perfluoro organic group.

Rf in the general formula is the same as Rf in the general formula (A). Rf is preferably a perfluoroalkyl group having 1 to 10 carbon atoms or a perfluoroalkoxyalkyl group having 1 to 10 carbon atoms. The perfluoroallyl ether is preferably at least one selected from the group consisting of $CF_2═CF—CF_2—O—CF_3$, $CF_2═CF—CF_2—O—C_2F_5$, $CF_2═CF—CF_2—O—C_3F_7$, and $CF_2═CF—CF_2—O—C_4F_9$, more preferably at least one selected from the group consisting of $CF_2═CF—CF_2—O—C_2F_5$, $CF_2═CF—CF_2—O—C_3F_7$, and $CF_2═CF—CF_2—O—C_4F_9$, and even more preferably $CF_2═CF—CF_2—O—CF_2CF_2CF_3$.

The modifying monomer is also preferably exemplified by a modifying monomer (3) having a monomer reactivity ratio of 0.1 to 8. The presence of the modifying monomer (3) makes it possible to obtain PTFE particles having a small particle size, and to thereby obtain an aqueous dispersion having high dispersion stability.

The monomer reactivity ratio in the copolymerization with TFE is a value obtained by dividing a rate constant when the propagating radical reacts with TFE when the propagating radical is less than a repeating unit based on TFE by a rate constant when the propagating radical reacts with the modifying monomer. The lower this value is, the more reactive the modifying monomer is with TFE. The monomer reactivity ratio can be calculated by copolymerizing the TFE and the modifying monomer, determining the compositional features in the polymer formed immediately after initiation, and calculating the reactivity ratio by Fineman-Ross equation.

The copolymerization is performed using 3,600 g of deionized degassed water, 1,000 ppm by mass of ammonium perfluorooctanoate based on the water, and 100 g of paraffin wax contained in an autoclave made of stainless steel with an internal volume of 6.0 L at a pressure of 0.78 MPaG and a temperature of 70° C. A modifying monomer in an amount of 0.05 g, 0.1 g, 0.2 g, 0.5 g, or 1.0 g is added to the reactor, and then 0.072 g of ammonium persulfate (20 ppm by mass based on the water) is added thereto. To maintain the polymerization pressure at 0.78 MPaG, TFE is continuously supplied thereinto. When the charged amount of TFE reaches 1,000 g, stirring is stopped and the pressure is released until the pressure in the reactor decreases to the atmospheric pressure. After cooling, the paraffin wax is separated to obtain an aqueous dispersion containing the resulting polymer. The aqueous dispersion is stirred so that the resulting polymer coagulates, and the polymer is dried at 150° C. The compositional features in the resulting polymer are calculated by appropriate combination of NMR, FT-IR, elemental analysis, and X-ray fluorescence analysis in accordance with the types of the monomers.

The modifying monomer (3) having a monomer reactivity ratio of 0.1 to 8 is preferably at least one selected from the group consisting of modifying monomers represented by formulas (3a) to (3d):

$$CH_2═CH—Rf^1 \quad (3a)$$

wherein $Rf^1$ is a perfluoroalkyl group having 1 to 10 carbon atoms;

$$CF_2═CF—O—RF^2 \quad (3b)$$

wherein $Rf^2$ is a perfluoroalkyl group having 1 to 2 carbon atoms;

$$CF_2═CF—O—(CF_2)_nCF═CF_2 \quad (3c)$$

wherein n is 1 or 2; and (3d)

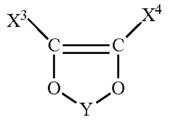

wherein $X^3$ and $X^4$ are each F, Cl, or a methoxy group, and Y is represented by formula $Y^1$ or $Y^2$, $$—CF═CF— \quad (Y^1)$$

($Y^2$)

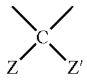

in the formula Y2, Z and Z' are each F or a fluorinated alkyl group having 1 to 3 carbon atoms.

The content of the modifying monomer (3) unit is preferably in the range of 0.00001 to 1.0% by mass based on all polymerization units of the PTFE. The lower limit is more preferably 0.0001% by mass, more preferably 0.0005% by mass, even more preferably 0.001% by mass, and further preferably 0.005% by mass. The upper limit is, in the order of preference, 0.90% by mass, 0.50% by mass, 0.40% by mass, 0.30% by mass, 0.20% by mass, 0.15% by mass, 0.10% by mass, 0.08% by mass, 0.05% by mass, or 0.01% by mass.

The modifying monomer is preferably at least one selected from the group consisting of hexafluoropropylene, chlorotrifluoroethylene, perfluoro(alkyl vinyl ether), (perfluoroalkyl)ethylene, ethylene, and modifying monomers having a functional group capable of reacting by radical polymerization and a hydrophilic group, in view of obtaining an aqueous dispersion having a small average primary particle size of primary particles, a small aspect ratio of primary particles, and excellent stability. The use of the modifying monomer allows for obtaining an aqueous dispersion of PTFE having a smaller average primary particle size, a small aspect ratio of primary particles, and excellent dispersion stability. Also, an aqueous dispersion having a smaller amount of uncoagulated polymer can be obtained.

From the viewpoint of reactivity with TFE, the modifying monomer preferably contains at least one selected from the group consisting of hexafluoropropylene, perfluoro(alkyl vinyl ether), and (perfluoroalkyl)ethylene.

The modifying monomer more preferably contains at least one selected from the group consisting of hexafluoropropylene, perfluoro(methyl vinyl ether), perfluoro(propyl vinyl ether), (perfluorobutyl)ethylene, (perfluorohexyl)ethylene, and (perfluorooctyl)ethylene.

The total amount of the hexafluoropropylene unit, the perfluoro(alkyl vinyl ether) unit, and the (perfluoroalkyl) ethylene unit is preferably in the range of 0.00001 to 1% by mass based on all polymerization units of the PTFE. The lower limit of the total amount is more preferably 0.0001% by mass, more preferably 0.0005% by mass, even more preferably 0.001% by mass, and even more preferably 0.005% by mass. The upper limit is, in the order of preference, 0.80% by mass, 0.70% by mass, 0.50% by mass, 0.40% by mass, 0.30% by mass, 0.20% by mass, 0.15% by mass, 0.10% by mass, 0.08% by mass, 0.05% by mass, or 0.01% by mass.

It is also preferable that the modifying monomer contains a modifying monomer having a functional group capable of reacting by radical polymerization and a hydrophilic group (hereinafter, referred to as "modifying monomer (A)").

The presence of the modifying monomer (A) makes it possible to obtain PTFE particles having a small primary particle size, and to thereby obtain an aqueous dispersion having high dispersion stability. Further, the amount of uncoagulated polymer can be reduced. Further, the aspect ratio of primary particles can be made small.

The amount of the modifying monomer (A) used is preferably an amount exceeding 0.1 ppm by mass of the aqueous medium, more preferably an amount exceeding 0.5 ppm by mass, even more preferably an amount exceeding 1.0 ppm by mass, further preferably 5 ppm by mass or more, and particularly preferably 10 ppm by mass or more. When the amount of the modifying monomer (A) used is too small, the average primary particle size of the resulting PTFE may not be reduced.

The amount of the modifying monomer (A) used may be in the above range, but the upper limit may be, for example, 5,000 ppm by mass. Further, in the production method, the modifying monomer (A) may be added to the system in the middle of reaction in order to improve the stability of the aqueous dispersion during or after the reaction.

Since the modifying monomer (A) is highly water-soluble, even if the unreacted modifying monomer (A) remains in the aqueous dispersion, it can be easily removed in the concentration step or the coagulation/washing step.

The modifying monomer (A) is incorporated into the resulting polymer in the process of polymerization, but the concentration of the modifying monomer (A) in the polymerization system itself is low and the amount incorporated into the polymer is small, so that there is no problem that the heat resistance of PTFE is lowered or the PTFE is colored after sintering.

Examples of the hydrophilic group in the modifying monomer (A) include $—NH_2$, $—P(O)(OM)_2$, $—OP(O)(OM)_2$, $—SO_3M$, $—OSO_3M$, and —COOM, wherein M is H, a metal atom, $NR^{7y}_4$, imidazolium optionally having a substituent, pyridinium optionally having a substituent, or phosphonium optionally having a substituent, where $R^{7y}$ is H or an organic group, and may be the same or different, and any two thereof may be bonded to each other to form a ring. Of these, the hydrophilic group is preferably $—SO_3M$ or —COOM. The organic group in $R^{7y}$ is preferably an alkyl group. $R^{7y}$ is preferably H or a $C_1$-$1_0$ organic group, more preferably H or a $C_{1-4}$ organic group, and even more preferably H or a $C_{1-4}$ alkyl group.

Examples of the metal atom include monovalent and divalent metal atoms, alkali metals (Group 1), and alkaline earth metals (Group 2), and preferred is Na, K, or Li.

Examples of the "functional group capable of reacting by radical polymerization" in the modifying monomer (A) include a group having an ethylenically unsaturated bond such as a vinyl group and an allyl group. The group having an ethylenically unsaturated bond may be represented by the following formula:

$$CX^eX^g{=}CX^fR—$$

wherein $X^e$, $X^f$, and $X^g$ are each independently F, Cl, H, $CF_3$, $CF_2H$, $CFH_2$, or $CH_3$; and R is a linking group. The linking group of R include linking groups as $R^a$, which will be described later. Preferred are groups having an unsaturated bond, such as $—CH{=}CH_2$, $—CF{=}CH_2$, $—CH{=}CF_2$, $—CF{=}CF_2$, $—CH_2—CH{=}CH_2$, $—CF_2—CF{=}CH_2$, $—CF_2—CF{=}CF_2$, $—(C{=}O)—CH{=}CH_2$, $—(C{=}O)—CF{=}CH_2$, $—(C{=}O)—CH{=}CF_2$, $—(C{=}O)—CF{=}CF_2$, $—(C{=}O)—C(CH_3){=}CH_2$, $—(C{=}O)—C(CF_3){=}CH_2$, $—(C{=}O)—C(CH_3){=}CF_2$, $—(C{=}O)—C(CF_3){=}CF_2$, $—O—CH_2—CH{=}CH_2$, $—O—CF_2—CF{=}CH_2$, $—O—CH_2—CH{=}CF_2$, and $—O—CF_2—CF{=}CF_2$.

Since the modifying monomer (A) has a functional group capable of reacting by radical polymerization, it is presumed that when used in the polymerization, it reacts with the fluorine-containing monomer at the initial stage of the polymerization reaction and forms particles with high stability having a hydrophilic group derived from the modifying monomer (A). Therefore, it is considered that the number of particles increases when the polymerization is performed in the presence of the modifying monomer (A).

The polymerization may be carried out in the presence of one kind of the modifying monomer (A), or in the presence of two or more kinds thereof.

In the polymerization, a compound having an unsaturated bond may be used as the modifying monomer (A).

The modifying monomer (A) is preferably a compound represented by the general formula (4):

$$CX^iX^k{=}CX^jR^a—(CX^1Z^2)_k—Y^3 \quad (4)$$

wherein $X^i$, $X^j$, and $X^k$ are each independently F, Cl, H, or $CF_3$; $Y^3$ is a hydrophilic group; $R^a$ is a linking group; $Z^1$ and $Z^2$ are each independently H, F, or $CF_3$; and k is 0 or 1.

Examples of the hydrophilic group include $—NH_2$, $—P(O)(OM)_2$, $—OP(O)(OM)_2$, $—SO_3M$, $—OSO_3M$, and —COOM, wherein M is H, a metal atom, $NR^{7y}_4$, imidazolium optionally having a substituent, pyridinium optionally having a substituent, or phosphonium optionally having a substituent, where $R^{7y}$ is H or an organic group, and may be the same or different, and any two thereof may be bonded to each other to form a ring. Of these, the hydrophilic group is preferably —$SO_3M$ or —COOM. The organic group in $R^{7y}$ is preferably an alkyl group. $R^{7y}$ is preferably H or a $C_{1-10}$ organic group, more preferably H or a $C_{1-4}$ organic group, and even more preferably H or a $C_{1-4}$ alkyl group. Examples of the metal atom include monovalent and divalent metal atoms, alkali metals (Group 1), and alkaline earth metals (Group 2), and preferred is Na, K, or Li.

The use of the modifying monomer (A) allows for obtaining an aqueous dispersion having a smaller average primary particle size and superior stability. Also, the aspect ratio of primary particles can be made smaller.

$R^a$ is a linking group. The "linking group" as used herein refers to a divalent linking group. The linking group may be a single bond and preferably contains at least one carbon atom, and the number of carbon atoms may be 2 or more, 4 or more, 8 or more, 10 or more, or 20 or more. The upper limit thereof is not limited, but may be 100 or less, and may be 50 or less, for example.

The linking group may be linear or branched, cyclic or acyclic, saturated or unsaturated, substituted or unsubstituted, and optionally contains one or more heteroatoms selected from the group consisting of sulfur, oxygen, and nitrogen, and optionally contains one or more functional groups selected from the group consisting of ester, amide, sulfonamide, carbonyl, carbonate, urethane, urea, and carbamate. The linking group may be free from carbon atoms and may be a catenary heteroatom such as oxygen, sulfur, or nitrogen.

$R^a$ is preferably a catenary heteroatom such as oxygen, sulfur, or nitrogen, or a divalent organic group.

When $R^a$ is a divalent organic group, a hydrogen atom bonded to a carbon atom may be replaced with a halogen other than fluorine, such as chlorine, and may or may not contain a double bond. Further, $R^a$ may be linear or branched, and may be cyclic or acyclic. $R^a$ may also contain a functional group (e.g., ester, ether, ketone, amine, halide, etc.).

$R^a$ may also be a fluorine-free divalent organic group or a partially fluorinated or perfluorinated divalent organic group.

$R^a$ may be, for example, a hydrocarbon group in which no fluorine atom is bonded to a carbon atom, a hydrocarbon group in which some hydrogen atoms bonded to carbon atoms are replaced with fluorine atoms, a hydrocarbon group in which all hydrogen atoms bonded to carbon atoms are replaced with fluorine atoms, —(C═O)—, —(C═O)—O—, or a hydrocarbon group containing an ether bond, and these may contain an oxygen atom, may contain a double bond, and may contain a functional group.

$R^a$ is preferably —(C═O)—, —(C═O)—O—, or a hydrocarbon group having 1 to 100 carbon atoms that optionally contains an ether bond and optionally contains a carbonyl group, wherein some or all of the hydrogen atoms bonded to the carbon atoms in the hydrocarbon group may be replaced with fluorine.

$R^a$ is preferably at least one selected from $-(CH_2)_a-$, $-(CF_2)_a-$, $-O-(CF_2)_a-$, $-(CF_2)_a-O-(CF_2)_b-$, $-O(CF_2)_a-O-(CF_2)_b-$, $-(CF_2)_a-[O-(CF_2)_b]_c-$, $-O(CF_2)_a-[O-(CF_2)_b]_c-$, $-[(CF_2)_a-O]_b-[(CF_2)_c-O]_d-$, $-O[(CF_2)_a-O]_b-[(CF_2)_c-O]_d-$, $-O-[CF_2CF(CF_3)O]_a-(CF_2)_b-$, —(C═O)—, —(C═O)—O—, $-(C{=}O)-(CH_2)_a-$, $-(C{=}O)-(CF_2)_a-$, $-(C{=}O)-O-(CH_2)_a-$, $-(C{=}O)-O-(CF_2)_a-$, $-(C{=}O)-[(CH_2)_a-O]_b-$, $-(C{=}O)-[(CF_2)_a-O]_b-$, $-(C{=}O)-O[(CH_2)_a-O]_b-$, $-(C{=}O)-O[(CF_2)_a-O]_b-$, $-(C{=}O)-O[(CH_2)_a-O]_b-(CH_2)_c-$, $-(C{=}O)-O[(CF_2)_a-O]_b-(CF_2)_c-$, $-(C{=}O)-(CH_2)_a-O-(CH_2)_b-$, $-(C{=}O)-(CF_2)_a-O-(CF_2)_b-$, $-(C{=}O)-O-(CH_2)_a-O(CH_2)_b-$, $-(C{=}O)-O-(CF_2)_a-O(CF_2)_b-$, $-(C{=}O)-O-C_6H_4-$, and combinations thereof.

In the formulas, a, b, c, and d are independently at least 1 or more. a, b, c and d may independently be 2 or more, 3 or more, 4 or more, 10 or more, or 20 or more. The upper limits of a, b, c, and d are 100, for example.

Specific examples suitable for $R^a$ include $-CF_2-O-$, $-CF_2-O-CF_2-$, $-CF_2-O-CH_2-$, $-CF_2-O-CH_2CF_2-$, $-CF_2-O-CF_2CF_2-$, $-CF_2-O-CF_2CH_2-$, $-CF_2-O-CF_2CF_2CH_2-$, $-CF_2-O-CF(CF_3)-$, $-CF_2-O-CF(CF_3)CF_2-$, $-CF_2-O-CF(CF_3)CF_2-O-$, $-CF_2-O-CF(CF_3)CH_2-$, —(C═O)—, —(C═O)—O—, $-(C{=}O)-(CH_2)-$, $-(C{=}O)-(CF_2)-$, $-(C{=}O)-O-(CH_2)-$, $-(C{=}O)-O-(CF_2)-$, $-(C{=}O)-[(CH_2)_2-O]_n-$, $-(C{=}O)-[(CF_2)_2-O]_n-$, $-(C{=}O)-O[(CH_2)_2-O]_n-$, $-(C{=}O)-O[(CF_2)_2-O]_n-$, $-(C{=}O)-O[(CH_2)_2-O]_n-(CH_2)-$, $-(C{=}O)-O[(CF_2)_2-O]_n-(CF_2)-$, $-(C{=}O)-(CH_2)_2-O-(CH_2)-$, $-(C{=}O)-(CF_2)_2-O-(CF_2)-$, $-(C{=}O)-O-(CH_2)_2-O-(CH_2)-$, $-(C{=}O)-O-(CF_2)_2-O-(CF_2)-$, and $-(C{=}O)-O-C_6H_4-$. In particular, preferred for $R^a$ among these is $-CF_2-O-$, $-CF_2-O-CF_2-$, $-CF_2-O-CF_2CF_2-$, $-CF_2-O-CF(CF_3)-$, $-CF_2-O-CF(CF_3)CF_2-$, $-CF_2-O-CF(CF_3)CF_2-O-$, —(C═O)—, —(C═O)—O—, $-(C{=}O)-(CH_2)-$, $-(C{=}O)-O-(CH_2)-$, $-(C{=}O)-O[(CH_2)_2-O]_n-$, $-(C{=}O)-O[(CH_2)_2-O]_n-(CH_2)-$, $-(C{=}O)-(CH_2)_2-O-(CH_2)-$, or $-(C{=}O)-O-C_6H_4-$.

In the above formulas, n is an integer of 1 to 10.

$-R^a-(CZ^1Z^2)_k-$ in the general formula (4) is preferably $-CF_2-O-CF_2-$, $-CF_2-O-CF(CF_3)-$, $-CF_2-O-C(CF_3)_2-$, $-CF_2-O-CF_2-CF_2-$, $-CF_2-O-CF_2-CF(CF_3)-$, $-CF_2-O-CF_2-C(CF_3)_2-$, $-CF_2-O-CF_2CF_2-CF_2-$, $-CF_2-O-CF_2CF_2-CF(CF_3)-$, $-CF_2-O-CF_2CF_2-C(CF_3)_2-$, $-CF_2-O-CF(CF_3)-CF_2-$, $-CF_2-O-CF(CF_3)-CF(CF_3)-$, $-CF_2-O-CF(CF_3)-C(CF_3)_2-$, $-CF_2-O-CF(CF_3)CF_2-CF_2-$, $-CF_2-O-CF(CF_3)CF_2-CF(CF_3)-$, $-CF_2-O-CF(CF_3)CF_2-C(CF_3)_2-$, $-CF_2-O-CF(CF_3)CF_2-O-CF_2-$, $-CF_2-O-CF(CF_3)CF_2-O-CF(CF_3)-$, $-CF_2-O-CF(CF_3)CF_2-O-C(CF_3)_2-$, —(C═O)—, —(C═O)—O—, $-(C{=}O)-(CH_2)-$, $-(C{=}O)-(CF_2)-$, $-(C{=}O)-O-(CH_2)-$, $-(C{=}O)-O-(CF_2)-$, $-(C{=}O)-[(CH_2)_2-O]_n-(CH_2)-$, $-(C{=}O)-[(CF_2)_2-O]_n-(CF_2)-$, $-(C{=}O)-[(CH_2)_2-O]_n-(CH_2)-(CH_2)-$, $-(C{=}O)-[(CF_2)_2-O]_n-(CF_2)-(CF_2)-$, $-(C{=}O)-O[(CH_2)_2-O]_n-(CF_2)-$, $-(C{=}O)-O[(CH_2)_2-O]_n-(CH_2)-(CH_2)-$, $-(C{=}O)-O[(CF_2)_2-O]_n-(CF_2)-$, $-(C{=}O)-O[(CF_2)_2-O]_n-(CF_2)-(CF_2)-$, $-(C{=}O)-(CH_2)_2-O-(CH_2)-(CH_2)-$, $-(C{=}O)-(CF_2)_2-O-(CF_2)-(CF_2)-$, $-(C{=}O)-O-(CH_2)_2-O-(CH_2)-(CH_2)-$, $-(C{=}O)-O-(CF_2)_2-O-(CF_2)-(CF_2)-$, $-(C{=}O)-O-(CH_2)_2-O-(CH_2)-C(CF_3)_2-$, $-(C{=}O)-O-(CF_2)_2-O-(CF_2)-C(CF_3)_2-$, or $-(C{=}O)-O-C_6H_4-C(CF_3)_2-$, and more preferably $-CF_2-O-CF(CF_3)-$, $-CF_2-O-CF_2-CF(CF_3)-$, $-CF_2-O-CF_2CF_2-CF(CF_3)-$, $-CF_2-O-CF(CF_3)-CF(CF_3)-$, $-CF_2-O-CF(CF_3)CF_2-CF(CF_3)-$, $-CF_2-O-CF(CF_3)CF_2-O-CF(CF_3)-$, —(C═O)—, $-(C{=}O)-O-(CH_2)-$, $-(C{=}O)-O-(CH_2)-(CH_2)-$, $-(C{=}O)-O[(CH_2)_2-O]_n-(CH_2)-(CH_2)-$, $-(C{=}O)-O-(CH_2)_2-O-(CH_2)-C(CF_3)_2-$, or $-(C{=}O)-O-C_6H_4-C(CF_3)_2-$.

In the above formulas, n is an integer of 1 to 10.

Specific examples of the compound represented by the general formula (4) include compounds represented by the following formulas:

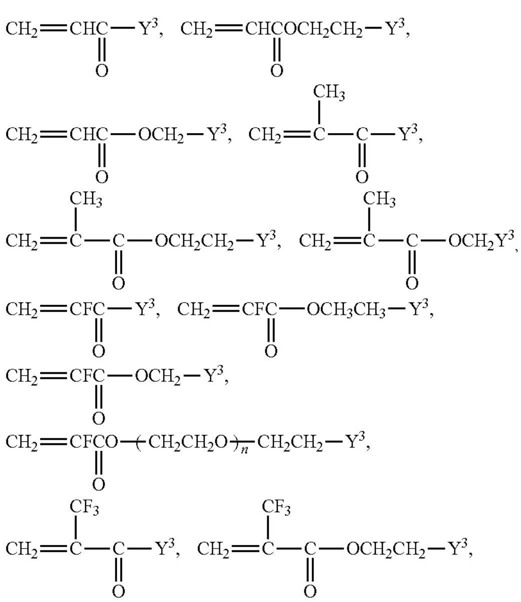

(i)

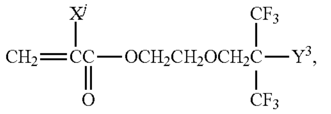

(ii)

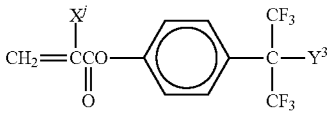

wherein $X^j$ and $Y^3$ are the same as described above; and n is an integer of 1 to 10.

$R^a$ is preferably a divalent group represented by the general formula (r1):

$$(C{=}O)_h—(O)_i—CF_2—O—(CX^{62})_e—\{O—CF(CF_3)\}_f—(O)_g— \quad (r1)$$

wherein $X^6$ is each independently H, F, or $CF_3$; e is an integer of 0 to 3; f is an integer of 0 to 3; g is 0 or 1; h is 0 or 1; and i is 0 or 1, and is also preferably a divalent group represented by the general formula (r2):

$$(C{=}O)_h—(O)_i—CF_2—O—(CX^7{}_2)_e—(O)_g— \quad (r2)$$

wherein $X^7$ is each independently H, F, or $CF_3$; e is an integer of 0 to 3; g is 0 or 1; h is 0 or 1; and i is 0 or 1.

$—R^a—(CZ^1Z^2)_k—$ in the general formula (4) is also preferably a divalent group represented by the following formula (t1):

$$—(C)\mathbf{50}\ O)_n—(O)_i—CF_2—O—(CX^6{}_2)_e—\{O—CF(CF_3)\}_f—(O)_g—CZ^1Z^2— \quad (t1)$$

wherein $X^6$ is each independently H, F, or $CF_3$; e is an integer of 0 to 3; f is an integer of 0 to 3; g is 0 or 1; h is 0 or 1; i is 0 or 1; and $Z^1$ and $Z^2$ are each independently F or $CF_3$, and is more preferably a group in which one of $Z^1$ and $Z^2$ is F and the other is $CF_3$ in formula (t1).

Also, in the general formula (4), $—R^a—(CZ^1Z^2)_k$ is preferably a divalent group represented by the following formula (t2):

$$—(C{=}O)_h—(O)_i—CF_2—O—(CX^7{}_2)_e—(O)_g—CZ^1Z^2— \quad (t2)$$

wherein $X^7$ is each independently H, F, or $CF_3$; e is an integer of 0 to 3; g is 0 or 1; h is 0 or 1; i is 0 or 1; and $Z^1$ and $Z^2$ are each independently F or $CF_3$, and is more preferably a group in which one of $Z^1$ and $Z^2$ is F and the other is $CF_3$ in formula (t2).

The compound represented by the general formula (4) also preferably has a C—F bond and does not have a C—H bond, in the portion excluding the hydrophilic group ($Y^3$). In other words, in the general formula (4), $X^i$, $X^j$, and $X^k$ are all F, and $R^a$ is preferably a perfluoroalkylene group having 1 or more carbon atoms; the perfluoroalkylene group may be either linear or branched, may be either cyclic or acyclic, and may contain at least one catenary heteroatom. The perfluoroalkylene group may have 2 to 20 carbon atoms or 4 to 18 carbon atoms.

The compound represented by the general formula (4) may be partially fluorinated. In other words, the compound represented by the general formula (4) also preferably has at least one hydrogen atom bonded to a carbon atom and at least one fluorine atom bonded to a carbon atom, in the portion excluding the hydrophilic group ($Y^3$).

The compound represented by the general formula (4) is also preferably a compound represented by the following formula (4a):

$$CF_2{=}CF—O—Rf^0—Y^3 \quad (4a)$$

wherein $Y^3$ is a hydrophilic group; and $Rf^0$ is a perfluorinated divalent linking group which is perfluorinated and may be a linear or branched, cyclic or acyclic, saturated or unsaturated, substituted or unsubstituted, and optionally contains one or more heteroatoms selected from the group consisting of sulfur, oxygen, and nitrogen.

The compound represented by the general formula (4) is also preferably a compound represented by the following formula (4b):

$$CH_2{=}CH—O—Rf^0—Y^3 \quad (4b)$$

wherein $Y^3$ is a hydrophilic group; and $Rf^0$ is a perfluorinated divalent linking group as defined in formula (4a).

In a preferred embodiment, $Y^3$ in the general formula (4) is $—OSO_3M$. Examples of the compound represented by the general formula (4) when $Y^3$ is $—OSO_3M$ include $CF_2{=}CF(OCF_2CF_2CH_2OSO_3M)$, $CH_2{=}CH((CF_2)_4CH_2OSO_3M)$, $CF_2{=}CF(O(CF_2)_4CH_2OSO_3M)$, $CF_2{=}CF(OCF_2CF(CF_3)CH_2OSO_3M)$, $CF_2{=}CF(OCF_2CF(CF_3)OCF_2CF_2CH_2OSO_3M)$, $CH_2{=}CH((CF_2)_4CH_2OSO_3M)$, $CF_2{=}CF(OCF_2CF_2SO_2N(CH_3)CH_2CH_2OSO_3M)$, $CH_2{=}CH(CF_2CF_2CH_2OSO_3M)$, and $CF_2{=}CF(OCF_2CF_2CF_2CF_2SO_2N(CH_3)CH_2CH_2OSO_3M)$. In the above formulas, M is the same as described above.

In a preferred embodiment, $Y^3$ in the general formula (4) is $—SO_3M$. Examples of the compound represented by the general formula (4) when $Y^3$ is $—SO_3M$ include $CF_2{=}CF(OCF_2CF_2SO_3M)$, $CF_2{=}CF(O(CF_2)_4SO_3M)$, $CF_2{=}CF(OCF_2CF(CF_3)SO_3M)$, $CF_2{=}CF(OCF_2CF(CF_3)OCF_2CF_2SO_3M)$, $CH_2{=}CH(CF_2CF_2SO_3M)$, $CF_2{=}CF(OCF_2CF(CF_3)OCF_2CF_2CF_2CF_2SO_3M)$, $CH_2{=}CH((CF_2)_4SO_3M)$, and $CH_2{=}CH((CF_2)_3SO_3M)$. In the above formulas, M is the same as described above.

In a preferred embodiment, $Y^3$ in the general formula (4) is —COOM. Examples of the compound represented by the general formula (4) when $Y^3$ is —COOM include $CF_2{=}CF(OCF_2CF_2COOM)$, $CF_2{=}CF(OCF_2CF_2CF_2COOM)$, $CF_2{=}CF(O(CF_2)_5COOM)$, $CF_2{=}CF(OCF_2CF(CF_3)COOM)$, $CF_2{=}CF(OCF_2CF(CF_3)O(CF_2)_nCOOM)$ (n is greater than 1), $CH_2{=}CH(CF_2CF_2COOM)$, $CH_2{=}CH((CF_2)_4COOM)$, $CH_2{=}CH((CF_2)_3COOM)$, $CF_2{=}CF(OCF_2CF_2SO_2NR'CH_2COOM)$, $CF_2{=}CF(O(CF_2)_4SO_2NR'CH_2COOM)$, $CF_2{=}CF(OCF_2CF(CF_3)SO_2NR'CH_2COOM)$, $CF_2{=}CF(OCF_2CF(CF_3)OCF_2CF_2SO_2NR'CH_2COOM)$, $CH_2{=}CH(CF_2CF_2SO_2NR'CH_2COOM)$, $CF_2{=}CF(OCF_2CF(CF_3)OCF_2CF_2CF_2CF_2SO_2NR'CH_2COOM)$, $CH_2{=}CH((CF_2)_4SO_2NR'CH_2COOM)$, and $CH_2{=}CH((CF_2)_3SO_2NR'CH_2COOM)$. In the above formulas, $R^1$ is H or a $C_{1-4}$ alkyl group, and M is the same as described above.

In a preferred embodiment, $Y^3$ in the general formula (4) is $—OP(O)(OM)_2$. Examples of the compound represented by the general formula (4) when $Y^3$ is $—OP(O)(OM)_2$ include $CF_2{=}CF(OCF_2CF_2CH_2OP(O)(OM)_2)$, $CF_2{=}CF(O(CF_2)_4CH_2OP(O)(OM)_2)$, $CF_2{=}CF(OCF_2CF(CF_3)CH_2OP(O)(OM)_2)$, $CF_2{=}CF(OCF_2CF(CF_3)OCF_2CF_2CH_2OP(O)(OM)_2)$, $CF_2{=}CF(OCF_2CF_2SO_2N(CH_3)CH_2CH_2OP(O)(OM)_2)$, $CF_2{=}CF(OCF_2CF_2CF_2CF_2SO_2N(CH_3)CH_2CH_2OP(O)(OM)_2)$, $CH_2{=}CH(CF_2CF_2CH_2OP(O)(OM)_2$, $CH_2{=}CH((CF_2)_4CH_2OP(O)(OM)_2)$, and $CH_2{=}CH((CF_2)_3CH_2OP(O)(OM)_2)$. In the above formulas, M is the same as described above.

In a preferred embodiment, $Y^3$ in the general formula (4) is $—P(O)(OM)_2$. Examples of the compound represented by the general formula (4) when $Y^3$ is $—P(O)(OM)_2$ include $CF_2{=}CF(OCF_2CF_2P(O)(OM)_2)$, $CF_2{=}CF(O(CF_2)_4P(O)(OM)_2)$, $CF_2{=}CF(OCF_2CF(CF_3)P(O)(OM)_2)$, $CF_2{=}CF(OCF_2CF(CF_3)OCF_2CF_2P(O)(OM)_2)$, $CH_2{=}CH(CF_2CF_2P(O)(OM)_2)$, $CH_2{=}CH((CF_2)_4P(O)(OM)_2)$, and $CH_2{=}CH((CF_2)_3P(O)(OM)_2)$, and in the formulas, M is the same as described above.

The compound represented by the general formula (4) is preferably at least one selected from the group consisting of:

a compound represented by the general formula (5):

$$CX_2{=}CY(—CZ_2—O—Rf—Y^3) \quad (5)$$

wherein X is the same or different and is —H or —F; Y is —H, —F, an alkyl group, or a fluorine-containing alkyl group; Z is the same or different and —H, —F, an alkyl group, or a fluorine-containing alkyl group; Rf is a fluorine-containing alkylene group having 1 to 40 carbon atoms or a fluorine-containing alkylene group having 2 to 100 carbon atoms and having an ether bond; and $Y^3$ is the same as described above;

a compound represented by the general formula (6):

$$CX_2{=}CY(—O—Rf—Y^3) \quad (6)$$

wherein X is the same or different and is —H or —F; Y is —H, —F, an alkyl group, or a fluorine-containing alkyl group; Rf is a fluorine-containing alkylene group having 1 to 40 carbon atoms or a fluorine-containing alkylene group having 2 to 100 carbon atoms and having an ether bond; and $Y^3$ is the same as described above; and a compound represented by the general formula (7):

$$CX_2{=}CY(—Rf—Y^3) \quad (7)$$

wherein X is the same or different and is —H or —F; Y is —H, —F, an alkyl group, or a fluorine-containing alkyl group; Rf is a fluorine-containing alkylene group having 1 to 40 carbon atoms or a fluorine-containing alkylene group having 2 to 100 carbon atoms and having an ether bond; and $Y^3$ is the same as described above.

The fluorine-containing alkylene group having 2 to 100 carbon atoms and having an ether bond is an alkylene group which does not include a structure wherein an oxygen atom is an end and which contains an ether bond between carbon atoms.

In the general formula (5), each X is —H or —F. X may be both —F, or at least one thereof may be —H. For example, one thereof may be —F and the other may be —H, or both may be —H.

In the general formula (5), Y is —H, —F, an alkyl group, or a fluorine-containing alkyl group.

The alkyl group is an alkyl group free from fluorine atoms and may have one or more carbon atoms. The alkyl group preferably has 6 or less carbon atoms, more preferably 4 or less carbon atoms, and even more preferably 3 or less carbon atoms.

The fluorine-containing alkyl group is an alkyl group containing at least one fluorine atom, and may have one or more carbon atoms. The fluorine-containing alkyl group preferably has 6 or less carbon atoms, more preferably 4 or less carbon atoms, and even more preferably 3 or less carbon atoms.

Y is preferably —H, —F, or $—CF_3$, and more preferably —F.

In the general formula (5), Z is the same or different and is —H, —F, an alkyl group, or a fluoroalkyl group.

The alkyl group is an alkyl group free from fluorine atoms and may have one or more carbon atoms. The alkyl group preferably has 6 or less carbon atoms, more preferably 4 or less carbon atoms, and even more preferably 3 or less carbon atoms.

The fluorine-containing alkyl group is an alkyl group containing at least one fluorine atom, and may have one or more carbon atoms. The fluorine-containing alkyl group preferably has 6 or less carbon atoms, more preferably 4 or less carbon atoms, and even more preferably 3 or less carbon atoms.

Z is preferably —H, —F, or $—CF_3$, and more preferably —F.

In the general formula (5), at least one of X, Y, and Z preferably contains a fluorine atom. For example, X may be —H, and Y and Z may be —F.

In the general formula (5), Rf is a fluorine-containing alkylene group having 1 to 40 carbon atoms or a fluorine-containing alkylene group having 2 to 100 carbon atoms and having an ether bond.

The fluorine-containing alkylene group preferably has 2 or more carbon atoms. The fluorine-containing alkylene group also preferably has 30 or less carbon atoms, more preferably 20 or less carbon atoms, and even more preferably 10 or less carbon atoms. Examples of the fluorine-containing alkylene group include $—CF_2—$, $—CH_2CF_2—$, $—CF_2CF_2—$, $—CF_2CH_2—$, $—CF_2CF_2CH_2—$, $—CF(CF_3)—$, $—CF(CF_3)CF_2—$, and $—CF(CF_3)CH_2—$. The fluorine-containing alkylene group is preferably a perfluoroalkylene group.

The fluorine-containing alkylene group having an ether bond preferably has 3 or more carbon atoms. Further, the fluorine-containing alkylene group having an ether bond preferably has 60 or less carbon atoms, more preferably 30 or less carbon atoms, and even more preferably 12 or less carbon atoms.

The fluorine-containing alkylene group having an ether bond is, for example, also preferably a divalent group represented by the following formula:

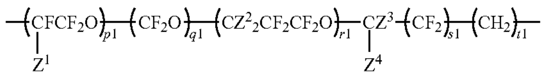

wherein $Z^1$ is F or $CF_3$; $Z^2$ and $Z^3$ are each H or F; $Z^4$ is H, F, or $CF_3$; p1+q1+r1 is an integer of 1 to 10; s1 is 0 or 1; and t1 is an integer of 0 to 5.

Specific examples of the fluorine-containing alkylene group having an ether bond include $—CF(CF_3)CF_2—O—CF(CF_3)—$, $—(CF(CF_3)CF_2—O)_n—CF(CF_3)—$ (wherein n is an integer of 1 to 10), $—CF(CF_3)CF_2—O—CF(CF_3)CH_2—$, $—(CF(CF_3)CF_2—O)_n—CF(CF_3)CH_2-$(wherein n is an integer of 1 to 10), $—CH_2CF_2CF_2O—CH_2CF_2CH_2—$, $—CF_2CF_2CF_2O—CF_2CF_2—$, $—CF_2CF_2CF_2O—CF_2CF_2CH_2—$, $—CF_2CF_2O—CF_2—$, and $—CF_2CF_2O—CF_2CH_2—$. The fluorine-containing alkylene group having an ether bond is preferably a perfluoroalkylene group.

In the general formula (5), $Y^3$ is preferably —COOM, $—SO_3M$, or $—OSO_3M$, wherein M is H, a metal atom, $NR^{7y}_4$, imidazolium optionally having a substituent, pyridinium optionally having a substituent, or phosphonium optionally having a substituent, where $R^{7y}$ is H or an organic group, and may be the same or different, and any two thereof may be bonded to each other to form a ring.

The organic group in $R^{7y}$ is preferably an alkyl group.

$R^{7y}$ is preferably H or a $C_{1-10}$ organic group, more preferably H or a $C_{1-4}$ organic group, and even more preferably H or a $C_{1-4}$ alkyl group.

Examples of the metal atom include alkali metals (Group 1) and alkaline earth metals (Group 2), and preferred is Na, K, or Li.

M is preferably —H, a metal atom, or $NR^7_4$, more preferably —H, an alkali metal (Group 1), an alkaline earth metal (Group 2), or $NR^7_4$, even more preferably —H, —Na, —K, —Li, or $NH_4$, further preferably —H, —Na, —K, or $NH_4$, particularly preferably —H, —Na, or $NH_4$, and most preferably —H or $—NH_4$.

$Y^3$ is preferably —COOM or $—SO_3M$, and more preferably —COOM.

The compound represented by the general formula (5) is preferably a compound (5a) represented by the general formula (5a):

$$CH_2{=}CF(—CF_2—O—Rf—Y^3) \quad (5a)$$

wherein Rf and $Y^3$ are the same as described above.

Specific examples of the compound represented by the general formula (5a) include a compound represented by the following formula:

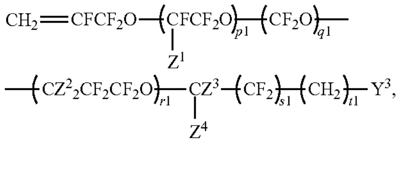

wherein $Z^1$ is F or $CF_3$; $Z^2$ and $Z^3$ are each H or F; $Z^4$ is H, F, or $CF_3$; p1+q1+r1 is an integer of 0 to 10; s1 is 0 or 1; t1 is an integer of 0 to 5; and $Y^3$ is the same as described above, with the proviso that when $Z^3$ and $Z^4$ are both H, p1+q1+r1+s1 is not 0. More specifically, preferred examples thereof include:

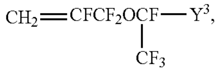, 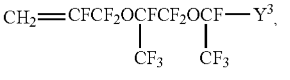,

-continued

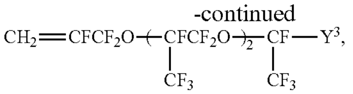

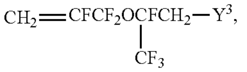

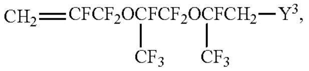

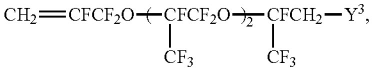

$CH_2{=}CFCF_2OCH_2CF_2—Y^3$, $CH_2{=}CFCF_2O(CH_2CF_2CF_2O)CH_2CF_2-Y^3$, $CH_2{=}CFCF_2OCH_2CF_2CH_2—Y^3$, $CH_2{=}CFCF_2O(CH_2CF_2CF_2O)CH_2CF_2CH_2-Y^3$, $CH_2{=}CFCF_2OCF_2CF_2—Y^3$, $CH_2{=}CFCF_2O(CF_2CF_2CF_2O)CF_2CF_2—Y^3$, $CH_2{=}CFCF_2OCF_2CF_2CH_2—Y^3$, $CH_2{=}CFCF_2O(CF_2CF_2CF_2O)CF_2CF_2CH_2—Y^3$, $CH_2{=}CFCF_2OCF_2-Y^3$, $CH_2{=}CFCF_2O(CF_2CF_2O)CF_2—Y^3$, $CH_2{=}CFCF_2OCF_2CH_2—Y^3$, $CH_2{=}CFCF_2O(CF_2CF_2O)CF_2CH_2—Y^3$,

Of these,

, 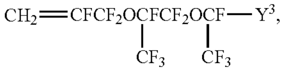

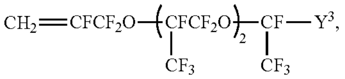

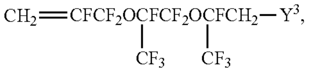

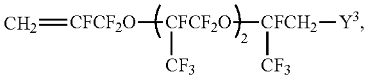

are preferred.

In the compound represented by the general formula (5a), $Y^3$ in formula (5a) is preferably —COOM. Specifically, the compound represented by the general formula (5a) is preferably at least one selected from the group consisting of $CH_2{=}CFCF_2OCF(CF_3)COOM$ and $CH_2{=}CFCF_2OCF(CF_3)CF_2OCF(CF_3)COOM$ (wherein M is the same as defined above), and more preferably $CH_2{=}CFCF_2OCF(CF_3)COOM$.

The compound represented by the general formula (5) is preferably a compound (5b) represented by the general formula (5b):

$$CX^2_2{=}CFCF_2—O—(CF(CF_3)CF_2O)_{n5}—CF(CF_3)—Y^3 \quad (5b)$$

wherein each $X^2$ is the same, and each represents F or H; n5 represents 0 or an integer of 1 to 10; and $Y^3$ is the same as defined above.

In formula (5b), n5 is preferably 0 or an integer of 1 to 5, more preferably 0, 1, or 2, and even more preferably 0 or 1 from the viewpoint of stability of the resulting aqueous dispersion. $Y^3$ is preferably —COOM from the viewpoint of obtaining appropriate water solubility and stability of the aqueous dispersion, and M is preferably H or $NH_4$ from the viewpoint of being less likely to remain as impurities and improving the heat resistance of the resulting formed article.

Examples of the compound represented by formula (5b) include $CH_2{=}CFCF_2OCF(CF_3)COOM$ and $CH_2{=}CFCF_2OCF(CF_3)CF_2OCF(CF_3)COOM$, wherein M is the same as defined above.

Examples of the compound represented by the general formula (5) further include a compound represented by the general formula (5c):

$$CF_2{=}CFCF_2{-}O{-}Rf{-}Y^3 \quad (5c)$$

wherein Rf and $Y^3$ are the same as described above.

More specific examples thereof include:

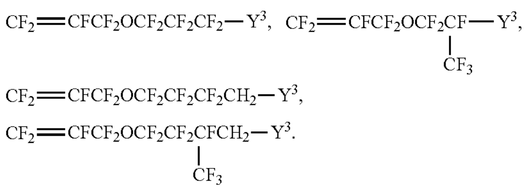

In the general formula (6), each X is —H or —F. X may be both —F, or at least one thereof may be —H. For example, one thereof may be —F and the other may be —H, or both may be —H.

In the general formula (6), Y is —H, —F, an alkyl group, or a fluorine-containing alkyl group.

The alkyl group is an alkyl group free from fluorine atoms and may have one or more carbon atoms. The alkyl group preferably has 6 or less carbon atoms, more preferably 4 or less carbon atoms, and even more preferably 3 or less carbon atoms.

The fluorine-containing alkyl group is an alkyl group containing at least one fluorine atom, and may have one or more carbon atoms. The fluorine-containing alkyl group preferably has 6 or less carbon atoms, more preferably 4 or less carbon atoms, and even more preferably 3 or less carbon atoms.

Y is preferably —H, —F, or $—CF_3$, and more preferably —F.

In the general formula (6), at least one of X and Y preferably contains a fluorine atom. For example, X may be —H, and Y and Z may be —F.

In the general formula (6), Rf is a fluorine-containing alkylene group having 1 to 40 carbon atoms or a fluorine-containing alkylene group having 2 to 100 carbon atoms and having an ether bond.

The fluorine-containing alkylene group preferably has 2 or more carbon atoms. Further, the fluorine-containing alkylene group preferably has 30 or less carbon atoms, more preferably 20 or less carbon atoms, and even more preferably 10 or less carbon atoms. Examples of the fluorine-containing alkylene group include $—CF_2—$, $—CH_2CF_2—$, $—CF_2CF_2—$, $—CF_2CH_2—$, $—CF_2CF_2CH_2—$, $—CF(CF_3)—$, $—CF(CF_3)CF_2—$, and $—CF(CF_3)CH_2—$. The fluorine-containing alkylene group is preferably a perfluoroalkylene group.

In the general formula (6), $Y^3$ is preferably —COOM, $—SO_3M$, or $—OSO_3M$, wherein M is H, a metal atom, $NR^{7y}_4$, imidazolium optionally having a substituent, pyridinium optionally having a substituent, or phosphonium optionally having a substituent, where $R^{7y}$ is H or an organic group, and may be the same or different, and any two thereof may be bonded to each other to form a ring.

The organic group of $R^{7y}$ is preferably an alkyl group. $R^{7y}$ is preferably H or a $C_{1-10}$ organic group, more preferably H or a $C_{1-4}$ organic group, and even more preferably H or a $C_{1-4}$ alkyl group.

Examples of the metal atom include alkali metals (Group 1) and alkaline earth metals (Group 2), and preferred is Na, K, or Li.

M is preferably —H, a metal atom, or $NR^7_4$, more preferably —H, an alkali metal (Group 1), an alkaline earth metal (Group 2), or $NR^7_4$, even more preferably —H, —Na, —K, —Li, or $NH_4$, further preferably —H, —Na, —K, or $NH_4$, particularly preferably —H, —Na, or $NH_4$, and most preferably —H or $—NH_4$.

$Y^3$ is preferably —COOM or $—SO_3M$, and more preferably —COOM.

The compound represented by the general formula (6) is preferably at least one selected from the group consisting of compounds represented by general formulas (6a), (6b), (6c), (6d), and (6e):

$$CF_2{=}CF{-}O{-}(CF_2)_{n1}{-}Y^3 \quad (6a)$$

wherein n1 represents an integer of 1 to 10, and $Y^3$ is the same as defined above;

$$CF_2{=}CF{-}O{-}(CF_2C(CF_3)F)_{n2}{-}Y^3 \quad (6b)$$

wherein n2 represents an integer of 1 to 5, and $Y^3$ is the same as defined above;

$$CF_2{=}CF{-}O{-}(CFX^1)_{n3}{-}Y^3 \quad (6c)$$

wherein $X^1$ represents F or $CF_3$, n3 represents an integer of 1 to 10, and $Y^3$ is the same as defined above;

$$CF_2{=}CF{-}O{-}(CF_2CFX^1)_{n4}{-}(CF_2)_{n6}{-}Y^3 \quad (6d)$$

wherein n4 represents an integer of 1 to 10, n6 represents an integer of 1 to 3, and $Y^3$ and $X^1$ are the same as defined above; and $$CF_2{=}CF{-}O{-}(CF_2CF_2CFX^1O)_{n5}{-}CF_2CF_2CF_2{-}Y^3 \quad (6e)$$

wherein n5 represents an integer of 0 to 10, and $Y^3$ and $X^1$ are the same as defined above.

In formula (6a), n1 is preferably an integer of 5 or less, and more preferably an integer of 2 or less. $Y^3$ is preferably —COOM from the viewpoint of obtaining appropriate water solubility and stability of the aqueous dispersion, and M is preferably H or $NH_4$ from the viewpoint of being less likely to remain as impurities and improving the heat resistance of the resulting formed article.

Examples of the compound represented by formula (6a) include $CF_2{=}CF{-}O{-}CF_2COOM$, $CF_2{=}CF(OCF_2CF_2COOM)$, $CF_2{=}CF(OCF_2CF_2CF_2COOM)$, and $CF_2{=}CF(OCF_2CF_2SO_3M)$, wherein M is the same as defined above.

In formula (6b), n2 is preferably an integer of 3 or less from the viewpoint of stability of the resulting aqueous dispersion, $Y^3$ is preferably —COOM from the viewpoint of obtaining appropriate water solubility and stability of the aqueous dispersion, and M is preferably H or $NH_4$ from the viewpoint of being less likely to remain as impurities and improving the heat resistance of the resulting formed article.

In formula (6c), n3 is preferably an integer of 5 or less from the viewpoint of water solubility, $Y^3$ is preferably —COOM from the viewpoint of obtaining appropriate water solubility and stability of the aqueous dispersion, and M is preferably H or $NH_4$ from the viewpoint of improving dispersion stability.

In formula (6d), $X^1$ is preferably $-CF_3$ from the viewpoint of stability of the aqueous dispersion, n4 is preferably an integer of 5 or less from the viewpoint of water solubility, $Y^3$ is preferably —COOM from the viewpoint of obtaining appropriate water solubility and stability of the aqueous dispersion, and M is preferably H or $NH_4$.

Examples of the compound represented by formula (6d) include $CF_2{=}CFOCF_2CF(CF_3)OCF_2CF_2COOM$, $CF_2{=}CFOCF_2CF(CF_3)OCF_2COOM$, and $CF_2{=}CFOCF_2CF(CF_3)OCF_2CF_2CF_2COOM$ (wherein M represents H, $NH_4$, or an alkali metal).

In the general formula (6e), n5 is preferably an integer of 5 or less in terms of water solubility, $Y^3$ is preferably —COOM in terms of obtaining appropriate water solubility and stability of the aqueous dispersion, and M is preferably H or $NH_4$.

Examples of the compound represented by the general formula (6e) include $CF_2{=}CFOCF_2CF_2CF_2COOM$ (wherein M represents H, $NH_4$, or an alkali metal).

In the general formula (7), Rf is preferably a fluorine-containing alkylene group having 1 to 40 carbon atoms. In the general formula (7), at least one of X and Y preferably contains a fluorine atom.

The compound represented by the general formula (7) is preferably at least one selected from the group consisting of:

a compound represented by the general formula (7a):

$$CF_2{=}CF{-}(CF_2)_{n1}{-}Y^3 \quad (7a)$$

wherein n1 represents an integer of 1 to 10, and $Y^3$ is the same as defined above; and a compound represented by the general formula (7b):

$$CF_2{=}CF{-}(CF_2C(CF_3)F)_{n2}{-}Y^3 \quad (7b)$$

wherein n2 represents an integer of 1 to 5, and $Y^3$ is the same as defined above.

$Y^3$ is preferably $-SO_3M$ or —COOM, and M is preferably H, a metal atom, $NR^{7y}_4$, imidazolium optionally having a substituent, pyridinium optionally having a substituent, or phosphonium optionally having a substituent. $R^{7y}$ represents H or an organic group.

In general formula (7a), n1 is preferably an integer of 5 or less, and more preferably an integer of 2 or less. $Y^3$ is preferably —COOM from the viewpoint of obtaining appropriate water solubility and stability of the aqueous dispersion, and M is preferably H or $NH_4$ from the viewpoint of being less likely to remain as impurities and improving the heat resistance of the resulting formed article.

Examples of the compound represented by formula (7a) include $CF_2{=}CFCF_2COOM$, wherein M is the same as defined above.

In formula (7b), n2 is preferably an integer of 3 or less from the viewpoint of stability of the resulting aqueous dispersion, $Y^3$ is preferably —COOM from the viewpoint of obtaining appropriate water solubility and stability of the aqueous dispersion, and M is preferably H or $NH_4$ from the viewpoint of being less likely to remain as impurities and improving the heat resistance of the resulting formed article.

The modifying monomer preferably includes the modifying monomer (A), preferably includes at least one selected from the group consisting of the compounds represented by the general formula (5a), general formula (5c), general formula (6a), general formula (6b), general formula (6c), and general formula (6d), and more preferably includes the compound represented by the general formula (5a) or general formula (5c).

When the modifying monomer (A) is used as the modifying monomer, the content of the modifying monomer (A) unit is preferably in the range of 0.00001 to 1.0% by mass based on all polymerization units of the TFE polymer (PTFE). The lower limit is more preferably 0.0001% by mass, more preferably 0.0005% by mass, even more preferably 0.001% by mass, and further preferably 0.005% by mass. The upper limit is, in the order of preference, 0.90% by mass, 0.50% by mass, 0.40% by mass, 0.30% by mass, 0.20% by mass, 0.15% by mass, 0.10% by mass, 0.08% by mass, 0.05% by mass, or 0.01% by mass.

In production of the TFE polymer, as the polymerization initiator, a persulfate (such as ammonium persulfate) and an organic peroxide such as disuccinic acid peroxide or diglutaric acid peroxide can be used alone or in the form of a mixture thereof. Further, the polymerization initiator may be used together with a reducing agent such as sodium sulfite so as to form a redox system. Moreover, the concentration of radicals in the system can be also regulated by adding a radical scavenger such as hydroquinone or catechol or adding a peroxide decomposer such as ammonium sulfite during the polymerization.

The redox polymerization initiator to be used is preferably a redox initiator obtained by combining an oxidizing agent and a reducing agent. Examples of the oxidizing agent include persulfates, organic peroxides, potassium permanganate, manganese triacetate, and ammonium cerium nitrate. Examples of the reducing agent include sulfites, bisulfites, bromates, diimines, and oxalic acid. Examples of the persulfates include ammonium persulfate and potassium persulfate. Examples of the sulfites include sodium sulfite and ammonium sulfite. To increase the decomposition rate of the initiator, preferably a copper salt or an iron salt is also added to the combination of the redox initiator. An example of the copper salt is copper(II) sulfate and an example of the iron salt is iron(II) sulfate.

Examples of the redox initiator include potassium permanganate/oxalic acid, ammonium persulfate/bisulfite/iron sulfate, manganese triacetate/oxalic acid, ammonium cerium nitrate/oxalic acid, and bromate/bisulfite, and potassium permanganate/oxalic acid is preferred. In the case of using a redox initiator, either an oxidizing agent or a reducing agent may be charged into a polymerization tank in advance, followed by adding the other continuously or intermittently thereto to initiate the polymerization. For example, in the case of potassium permanganate/oxalic acid, preferably, oxalic acid is charged into a polymerization tank and potassium permanganate is continuously added thereto.

In the production of the TFE polymer, a known chain transfer agent may be used. Examples thereof include saturated hydrocarbons such as methane, ethane, propane, and butane, halogenated hydrocarbons such as chloromethane, dichloromethane, and difluoroethane, alcohols such as methanol, ethanol, and isopropanol, and hydrogen. The chain transfer agent is preferably one in a gas state at a normal temperature and normal pressure.

The amount of the chain transfer agent used is usually 1 to 10,000 ppm by mass, preferably 1 to 5,000 ppm by mass, based on the total amount of TFE fed.

In production of the TFE polymer, a saturated hydrocarbon that is substantially inert to the reaction, that is in a liquid state under the reaction conditions, and that has 12 or more carbon atoms may be used as a dispersion stabilizer for the reaction system in an amount of 2 to 10 parts by mass based on 100 parts by mass of the aqueous medium. Ammonium carbonate, ammonium phosphate, or the like may be added as a buffer to adjust the pH during the reaction.

At completion of the polymerization for the TFE, an aqueous dispersion having a solid concentration of 1.0 to 50% by mass and having an average primary particle size of 50 to 500 nm can be obtained.

The lower limit of the solid concentration is preferably 5% by mass and more preferably 8% by mass. The upper limit thereof may be, but is not limited to, 40% by mass or 35% by mass.

The lower limit of the average primary particle size is preferably 100 nm and more preferably 150 nm. The upper limit thereof is preferably 400 nm and more preferably 350 nm.

The average primary particle size can be measured by dynamic light scattering. The average primary particle size can be measured by preparing an aqueous dispersion with a solid concentration being adjusted to about 1.0% by mass and using dynamic light scattering at 25° C. with 70 measurement processes, wherein the solvent (water) has a refractive index of 1.3328 and the solvent (water) has a viscosity of 0.8878 mPa·s. For the dynamic light scattering, ELSZ-1000S (manufactured by Otsuka Electronics Co., Ltd.) may be used, for example.

The production method of the present disclosure may further comprise adding the modifying monomer to the aqueous medium prior to the initiation of polymerization or before the concentration of PTFE formed in the aqueous medium reaches 5.0% by mass. The addition of the modifying monomer at the initial stage of the polymerization reaction allows for obtaining an aqueous dispersion having a small average primary particle size, a small aspect ratio of primary particles, and excellent stability. In other words, the modifying monomer may be added before the initiation of polymerization, or may be added at the same time as the initiation of polymerization, or the modifying monomer may be added during the period in which the nuclei of PTFE particles are formed after the polymerization is initiated.

Fine powder can be produced by coagulating the aqueous dispersion. The aqueous dispersion of the TFE polymer can be formed into fine powder through coagulation, washing, and drying. The resulting fine powder can be used for various applications. Coagulation of the aqueous dispersion of the TFE polymer is usually performed by diluting the aqueous dispersion obtained by polymerization, such as polymer latex, with water to a polymer concentration of 5 to 20% by mass, optionally adjusting the pH to neutrality or alkalinity, and then stirring the polymer more vigorously than during the reaction in a vessel equipped with a stirrer. The coagulation may be performed under stirring while adding a water-soluble organic compound such as methanol or acetone, an inorganic salt such as potassium nitrate or ammonium carbonate, or an inorganic acid such as hydrochloric acid, sulfuric acid, or nitric acid as a coagulating agent. The coagulation may be continuously performed using a device such as an inline mixer.

From the viewpoint of productivity, the concentration of the non-agglomerated TFE polymer in the discharge water generated by the agglomeration is preferably low, more preferably less than 0.4% by mass, and particularly preferably less than 0.3% by mass.

Pigment-containing or filler-containing TFE polymer fine powder in which pigments and fillers are uniformly mixed can be obtained by adding pigments for coloring and various fillers for improving mechanical properties before or during the coagulation.

The wet powder obtained by coagulating the TFE polymer in the aqueous dispersion is usually dried by means of vacuum, high-frequency waves, hot air, or the like while keeping the wet powder in a state in which the wet powder is less fluidized, preferably in a stationary state. Friction between the powder particles especially at high temperature usually has unfavorable effects on the TFE polymer in the form of fine powder. This is because the particles made of such a TFE polymer are easily formed into fibrils even with a small shearing force and lose its original, stable particulate structure.

The drying is performed at a drying temperature of 10 to 300° C., preferably 100 to 300° C.

The resulting fine powder of the TFE polymer is preferred for forming, and suitable applications thereof include tubes for hydraulic systems or fuel systems of aircraft or automobiles, flexible hoses for chemicals or vapors, and electric wire coating.

The aqueous dispersion of the TFE polymer obtained by the polymerization is preferably mixed with a nonionic surfactant to stabilize and further concentrate the aqueous dispersion, and then further mixed with, depending on its purpose, an organic or inorganic filler to form a composition and used in a variety of applications. The composition, when applied to a metal or ceramic substrate, can provide a coating surface having non-stickiness, a low coefficient of friction, and excellent gloss, smoothness, abrasion resistance, weather resistance, and heat resistance, which is suitable for coating of rolls and cooking utensils, impregnation of glass cloth, and the like.

The aqueous dispersion may also be used to prepare an organosol of the TFE polymer. The organosol may contain the TFE polymer and an organic solvent, and examples of the organic solvent include ether-based solvents, ketone-based solvents, alcohol-based solvents, amide-based solvents, ester-based solvents, aliphatic hydrocarbon-based solvents, aromatic hydrocarbon-based solvents, and halogenated hydrocarbon-based solvents. Preferably used are N-methyl-2-pyrrolidone and dimethylacetamide. The organosol may be prepared by the method disclosed in International Publication No. WO 2012/002038, for example.

The aqueous dispersion of the TFE polymer or the fine powder of the TFE polymer is also preferably used as a processing aid. When used as a processing aid, the aqueous dispersion or the fine powder is mixed with a host polymer, for example, to improve the melt strength of the host polymer in melt fabrication and to improve the mechanical strength, electric properties, incombustibility, anti-drop performance during combustion, and slidability of the resulting polymer.

The aqueous dispersion of the TFE polymer or the fine powder of the TFE polymer is also preferably used as a binder for batteries or used for dustproof applications.

The aqueous dispersion of the TFE polymer or the fine powder of the TFE polymer is also preferably combined with a resin other than the TFE polymer to form a processing aid before use. The aqueous dispersion or fine powder is suitable as a raw material of the PTFEs disclosed in, for example, Japanese Patent Laid-Open No. 11-49912, U.S. Pat. No. 5,804,654, Japanese Patent Laid-Open No. 11-29679, and Japanese Patent Laid-Open No. 2003-2980. Processing aids containing the aqueous dispersion or the fine powder are not inferior in any way to the processing aids disclosed in the publications.

The aqueous dispersion of the TFE polymer is also preferably mixed with an aqueous dispersion of a melt-fabricable fluororesin so that the components coagulate to form co-coagulated powder. The co-coagulated powder is suitable as a processing aid.

Examples of the melt-fabricable fluororesin include FEP, PFA, TFE/perfluoroallyl ether copolymers, ETFE, and ethylene/TFE/HFP copolymers (EFEP), of which PFA or FEP is preferred.

The aqueous dispersion also preferably contains the melt-fabricable fluororesin. Examples of the melt-fabricable fluororesin include FEP, PFA, TFE/perfluoroallyl ether copolymers, ETFE, and EFEP. The aqueous dispersion containing the melt-fabricable fluororesin can be used as a coating material. Since the melt-fabricable fluororesin can sufficiently fuse the particles of the TFE polymer to each other, the film-formability can be improved and the obtained coating film can exhibit gloss.

The fluorine-free resin to which the co-coagulated powder is added may be in the form of powder, pellets, or an emulsion. The addition is preferably performed while applying a shear force by a known method such as extrusion kneading or roll kneading from the viewpoint of sufficiently mixing each resin.

The aqueous dispersion of the TFE polymer is also preferably used as a dust suppression treatment agent. The dust suppression treatment agent may be used in a method for suppressing dust from a dust-generating substance by mixing the dust suppression treatment agent with the dust-generating substance and subjecting the mixture to a compression-shear action at a temperature of 20 to 200° C. to fibrillate the TFE polymer, for example, methods disclosed in Japanese Patent No. 2,827,152 and Japanese Patent No. 2,538,783.

The aqueous dispersion of the TFE polymer can suitably be used for the dust suppression treatment agent composition disclosed in International Publication No. WO 2007/004250, and can also suitably be used for the method of dust suppression treatment disclosed in International Publication No. WO 2007/000812.

The dust suppression treatment agent is suitably used in the fields of building-products, soil stabilizers, solidifying materials, fertilizers, landfill of incineration ash and harmful substance, explosion proof equipment, cosmetics, sands for pet excretion represented by cat sand, and the like.

The aqueous dispersion of the TFE polymer is also preferably used as a material for producing TFE polymer fibers by a dispersion spinning method. The dispersion spinning method is a method in which the aqueous dispersion of the TFE polymer and an aqueous dispersion of a matrix polymer are mixed and the mixture is extruded to form an intermediate fiber structure, and then the intermediate fiber structure is fired to decompose the matrix polymer and sinter the TFE polymer particles, thereby providing TFE polymer fibers.

The high molecular weight PTFE powder obtained by polymerization has stretchability and non melt-processability, and is also useful as a material for a stretched body (porous body).

When the stretched body of the present disclosure is a film (PTFE stretched film or PTFE porous film), the stretched body can be formed by stretching by a known PTFE stretching method. Stretching allows easy formation of fibrils of high molecular weight PTFE, resulting in a PTFE porous body (film) including nodes and fibers.

Preferably, roll-stretching a sheet-shaped or rod-shaped paste extrudate in an extruding direction can provide a uniaxially stretched film.

Further stretching in a transverse direction using a tenter, for example, can provide a biaxially stretched film.

Prebaking treatment is also preferably performed before stretching.

This PTFE stretched body is a porous body having a high porosity, and can suitably be used as a filter material for a variety of microfiltration filters such as air filters and chemical filters and a support member for polymer electrolyte films.

The PTFE stretched body is also useful as a material of products used in the fields of textiles, of medical treatment, of electrochemistry, of sealants, of air filters, of ventilation/internal pressure adjustment, of liquid filters, of consumer goods, and the like.

The following provides examples of specific applications.

Electrochemical Field

Examples of the applications in this field include prepregs for dielectric materials, EMI-shielding materials, and heat conductive materials. More specifically, examples thereof include printed circuit boards, electromagnetic interference shielding materials, insulating heat conductive materials, and insulating materials.

Sealant Field

Examples of the applications in this field include gaskets, packings, pump diaphragms, pump tubes, and sealants for aircraft.

Air Filter Field

Examples of the applications in this field include ULPA filters (for production of semiconductors), HEPA filters (for hospitals and for production of semiconductors), cylindrical cartridge filters (for industries), bag filters (for industries), heat-resistant bag filters (for exhaust gas treatment), heat-resistant pleated filters (for exhaust gas treatment), SINBRAN filters (for industries), catalyst filters (for exhaust gas treatment), adsorbent-attached filters (for HDD embedment), adsorbent-attached vent filters (for HDD embedment), vent filters (for HDD embedment, for example), filters for cleaners (for cleaners), general-purpose multilayer felt materials, cartridge filters for GT (for interchangeable items for GT), and cooling filters (for housings of electronic devices).

Ventilation/Internal Pressure Adjustment Field

Examples of the applications in this field include materials for freeze drying such as vessels for freeze drying, ventilation materials for automobiles for electronic circuits and lamps, applications relating to vessels such as vessel caps, protective ventilation for electronic devices, including small devices such as tablet terminals and mobile phone terminals, and ventilation for medical treatment.

Liquid Filter Field

Examples of the applications in this field include liquid filters for semiconductors (for production of semiconductors), hydrophilic PTFE filters (for production of semiconductors), filters for chemicals (for chemical liquid treatment), filters for pure water production lines (for production of pure water), and back-washing liquid filters (for treatment of industrial discharge water).

Consumer Goods Field

Examples of the applications in this field include clothes, cable guides (movable wires for motorcycles), clothes for motor cyclists, cast liners (medical supporters), filters for cleaners, bagpipes (musical instruments), cables (such as signal cables for guitars), and strings (for string instruments).

Textile Field

Examples of the applications in this field include PTFE fibers (fiber materials), machine threads (textiles) weaving yarns (textiles), and ropes.

Medical Treatment Field

Examples of the applications in this field include implants (stretched articles), artificial blood vessels, catheters, general surgical operations (tissue reinforcing materials), products for head and neck (dura mater alternatives), oral health (tissue regenerative medicine), and orthopedics (bandages).

The production method of the present disclosure may also produce a low molecular weight PTFE.

The low molecular weight PTFE may be produced by polymerization, and can also be produced by reducing the molecular weight of a high molecular weight PTFE obtained by polymerization by a known method (thermal decomposition, radiation decomposition, or the like).

A low molecular weight PTFE having a molecular weight of 600,000 or less (also referred to as PTFE micropowder) has excellent chemical stability and a very low surface energy, and is less likely to generate fibrils, and is therefore suitably used as an additive for improving the lubricity and the texture of the coating surface in production of plastics, inks, cosmetics, coating materials, greases, parts of office automation equipment, and toners (e.g., see Japanese Patent Laid-Open No. 10-147617).

A low molecular weight PTFE may also be obtained by dispersing a polymerization initiator and the compound (1) in an aqueous medium in the presence of a chain transfer agent, and then polymerizing TFE alone or TFE and a monomer copolymerizable with TFE.

In the case of using the low molecular weight PTFE obtained by the polymerization in the form of powder, the powder particles may be obtained by coagulating the aqueous dispersion.

The high molecular weight PTFE as used herein means a non melt-processible and fibrillatable PTFE. On the other hand, the low molecular weight PTFE means a melt-fabricable and non-fibrillatable PTFE.

Being non melt-processible means a property that the melt flow rate cannot be measured at a temperature higher than the crystal melting point in accordance with ASTM D 1238 and D 2116.

The presence or absence of fibrillatability can be determined by "paste extrusion", which is a representative method of forming a "high molecular weight PTFE powder", which is a powder made of a TFE polymer. Usually, a high molecular weight PTFE can be paste-extruded when it is fibrillatable. When a non-sintered formed product obtained by paste extrusion exhibits substantially no strength or elongation (for example, when it exhibits an elongation of 0% and is broken when stretched), it can be regarded as non-fibrillatable.

The high molecular weight PTFE preferably has a standard specific gravity (SSG) of 2.130 to 2.280. The standard specific gravity is determined by the water replacement method in conformity with ASTM D 792 using a sample formed in conformity with ASTM D 4895-89. The "high molecular weight" as used herein means that the standard specific gravity is within the above range.

The low molecular weight PTFE has a melt viscosity of $1\times10^2$ to $7\times10^5$ Pa·s at 380° C. The "low molecular weight" as used herein means that the melt viscosity is within the above range.

The high molecular weight PTFE has a melt viscosity significantly higher than that of the low molecular weight PTFE, and the melt viscosity thereof is difficult to measure accurately. On the other hand, the melt viscosity of the low molecular weight PTFE is measurable, but the low molecular weight PTFE has difficulty in providing a formed product to be used in measurement of the standard specific gravity. Thus, it is difficult to measure its accurate standard specific gravity. Accordingly, in the present disclosure, the standard specific gravity is used as an index of the molecular weight of the high molecular weight PTFE, while the melt viscosity is used as an index of the molecular weight of the low molecular weight PTFE. It should be noted that there is no known measuring method for directly specifying the molecular weight of either the high molecular weight PTFE or the low molecular weight PTFE.

The high molecular weight PTFE preferably has a peak temperature of 333 to 347° C., and more preferably 335 to 345° C. The low molecular weight PTFE preferably has a peak temperature of 322 to 333° C., and more preferably 324 to 332° C. The peak temperature can be specified as a temperature corresponding to the maximum value appearing in a differential thermal analysis (DTA) curve obtained by raising the temperature of PTFE, which has no history of being heated to a temperature of 300° C. or higher, under a condition of 10° C./min using TG-DTA (thermogravimetric–differential thermal analyzer).

Preferably, the high molecular weight PTFE has at least one endothermic peak in the range of 333 to 347° C. on a heat-of-fusion curve with a temperature-increasing rate of 10° C./min using a differential scanning calorimeter (DSC) for a PTFE which has no history of being heated to a temperature of 300° C. or higher, and has an enthalpy of fusion of 52 mJ/mg or more at 290 to 350° C. calculated from the heat-of-fusion curve. The enthalpy of fusion of the PTFE is more preferably 55 mJ/mg or more, and even more preferably 58 mJ/mg or more.

The PTFE fine powder obtained as above may also be used to produce unsintered tape (green tape).

(II) Melt-Fabricable Fluororesin (1) In the production method of the present disclosure, the polymerization for FEP is preferably performed at a polymerization temperature of 10 to 150° C. and a polymerization pressure of 0.3 to 6.0 MPaG.

The FEP preferably has a monomer composition ratio (% by mass) of TFE:HFP=(60 to 95):(5 to 40), more preferably (85 to 92):(8 to 15).

In addition to TFE and HFP, a further monomer that is copolymerizable with these monomers may be polymerized to obtain a copolymer of TFE, HFP, and the further monomer as the FEP. Examples of the further monomer include the fluorine-containing monomers (provided that TFE and HFP are excluded) and fluorine-free monomers described above. One kind or multiple kinds thereof can be used as the further monomer. The further monomer is preferably a perfluoro(alkyl vinyl ether). The content of the further monomer unit in the FEP may be 0.1 to 2% by mass based on all monomer units.

In the polymerization for the FEP, the compound (1) can be used within the use range of the production method of the present disclosure, and is usually added in an amount of 0.0001 to 10% by mass based on 100% by mass of the aqueous medium.

In the polymerization for the FEP, the chain transfer agent used is preferably cyclohexane, methanol, ethanol, propanol, ethane, propane, butane, pentane, hexane, carbon tetrachloride, chloroform, methylene chloride, methyl chloride, or the like, and the pH buffer used is preferably ammonium carbonate, disodium hydrogen phosphate, or the like.

The aqueous dispersion of the FEP obtained by the production method of the present disclosure may optionally be subjected to post-treatment such as concentration, and then the concentrate may be dried and powdered, and the powder may be melt-extruded into pellets. The aqueous medium in the FEP aqueous dispersion may optionally contain an additive such as a nonionic surfactant, and may contain a water-soluble organic solvent such as a water-soluble alcohol or may be free from a water-soluble organic solvent.

The melt extrusion may be performed under any appropriately set extrusion conditions usually capable of providing pellets.

In the production method of the present disclosure, the resulting FEP may contain an end group such as $—CF_3$ or $—CF_2H$ on at least one of the polymer main chain and a polymer side chain, but it is preferable that the content of thermally unstable groups such as —COOH, $—CH_2OH$, —COF, —CF═CF—, $—CONH_2$, or $—COOCH_3$ (hereinafter, referred to as an "unstable end group") is low or absent.

The unstable end group is chemically unstable, and thus not only reduces the heat resistance of the resin but also causes increase in the attenuation of the resulting electric wire.

The production method of the present disclosure is preferably performed in such a way that a polymer in which the total number of unstable end groups and $—CF_2H$ end groups at completion of the polymerization is 50 or less per $1\times10^6$ carbon atoms is produced. The number of such groups is more preferably less than 20, even more preferably 5 or less, per $1\times10^6$ carbon atoms. There may also be neither unstable end groups nor $—CF_2H$ end groups, and that is, all end groups may be $—CF_3$ end groups.

The unstable end groups and the $—CF_2H$ end groups may be fluorinated and converted into the $—CF_3$ end groups and thereby stabilized. Examples of the fluorination method include, but are not limited to, methods of exposing the polymer to a fluorine radical source that generates fluorine radicals under fluorination conditions. Examples of the fluorine radical source include fluorine gas, $CoF_3$, $AgF_2$, $UF_6$, $OF_2$, $N_2F_2$, $CF_3OF$, and halogen fluorides such as $IF_5$ and $ClF_3$. Of these, preferred is a method of bringing fluorine gas and the FEP obtained by the production method of the present disclosure into direct contact with each other. In order to control the reaction, the contact is preferably performed using a diluted fluorine gas having a fluorine gas concentration of 10 to 50% by mass. The diluted fluorine gas is obtainable by diluting fluorine gas with an inert gas such as nitrogen gas or argon gas. The fluorine gas treatment may be performed, for example, at a temperature of 100 to 250° C. The treatment temperature is not limited to this range and may be appropriately set in accordance with the situation. The fluorine gas treatment is preferably performed by feeding a diluted fluorine gas into the reactor continuously or intermittently. This fluorination may be performed on dry powder after the polymerization or on melt-extruded pellets.

The FEP obtained by the production method of the present disclosure has good formability and is less likely to cause forming defects, and it also has properties such as good heat resistance, chemical resistance, solvent resistance, insulation, and electric properties.

The FEP powder may be produced by a method of drying the FEP obtained by the above-mentioned production method of the present disclosure to powderize the FEP to obtain a powder.

The powder may be fluorinated. The fluorinated powder may be produced by a method of feeding a fluorine gas to the powder obtained by the above-described method for producing a powder to fluorinate the powder to obtain a fluorinated powder.

The FEP pellets may be produced by a method of pelletizing the FEP obtained by the above-mentioned production method of the present disclosure to obtain pellets.

The pellets may be fluorinated. The fluorinated pellets may be produced by a method of feeding a fluorine gas to the pellets obtained by the above-described method for producing pellets to fluorinate the pellets to obtain fluorinated pellets.

Thus, this FEP may be used in production of a variety of formed products such as coating materials for electric wires, foamed electric wires, cables, and wires, tubes, films, sheets, and filaments.

(2) In the production method of the present disclosure, the polymerization for a TFE/perfluoro(alkyl vinyl ether) copolymer such as PFA or MFA and a TFE/perfluoroallyl ether copolymer is usually preferably carried out at a polymerization temperature of 10 to 100° C. and a polymerization pressure of 0.3 to 6.0 MPaG.

The TFE/perfluoro(alkyl vinyl ether) copolymer preferably has a monomer composition ratio (mol %) of TFE:perfluoro(alkyl vinyl ether)=(90 to 99.7):(0.3 to 10), more preferably (97 to 99):(1 to 3). The perfluoro(alkyl vinyl ether) used is preferably one represented by the formula: $CF_2═CFORf^4$, wherein $Rf^4$ is a perfluoroalkyl group having 1 to 6 carbon atoms.

In addition to TFE and the perfluoro(alkyl vinyl ether), a further monomer that is copolymerizable with these monomers may be polymerized to obtain a copolymer of TFE, the perfluoro(alkyl vinyl ether), and the further monomer as the TFE/perfluoro(alkyl vinyl ether) copolymer. Examples of the further monomer include the fluorine-containing monomers (provided that TFE and the perfluoro(alkyl vinyl ether) are excluded) and fluorine-free monomers described above. One kind or multiple kinds thereof can be used as the further monomer. The content of the further monomer unit in the TFE/perfluoro(alkyl vinyl ether) copolymer may be 0.1 to 2% by mass based on all monomer units.

The TFE/perfluoroallyl ether copolymer preferably has a monomer composition ratio (mol %) of TFE:perfluoroallyl ether=(90 to 99.7):(0.3 to 10), more preferably (97 to 99):(1 to 3). The perfluoroallyl ether used is preferably one represented by the formula: $CF_2═CFCF_2ORf^4$, wherein $Rf^4$ is a perfluoroalkyl group having 1 to 6 carbon atoms.

In addition to TFE and the perfluoroallyl ether, a further monomer that is copolymerizable with these monomers may be polymerized to obtain a copolymer of TFE, the perfluoroallyl ether, and the further monomer as the TFE/perfluoroallyl ether copolymer. Examples of the further monomer include the fluorine-containing monomers (provided that TFE and the perfluoroallyl ether are excluded) and fluorine-free monomers described above. One kind or multiple kinds thereof can be used as the further monomer. The content of the further monomer unit in the TFE/perfluoroallyl ether copolymer may be 0.1 to 2% by mass based on all monomer units.

In the polymerization for the TFE/perfluoro(alkyl vinyl ether) copolymer and the TFE/perfluoroallyl ether copolymer, the compound (1) can be used within the use range of the production method of the present disclosure, and is usually preferably added in an amount of 0.0001 to 10% by mass based on 100% by mass of the aqueous medium.

In the polymerization for the TFE/perfluoro(alkyl vinyl ether) copolymer and the TFE/perfluoroallyl ether copolymer, the chain transfer agent used is preferably cyclohexane, methanol, ethanol, propanol, propane, butane, pentane, hexane, carbon tetrachloride, chloroform, methylene chloride, methyl chloride, methane, ethane, or the like, and the pH buffer used is preferably ammonium carbonate, disodium hydrogen phosphate, or the like.

The aqueous dispersion of the TFE/perfluoro(alkyl vinyl ether) copolymer such as PFA or MFA and the TFE/perfluoroallyl ether copolymer obtained by the production method of the present disclosure may optionally be subjected to post-treatment such as concentration, and then the concentrate may be dried and powdered, and the powder may be melt-extruded into pellets. The aqueous medium in the aqueous dispersion may optionally contain an additive such as a nonionic surfactant, and may contain a water-soluble organic solvent such as a water-soluble alcohol or may be free from a water-soluble organic solvent.

The melt extrusion may be performed under any appropriately set extrusion conditions usually capable of providing pellets.

In order to improve the heat resistance of the copolymer and also to further reinforce a chemical permeation suppression effect of a formed product, the copolymer is preferably subjected to a fluorine gas treatment.

The fluorine gas treatment is performed by bringing fluorine gas into contact with a chemical permeation suppressant. However, since the reaction with fluorine is extremely exothermic, it is preferable to dilute fluorine with an inert gas such as nitrogen. The amount of fluorine in the fluorine gas/inert gas mixture is 1 to 100% by mass, preferably 10 to 25% by mass. The treatment temperature is 150 to 250° C., preferably 200 to 250° C. and the fluorine gas treatment duration is 3 to 16 hours, preferably 4 to 12 hours. The fluorine gas treatment is performed at a gas pressure in the range of 1 to 10 atm, preferably atmospheric pressure. In the case of using a reactor at atmospheric pressure, the fluorine gas/inert gas mixture may be continuously passed through the reactor. This results in conversion of unstable ends of the copolymer into $-CF_3$ ends, thermally stabilizing the copolymer.

The copolymer and the composition thereof may be formed by compression molding, transfer molding, extrusion forming, injection molding, blow molding, or the like as in the case of conventional PFA.

Such a forming technique can provide a desired formed product. Examples of the formed product include sheets, films, packings, round bars, square bars, pipes, tubes, round tanks, square tanks, tanks, wafer carriers, wafer boxes, beakers, filter housings, flowmeters, pumps, valves, cocks, connectors, nuts, electric wires, and heat-resistant electric wires.

Preferred among these are tubes, pipes, tanks, connectors, and the like to be used for a variety of chemical reaction devices, semiconductor manufacturing devices, and acidic or alkaline chemical feeding devices each requiring chemical impermeability.

The aqueous dispersion of the TFE/perfluoro(alkyl vinyl ether) copolymer such as PFA or MFA and the TFE/perfluoroallyl ether copolymer may also be appropriately mixed with a nonionic surfactant, and optionally polyethersulfone, polyamide-imide, and/or polyimide, and metal powder are dissolved or dispersed in an organic solvent. Thereby, a primer composition can be obtained. This primer composition may be used for a method of applying a fluororesin to a metal surface. The method includes applying the primer composition to a metal surface, applying a melt-fabricable fluororesin composition to the resulting primer layer, and firing the melt-fabricable fluororesin composition layer together with the primer layer.

(3) In the production method of the present disclosure, the polymerization for ETFE is preferably performed at a polymerization temperature of 10 to 100° C. and a polymerization pressure of 0.3 to 2.0 MPaG.

The ETFE preferably has a monomer composition ratio (mol %) of TFE:ethylene=(50 to 99):(50 to 1).

In addition to ethylene and TFE, a further monomer that is copolymerizable with these monomers may be polymerized to obtain a copolymer of ethylene, TFE, and the further monomer as the ETFE. Examples of the further monomer include the fluorine-containing monomers (provided that TFE is excluded) and fluorine-free monomers (provided that ethylene is excluded) described above. One kind or multiple kinds thereof can be used as the further monomer.

The further monomer is preferably hexafluoropropylene, perfluorobutylethylene, perfluorohexylethylene, 3,3,4,4,5,5,6,6,7,7,8,8,8-tridecafluorooct-1-ene, 2,3,3,4,4,5,5-heptafluoro-1-pentene ($CH_2{=}CFCF_2CF_2CF_2H$), or 2-trifluoromethyl-3,3,3-trifluoropropene ($(CF_3)_2CF{=}CH_2$).

The content of the further monomer unit in the ETFE may be 0 to 20% by mass based on all monomer units. The ETFE preferably has a mass ratio of TFE:ethylene:further monomer=(63 to 94):(27 to 2):(1 to 10).

In the polymerization for the ETFE, the compound (1) can be used within the use range of the production method of the present disclosure, and is usually added in an amount of 0.0001 to 10% by mass based on 100% by mass of the aqueous medium.

In the polymerization for the ETFE, the chain transfer agent used is preferably cyclohexane, methanol, ethanol, propanol, ethane, propane, butane, pentane, hexane, carbon tetrachloride, chloroform, methylene chloride, methyl chloride, or the like.

The aqueous dispersion of the ETFE obtained by the production method of the present disclosure may optionally be subjected to post-treatment such as concentration, and then the concentrate may be dried and powdered, and the powder may be melt-extruded into pellets. The aqueous medium in the aqueous dispersion may optionally contain an additive such as a nonionic surfactant, and may contain a water-soluble organic solvent such as a water-soluble alcohol or may be free from a water-soluble organic solvent.

The melt extrusion may be performed under any appropriately set extrusion conditions usually capable of providing pellets.

The ETFE may be extrusion-formed into a sheet. In other words, powder or pellets of the ETFE in a molten state may be continuously extruded through a die and then cooled to provide a sheet-shaped formed product. The ETFE may be mixed with an additive.

Known additives may be incorporated as appropriate. Specific examples thereof include ultraviolet absorbers, photostabilizers, antioxidants, infrared absorbers, flame retarders, flame-retardant fillers, organic pigments, inorganic pigments, and dyes. From the viewpoint of excellent weather resistance, inorganic additives are preferred.

The content of the additive in the ETFE sheet is preferably 20% by mass or less, and particularly preferably 10% by mass or less, based on the total mass of the ETFE sheet.

The ETFE sheet has excellent mechanical strength and appearance, and thus can suitably be used for film materials (e.g., roof materials, ceiling materials, outer wall materials, inner wall materials, and coating materials) of film-structured buildings (e.g., sports facilities, gardening facilities, and atriums).

In addition to the film materials of film-structured buildings, the ETFE sheet is also useful for, for example, outdoor boards (e.g., noise-blocking walls, windbreak fences, breakwater fences, roof panels of carports, shopping arcades, footpath walls, and roof materials), shatter-resistant window films, heat-resistant waterproof sheets, building materials (e.g., tent materials of warehouse tents, film materials for shading, partial roof materials for skylights, window materials alternative to glass, film materials for flame-retardant partitions, curtains, outer wall reinforcement, waterproof films, anti-smoke films, non-flammable transparent partitions, road reinforcement, interiors (e.g., lighting, wall surfaces, and blinds), exteriors (e.g., tents and signboards)), living and leisure goods (e.g., fishing rods, rackets, golf clubs, and screens), automobile materials (e.g., hoods, damping materials, and bodies), aircraft materials, shipment materials, exteriors of home appliances, tanks, vessel inner walls, filters, film materials for construction works, electronic materials (e.g., printed circuit boards, circuit boards, insulating films, and release films), surface materials for solar cell modules, mirror protection materials for solar thermal energy, and surface materials for solar water heaters.

(4) The production method of the present disclosure may be used to produce an electrolyte polymer precursor. In the production method of the present disclosure, the polymerization for the electrolyte polymer precursor is preferably performed at a polymerization temperature of 10 to 100° C. and a polymerization pressure of 0.1 to 2.0 MPaG. The electrolyte polymer precursor contains a monomer containing a functional group represented by $—SO_2X^{151}$, $—COZ^{151}$, or $—POZ^{152}Z^{153}$ ($X^{151}$, $Z^{151}$, $Z^{152}$, and $Z^{153}$ are as described later), and can be converted into an ion-exchangeable polymer through a hydrolysis treatment.

An example of the monomer to be used for the electrolyte polymer precursor can be a fluorine-containing monomer represented by the general formula (150): $CF_2{=}CF—O—(CF_2CFY^{151}—O)_n—(CFY^{152})_m\text{-}A^{151}$ wherein $Y^{151}$ represents a fluorine atom, a chlorine atom, a $—SO_2F$ group, or a perfluoroalkyl group; the perfluoroalkyl group optionally contains ether oxygen and a $—SO_2F$ group; n represents an integer of 0 to 3; n $Y^{151}$ are the same as or different from each other; $Y^{152}$ represents a fluorine atom, a chlorine atom, or a $—SO_2F$ group; m represents an integer of 1 to 5; m $Y^{152}$ are the same as or different from each other; $A^{151}$ represents $—SO_2X^{151}$, $—COZ^{151}$, or $—POZ^{152}Z^{133}$; $X^{151}$ represents F, Cl, Br, I, $—OR^{151}$, or $—NR^{152}R^{153}$; $Z^{151}$, $Z^{152}$, and $Z^{153}$ are the same as or different from each other, and each represent $—NR^{154}R^{155}$ or $—OR^{156}$; and $R^{151}$, $R^{152}$, $R^{153}$, $R^{154}$, $R^{155}$, and $R^{156}$ are the same as or different from each other, and each represent H, ammonium, an alkali metal, or an alkyl group, aryl group, or sulfonyl-containing group optionally containing a fluorine atom. Examples of the monomer used for the electrolyte polymer precursor may include the compounds containing two fluorosulfonyl groups as described in International Publication No. WO 2007/013532, and the perfluoromonomers having a $—SO_2F$ group and a dioxolane ring as described in International Publication No. WO 2014/175123. The electrolyte polymer precursor preferably has a monomer composition ratio (mol %) of TFE:vinyl ether=(50 to 99):(50 to 1), more preferably TFE:vinyl ether=(50 to 93):(50 to 7).

The electrolyte polymer precursor may be modified with a third monomer within the range of 0 to 20% by mass of all monomers. Examples of the third monomer may include CTFE, vinylidene fluoride, perfluoroalkyl vinyl ethers, perfluorobutenyl vinyl ether; cyclic monomers such as perfluoro-2,2-dimethyl-1,3-dioxolane, and perfluoro-2-methylene-4-methyl-1,3-dioxol; and multifunctional monomers such as divinylbenzene.

The electrolyte polymer precursor thereby obtained may be formed into a film, followed by hydrolysis using an alkali solution and a treatment using a mineral acid, and thereby used as a polymer electrolyte film for fuel cells, electrolysis devices, redox flow batteries, and the like.

The electrolyte polymer precursor may be hydrolyzed using an alkali solution while the dispersed state thereof is maintained, thereby providing an electrolyte polymer dispersion.

This dispersion may be then heated up to 120° C. or higher in a pressurized vessel and thereby dissolved in, for example, a solvent mixture of water and an alcohol, i.e., converted into a solution state.

The solution thereby obtained may be used as a binder for electrodes. Also, the solution may be combined with a variety of additives and cast to form a film, and the film may be used for antifouling films, organic actuators, or the like.

(5) TFE/VDF Copolymer

In the production method of the present disclosure, the polymerization for the TFE/VDF copolymer may be performed at any polymerization temperature, for example, 0 to 100° C. The polymerization pressure is determined as appropriate in accordance with the other polymerization conditions such as the polymerization temperature, and may be usually 0 to 9.8 MPaG.

The TFE/VDF copolymer preferably has a monomer composition ratio (mol %) of TFE:VDF=(5 to 90):(95 to 10). The TFE/VDF copolymer may be further modified with a third monomer within the range of 0 to 50 mol % of all monomers. The composition ratio thereof is preferably TFE:ethylene:third monomer=(30 to 85):(10 to 69.9):(0.1 to 10).

The third monomer is preferably a monomer represented by the formula:

$$CX^{11}X^{12}{=}CX^{13}(CX^{14}X^{15})_{n11}X^{16}$$

wherein $X^{11}$ to $X^{16}$ are the same as or different from each other, and each represent H, F, or Cl; n11 represents an integer of 0 to 8, with the proviso that the third monomer is other than TFE and VDF; or a monomer represented by the formula: $CX^{21}X^{22}{=}CX^{23}—O(CX^{24}X^{25})_{n21}X^{26}$ wherein $X^{21}$ to $X^{26}$ are the same as or different from each other, and each represent H, F, or Cl; and n21 represents an integer of 0 to 8.

The third monomer may be a fluorine-free ethylenic monomer. From the viewpoint of maintaining the heat resistance and the chemical resistance, the fluorine-free ethylenic monomer is preferably selected from ethylenic monomers having 6 or less carbon atoms. Examples thereof include ethylene, propylene, 1-butene, 2-butene, vinyl chloride, vinylidene chloride, alkyl vinyl ethers (e.g., methyl vinyl ether, ethyl vinyl ether, and propyl vinyl ether), maleic acid, itaconic acid, 3-butenoic acid, 4-pentenoic acid, vinylsulfonic acid, acrylic acid, and methacrylic acid.

In the polymerization for the TFE/VDF copolymer, the compound (1) can be used within the use range of the production method of the present disclosure, and is usually added in an amount of 0.0001 to 5% by mass based on 100% by mass of the aqueous medium.

The TFE/VDF copolymer obtained by the polymerization may be amidated by bringing it into contact with ammonia water, ammonia gas, or a nitrogen compound capable of generating ammonia.

The TFE/VDF copolymer obtained by the above-described method may also preferably be used as a material for providing TFE/VDF copolymer fibers by a spinning-drawing method. The spinning-drawing method is a method for obtaining a TFE/VDF copolymer fiber by melt spinning a TFE/VDF copolymer, cooling and solidifying it to obtain an undrawn yarn, and then running the undrawn yarn in a heating cylinder to draw the undrawn yarn.

The TFE/VDF copolymer may be dissolved in an organic solvent to provide a solution of the TFE/VDF copolymer. Examples of the organic solvent include nitrogen-containing organic solvents such as N-methyl-2-pyrrolidone, N,N-dimethyl acetamide, and dimethyl formamide; ketone-based solvents such as acetone, methyl ethyl ketone, cyclohexanone, and methyl isobutyl ketone; ester-based solvents such as ethyl acetate and butyl acetate; ether-based solvents such as tetrahydrofuran and dioxane; and general-purpose organic solvents having a low boiling point such as solvent mixtures thereof. The solution may be used as a binder for batteries.

The aqueous dispersion of the TFE/VDF copolymer may preferably be used to coat a porous substrate formed from a polyolefin resin to provide a composite porous film. The aqueous dispersion may also preferably contain inorganic particles and/or organic particles dispersed therein and be used to coat a porous substrate to provide a composite porous film. The composite porous film thereby obtained may be used as a separator for lithium secondary batteries, and the like.

The powder of the melt-fabricable fluororesin is suitably used as a powdery coating material. When applied to a substrate, the powdery coating material made of the melt-fabricable fluororesin powder can provide a film having a smooth surface. The melt-fabricable fluororesin powder having an average particle size of 1 μm or greater and smaller than 100 μm is particularly suitable as a powdery coating material used for electrostatic coating. The melt-fabricable fluororesin powder having an average particle size of 100 μm or greater and 1,000 μm or smaller is particularly suitable as a powdery coating material used for rotational coating or rotational molding.

The melt-fabricable fluororesin powder can be produced by a method of drying the melt-fabricable fluororesin obtained by the above-mentioned production method of the present disclosure to powderize the melt-fabricable fluororesin to obtain a powder.

Although the embodiments have been described above, it will be understood that a wide variety of modifications can be made in the form and details without departing from the spirit and scope of the claims.

According to the present disclosure, provided is a method for producing a fluororesin, comprising polymerizing a fluorine-containing monomer in the presence of a compound (1) having triple bond and a hydrophilic group and an aqueous medium to produce a fluororesin.

In the production method of the present disclosure, it is preferable that the compound (1) is a compound represented by the general formula (1):

$$A^1—R^1—C≡CX^1 \quad \text{General formula (1):}$$

wherein $A^1$ is —COOM, —$SO_3M$, —$OSO_3M$, —B(OM)($OR^2$), —OB(OM)($OR^2$), —PO(OM)($OR^2$), or —OPO(OM)($OR^2$);

M is H, a metal atom, $NR^3_4$, imidazolium optionally having a substituent, pyridinium optionally having a substituent, or phosphonium optionally having a substituent;

$R^3$ is the same or different at each occurrence and is H or an organic group;

$R^2$ is H, a metal atom, $NR^3_4$, imidazolium optionally having a substituent, pyridinium optionally having a substituent, phosphonium optionally having a substituent, or an alkynyl group;

$R^1$ is a linking group; and $X^1$ is H, a hydrocarbon group, or $A^1$, and the hydrocarbon group optionally has a halogen atom, ether bond, ester bond, or amide bond.

In the production method of the present disclosure, it is preferable that $R^1$ is single bond or a divalent hydrocarbon group optionally having Cl, Br, or I.

In the production method of the present disclosure, it is preferable that $X^1$ is H, a hydrocarbon group optionally having Cl, Br, I, ether bond, ester bond, or amide bond, or $A^1$.

In the production method of the present disclosure, it is preferable that the alkynyl group of $R^2$ is free from a fluorine atom.

In the production method of the present disclosure, it is preferable that the amount of the compound (1) is 0.001 to 100,000 ppm by mass based on the aqueous medium.

In the production method of the present disclosure, it is preferable that at least tetrafluoroethylene is polymerized as the fluorine-containing monomer.

In the production method of the present disclosure, it is preferable that the fluorine substitution percentage of the fluororesin is 50% or higher.

In the production method of the present disclosure, it is preferable that the fluorine-containing monomer is polymerized also in the presence of a hydrocarbon surfactant.

In the production method of the present disclosure, it is preferable that the fluorine-containing monomer is polymerized substantially in the absence of a fluorine-containing surfactant.

In the production method of the present disclosure, it is preferable that the fluorine-containing monomer is polymerized substantially in the absence of a polymer containing only a fluorine-free monomer unit.

Also, according to the present disclosure, provided is a fluororesin comprising a unit based on a compound (1) having triple bond and a hydrophilic group, and a fluorine-containing monomer unit.

In the fluororesin of the present disclosure, it is preferable that the compound (1) is a compound represented by the general formula (1):

$$A^1—R^1—C≡CX^1 \quad \text{General formula (1):}$$

wherein $A^1$ is —COOM, —$SO_3M$, —$OSO_3M$, —B(OM)($OR^2$), —OB(OM)($OR^2$), —PO(OM)($OR^2$), or —OPO(OM)($OR^2$);

M is H, a metal atom, $NR^3_4$, imidazolium optionally having a substituent, pyridinium optionally having a substituent, or phosphonium optionally having a substituent;

$R^3$ is the same or different at each occurrence and is H or an organic group;

$R^2$ is H, a metal atom, $NR^3_4$, imidazolium optionally having a substituent, pyridinium optionally having a substituent, phosphonium optionally having a substituent, or an alkynyl group;

$R^1$ is a linking group; and $X^1$ is H, a hydrocarbon group, or $A^1$, and the hydrocarbon group optionally has a halogen atom, ether bond, ester bond, or amide bond.

In the fluororesin of the present disclosure, it is preferable that $R^1$ is single bond or a divalent hydrocarbon group optionally having Cl, Br, or I.

In the fluororesin of the present disclosure, it is preferable that $X^1$ is H, a hydrocarbon group optionally having Cl, Br, I, ether bond, ester bond, or amide bond, or $A^1$.

In the fluororesin of the present disclosure, it is preferable that the alkynyl group of $R^2$ is a fluorine atom-free alkynyl group.

It is preferable that the fluororesin of the present disclosure comprises at least tetrafluoroethylene unit as the fluorine-containing monomer unit.

It is preferable that the fluororesin of the present disclosure has a fluorine substitution percentage of 50% or higher.

It is preferable that the fluororesin of the present disclosure is substantially free from a fluorine-containing surfactant.

It is preferable that the fluororesin of the present disclosure is substantially free from a polymer containing only a fluorine-free monomer unit.

It is preferable that the fluororesin of the present disclosure has an average primary particle size of the fluororesin of 500 nm or less.

Also, according to the present disclosure, provided is an aqueous dispersion comprising the above fluororesin and an aqueous medium.

It is preferable that the aqueous dispersion of the present disclosure further comprises a nonionic hydrocarbon surfactant.

EXAMPLES

Next, embodiments of the present disclosure will be described with reference to Examples, but the present disclosure is not intended to be limited by such Examples.

The numerical values in Examples were measured by the following methods.

<Polymer Solid Concentration>

In an air dryer, 1 g of the PTFE aqueous dispersion was dried at 150° C. for 60 minutes, and the ratio of the mass of the non-volatile matter to the mass of the aqueous dispersion (1 g) was expressed in percentage and taken as the solid concentration thereof.

<Average Primary Particle Size>

The average primary particle size was determined by preparing a PTFE aqueous dispersion adjusted to a polymer solid concentration of about 1.0% by mass, and by conducting a measurement using ELSZ-1000S (manufactured by Otsuka Electronics Co., Ltd.) at 25° C. with 70 processes. The refractive index of the solvent (water) was 1.3328, and the viscosity of the solvent (water) was 0.8878 mPa·s.

<Standard Specific Gravity (SSG) of PTFE Powder>

A measurement sample was prepared compliant with ASTM D 4895-89, and the SSG was determined by the water replacement method compliant with ASTM D 792 using the measurement sample.

<Content of Modifying Monomer (Modification Amount)>

In order to determine the content of the HFP unit, a thin film disk was prepared by subjecting the PTFE powder to press molding, and based on the infrared absorbance thereof obtained by FT-IR measurement of the thin film disk, the value obtained by multiplying the ratio of absorbance at 982 $cm^{-1}$/absorbance at 935 $cm^{-1}$ by 0.3 was taken as the HFP unit content.

Preparation Example 1

4.3 g of lauric acid and 10% ammonia water were added to 94 g of deionized water, and the mixture was stirred to obtain a transparent aqueous solution A.

Example 1

To a reactor made of SUS with an internal volume of 3 L and equipped with a stirrer, 1,780 g of deionized water, 90 g of paraffin wax, 64 mg of acetylenemonocarboxylic acid, and a small amount of ammonia water were added to prepare an aqueous dispersion. The pH of the aqueous dispersion at this time was 10.5. The reactor was sealed, and the system was purged with nitrogen, so that oxygen was removed. The reactor was heated to 85° C., 2.0 g of HFP was added, and the pressure in the reactor was further increased with TFE to 2.70 MPaG.

As the polymerization initiator, 0.18 g of ammonium persulfate dissolved in 20 g of deionized water was injected into the reactor to initiate the polymerization. TFE was charged so as to keep the pressure in the reactor constant at 2.70 MPaG. Stirring was stopped when 60 g of TFE was charged, and the reactor was depressurized until the pressure in the reactor reached atmospheric pressure. Immediately, TFE was charged into the reactor, the pressure in the reactor was set to 2.70 MPaG, stirring was resumed, and the reaction was continued. Immediately after initiating the stirring, the aqueous solution A began to be added continuously.

When 240 g of TFE was charged, stirring was stopped and depressurization was carried out until the pressure in the reactor reached atmospheric pressure, to thereby terminate the reaction. By the end of the reaction, 4.8 g of the aqueous solution A was charged.

The aqueous dispersion was taken out from the reactor, and after cooling, the paraffin wax was separated to obtain a PTFE aqueous dispersion. The solid concentration in the obtained PTFE aqueous dispersion was 11.6% by mass, and the average primary particle size thereof was 125 nm.

The obtained PTFE aqueous dispersion was diluted with deionized water to have a solid concentration of 10% and coagulated under a high-speed stirring condition. The coagulated wet powder was dried at 210° C. for 18 hours. The obtained PTFE powder had a SSG of 2.238 and a HFP modification amount of 0.13% by mass.

Example 2

A PTFE aqueous dispersion was obtained in the same manner as in Example 1, except that when stirring was resumed, 18 g of a 2.0 mass % disuccinic acid peroxide aqueous solution was injected into the reactor along with the initiation of continuous addition of the aqueous solution A, that stirring was stopped when 450 g of TFE was charged, and that 8.8 g of the aqueous solution A was charged by the end of the reaction. The solid concentration in the obtained PTFE aqueous dispersion was 19.9% by mass, and the average primary particle size thereof was 175 nm.

PTFE powder was obtained in the same manner as in Example 1, except that the obtained PTFE aqueous dispersion was used. The obtained PTFE powder had a SSG of 2.196 and a HFP modification amount of 0.02% by mass.

Example 3

An aqueous dispersion was prepared in the same manner as in Example 1, except that acetylenedicarboxylic acid was used instead of acetylenemonocarboxylic acid and that ammonia water was not added. The pH of the aqueous dispersion at this time was 5.4. Thereafter, polymerization was initiated in the same manner as in Example 1.

A PTFE aqueous dispersion was obtained in the same manner as in Example 1, except that the reaction was continued without depressurization when 60 g of TFE was charged, that a 1.5 mass % sodium dodecyl sulfate aqueous solution was continuously added instead of the aqueous solution A, that stirring was stopped when 260 g of TFE was charged, and that 15 g of the 1.5 mass % sodium dodecyl sulfate aqueous solution was charged by the end of the reaction.

The solid concentration in the obtained PTFE aqueous dispersion was 12.8% by mass, and the average primary particle size thereof was 119 nm.

PTFE powder was obtained in the same manner as in Example 1 except that the obtained PTFE aqueous dispersion was used. The obtained PTFE powder had a SSG of 2.234 and a HFP modification amount of 0.03% by mass.

The invention claimed is:

1. A method for producing a fluororesin, comprising polymerizing a fluorine-containing monomer in the presence of a compound (1) having triple bond and an anionic hydrophilic group and an aqueous medium to produce a fluororesin, wherein the fluororesin is a partially crystalline fluoropolymer.

2. The production method according to claim 1, wherein the compound (1) is a compound represented by the general formula (1):

$A^1—R^1—C≡CX^1$ General formula (1):

wherein $A^1$ is —COOM, —$SO_3M$, —$OSO_3M$, —B(OM)($OR^2$), —OB(OM)($OR^2$), —PO(OM)($OR^2$), or —OPO(OM)($OR^2$);

M is H, a metal atom, $NR^3{}_4$, imidazolium optionally having a substituent, pyridinium optionally having a substituent, or phosphonium optionally having a substituent;

$R^2$ is H, a metal atom, $NR^3{}_4$, imidazolium optionally having a substituent, pyridinium optionally having a substituent, phosphonium optionally having a substituent, or an alkynyl group;

$R^3$ is the same or different at each occurrence and is H or an organic group;

$R^1$ is a linking group; and $X^1$ is H, a hydrocarbon group, or $A^1$, and the hydrocarbon group optionally has a halogen atom, an ether bond, an ester bond, or an amide bond.

3. The production method according to claim 2, wherein $R^1$ is single bond or a divalent hydrocarbon group optionally having Cl, Br, or I.

4. The production method according to claim 2, wherein $X^1$ is H, a hydrocarbon group optionally having Cl, Br, I, an ether bond, an ester bond, or an amide bond, or $A^1$.

5. The production method according to claim 2, wherein the alkynyl group of $R^2$ is free from a fluorine atom.

6. The production method according to claim 1, wherein an amount of the compound (1) is 0.001 to 100,000 ppm by mass based on the aqueous medium.

7. The production method according to claim 1, wherein at least tetrafluoroethylene is polymerized as the fluorine-containing monomer.

8. The production method according to claim 1, wherein a fluorine substitution percentage of the fluororesin is 50% or higher.

9. The production method according to claim 1, wherein the fluorine-containing monomer is polymerized also in the presence of a hydrocarbon surfactant.

10. The production method according to claim 1, wherein the fluorine-containing monomer is polymerized substantially in the absence of a fluorine-containing surfactant.

11. The production method according to claim 1, wherein the fluorine-containing monomer is polymerized substantially in the absence of a polymer containing only a fluorine-free monomer unit.

* * * * *